(12) United States Patent
Caldwell

(10) Patent No.: US 8,789,577 B2
(45) Date of Patent: Jul. 29, 2014

(54) PORTABLE COLLAPSIBLE MODULAR BACKGROUND SET AND METHOD OF USE

(76) Inventor: Ellen Caldwell, Memphis, TN (US)

( * ) Notice: Subject to any disclaimer, the term of this patent is extended or adjusted under 35 U.S.C. 154(b) by 106 days.

(21) Appl. No.: 12/857,711

(22) Filed: Aug. 17, 2010

(65) Prior Publication Data

US 2012/0046116 A1 Feb. 23, 2012

(51) Int. Cl.
*A47H 7/00* (2006.01)
*A47G 5/00* (2006.01)
*A63G 31/00* (2006.01)
*A63J 5/02* (2006.01)
*A63J 1/02* (2006.01)

(52) U.S. Cl.
CPC .................................. *A63J 1/02* (2013.01)
USPC .............................. 160/350; 160/351; 472/57

(58) Field of Classification Search
USPC ......... 160/123, 135, 330, 333, 338, 350, 351, 160/352; 211/194, 206; 248/200, 200.1; 396/3; 40/605, 610; 52/7; 206/600
See application file for complete search history.

(56) References Cited

U.S. PATENT DOCUMENTS

| | | | |
|---|---|---|---|
| 4,561,798 A | 12/1985 | Elerin | |
| 4,582,003 A | 4/1986 | Valero | |
| 4,865,111 A * | 9/1989 | Perutz | 160/135 |
| 4,871,076 A * | 10/1989 | Schramm | 211/189 |
| 5,323,836 A | 6/1994 | Tuttle | |
| 5,537,766 A | 7/1996 | Nickens | |
| 5,611,384 A | 3/1997 | Carter | |
| 5,619,299 A * | 4/1997 | Fleming-Schaub | 396/3 |
| 6,359,218 B1 | 3/2002 | Koch | |
| 6,370,803 B1 | 4/2002 | Burquest | |
| 6,401,947 B1 * | 6/2002 | Hu et al. | 211/189 |
| 6,643,966 B2 | 11/2003 | Schmitt | |
| 7,140,307 B1 | 11/2006 | Wolbert | |
| 2005/0034409 A1 | 2/2005 | Fritsche | |
| 2005/0066592 A1 * | 3/2005 | Huber et al. | 52/169.9 |
| 2006/0060310 A1 * | 3/2006 | Haugen | 160/135 |
| 2010/0205901 A1 * | 8/2010 | Petta | 52/831 |

OTHER PUBLICATIONS

Affordable Exhibit Displays; Website:http://www.affordabledisplays.com/shopexd.asp?id=458 Affordable Exhibit Displays, Inc., 1967 Lisbon Road, Lewiston ME 04240 (USA).
Displayit; Website: http://www.displayit.com/10-ft-Standard-Curved-Popup-Trade-Show-Display.aspx; Displayit, Inc., 130 Satellite Blvd, NE, Suite E, Suwanee, GA 30024 (USA).
Siegel Display Products; Web: http://www.siegeldisplay.com/productdetail.aspx?id=t6005-48237 Siegel Display Products, 300 Sixth Ave. North, Suite 200, Minneapolis, MN 55401 (USA).
Camelback Displays, Inc.; Website: http://www.camelbackdisplays.com/Fabric-Pop.htm Camelback Displays, Inc., 1922 Willow Wisp Ln., Spring, TX 77388 (USA).

* cited by examiner

*Primary Examiner* — Katherine Mitchell
*Assistant Examiner* — Jeremy Ramsey
(74) *Attorney, Agent, or Firm* — Roy E. Williams

(57) ABSTRACT

This embodiment provides for a portable, easily-assembled, modular background set that can be used in television studios, theatre stages, and tradeshow booths, to name a few, and for displays in other settings, such as retail stores, physician's offices, and the like, that is, wherever information needs to be displayed. According to this embodiment, an apparatus and method for providing said background set or display comprises a plurality of base structures; a plurality of outer and inner collapsible corrugated plasticboard sleeves; a plurality of supporting frames; a hanger system; an elastic cord stabilizing system; and a collapsible backdrop system. These components are assembled from a very compact, collapsed, disassembled state in a quick and easy manner, with no special tools, to create a professional set or display that can be used in a plurality of different venues.

25 Claims, 60 Drawing Sheets

RIGHT (R) View

LEFT (L) View

TOP (T) View

BOTTOM (B) View

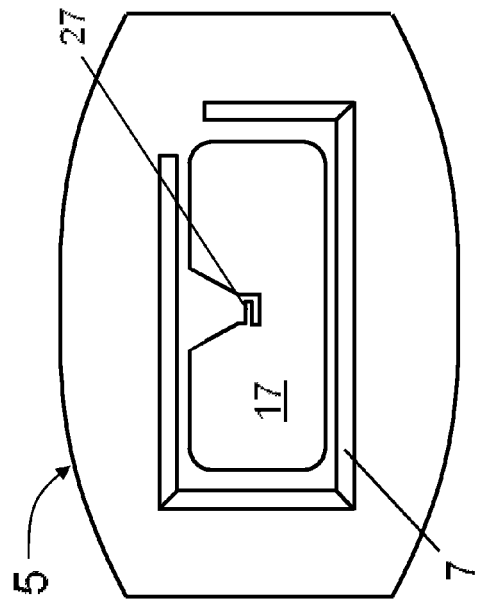
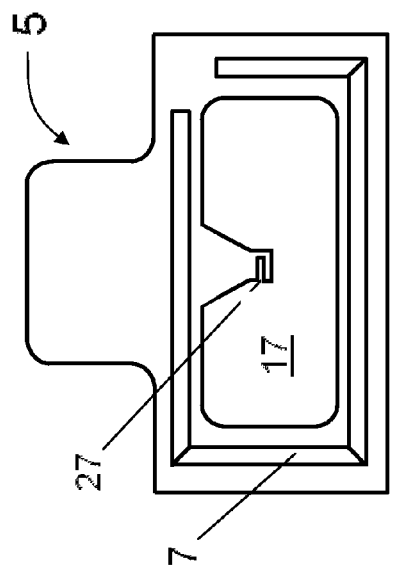
Fig. 2J
Fig. 2K
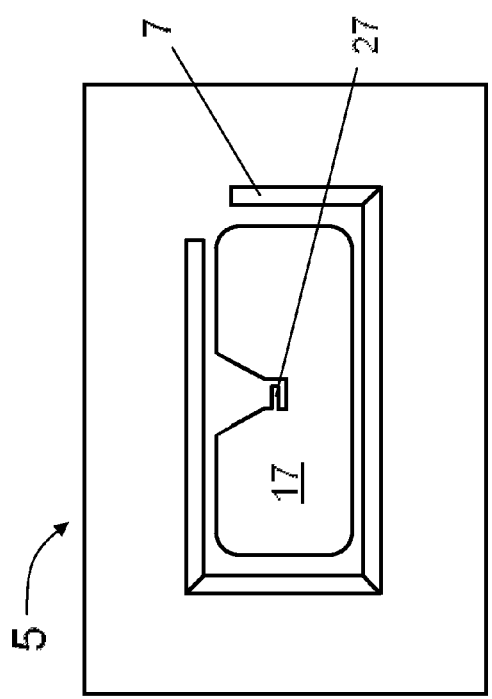
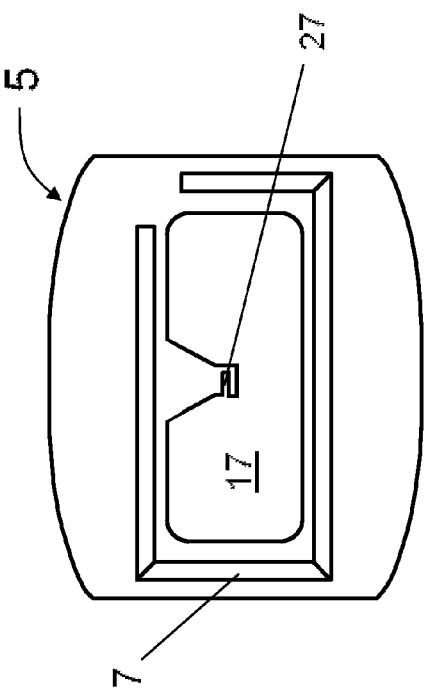
Fig. 2L
Fig. 2M

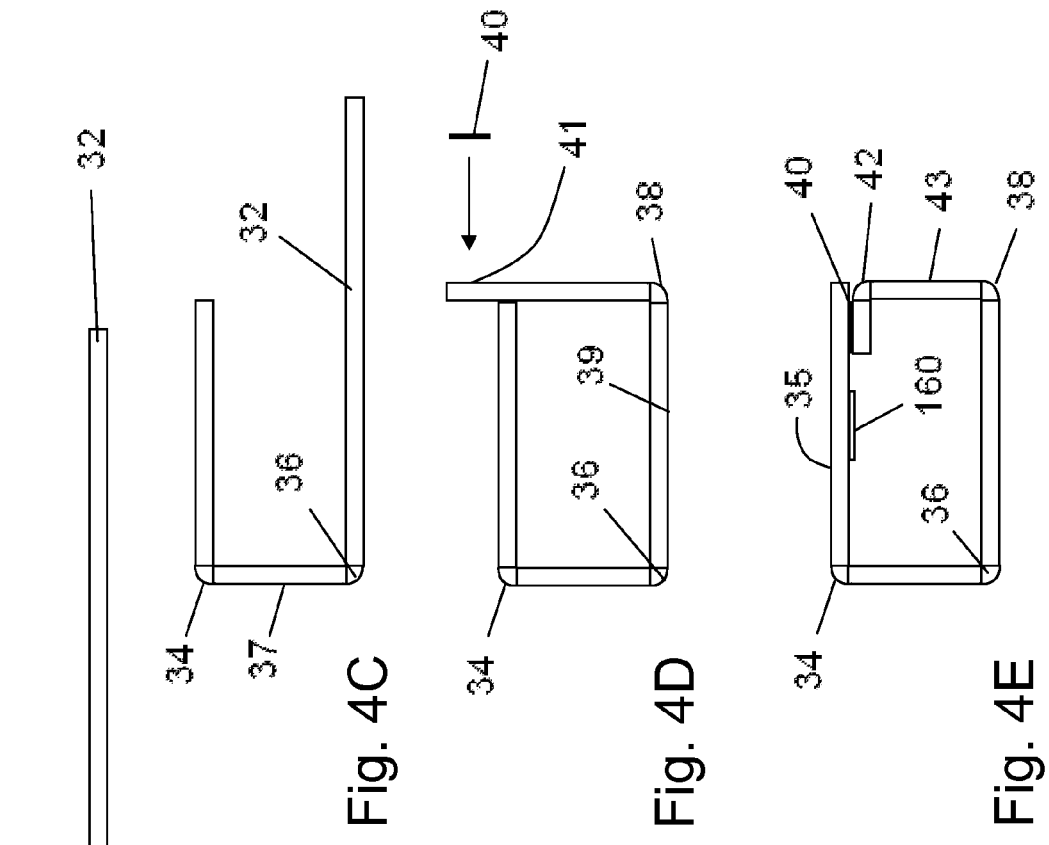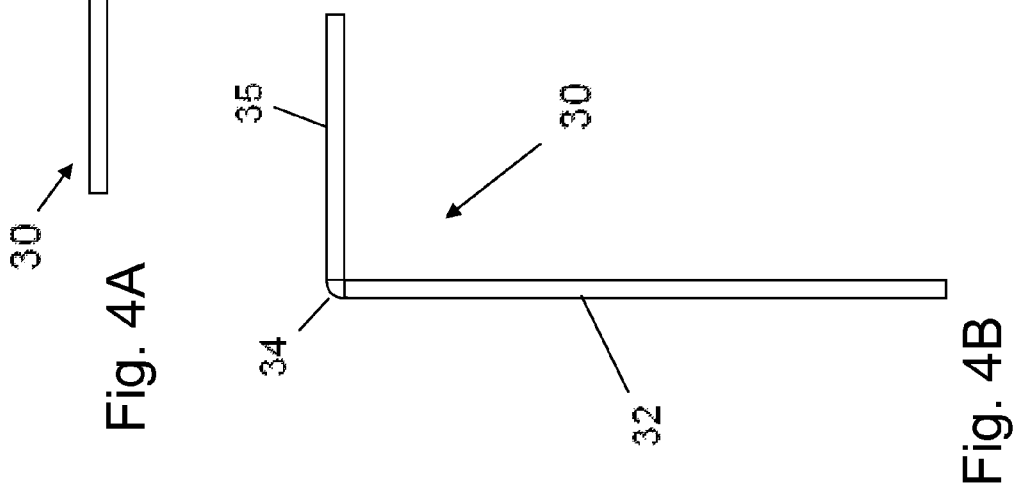

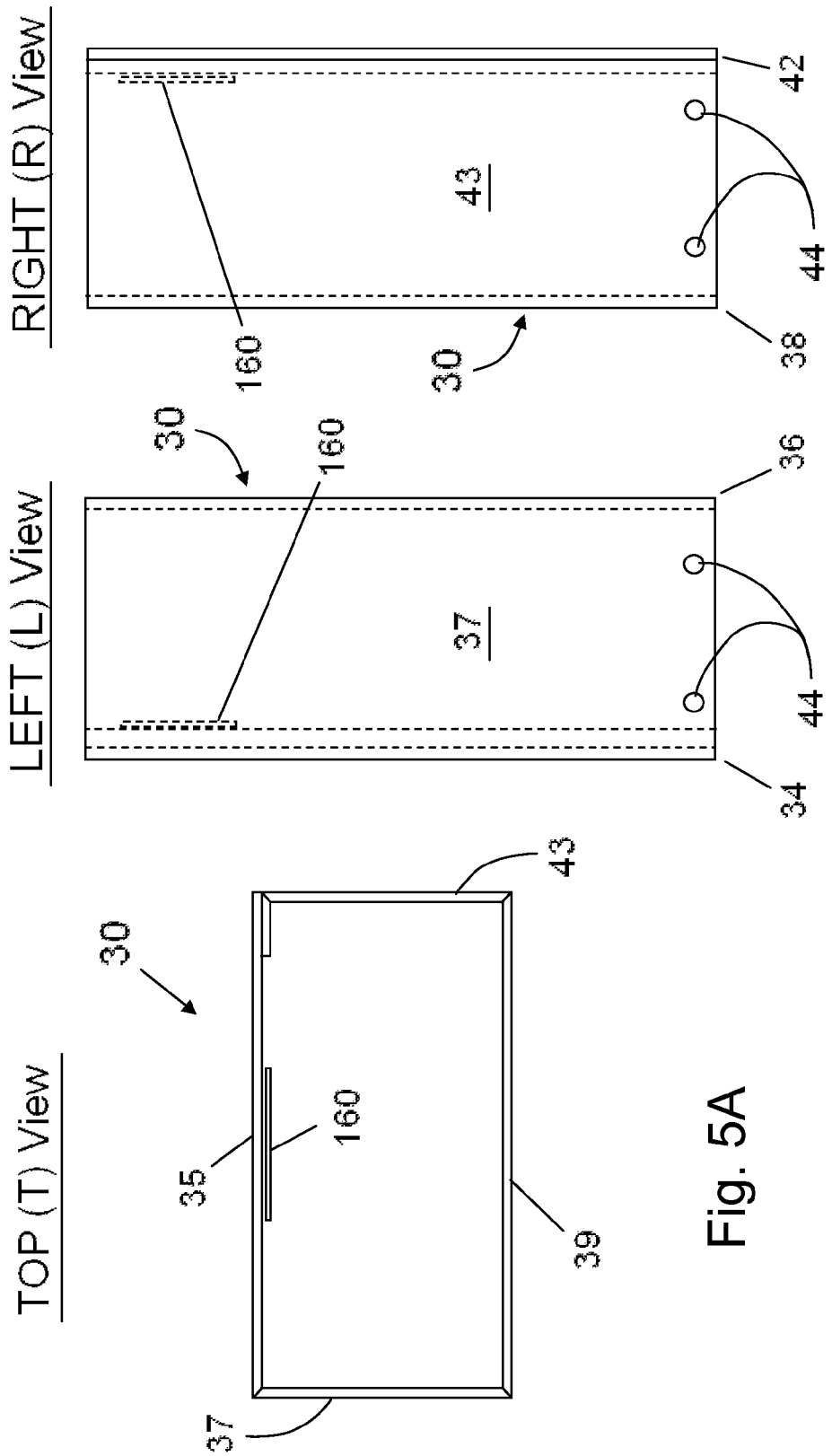

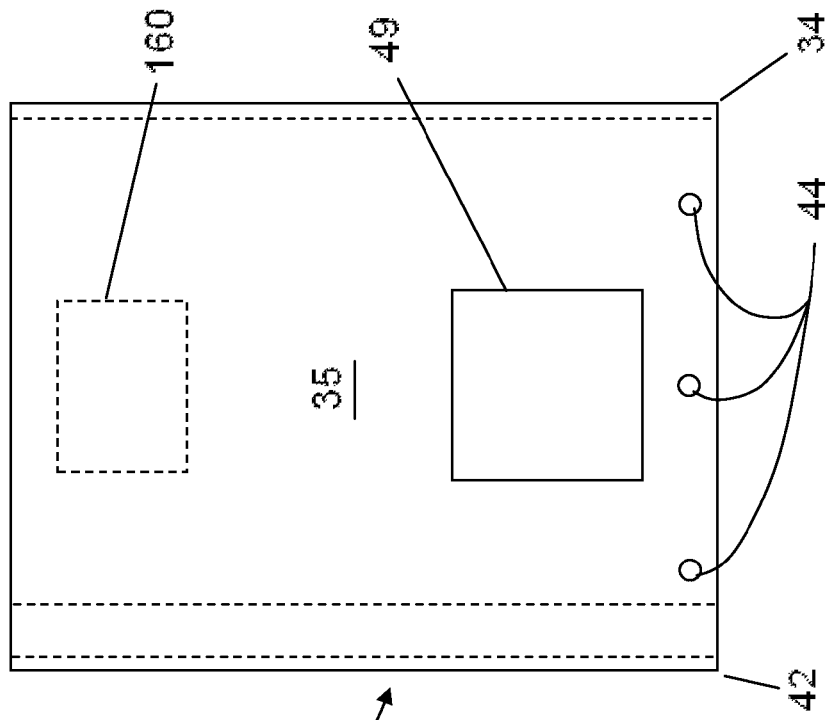
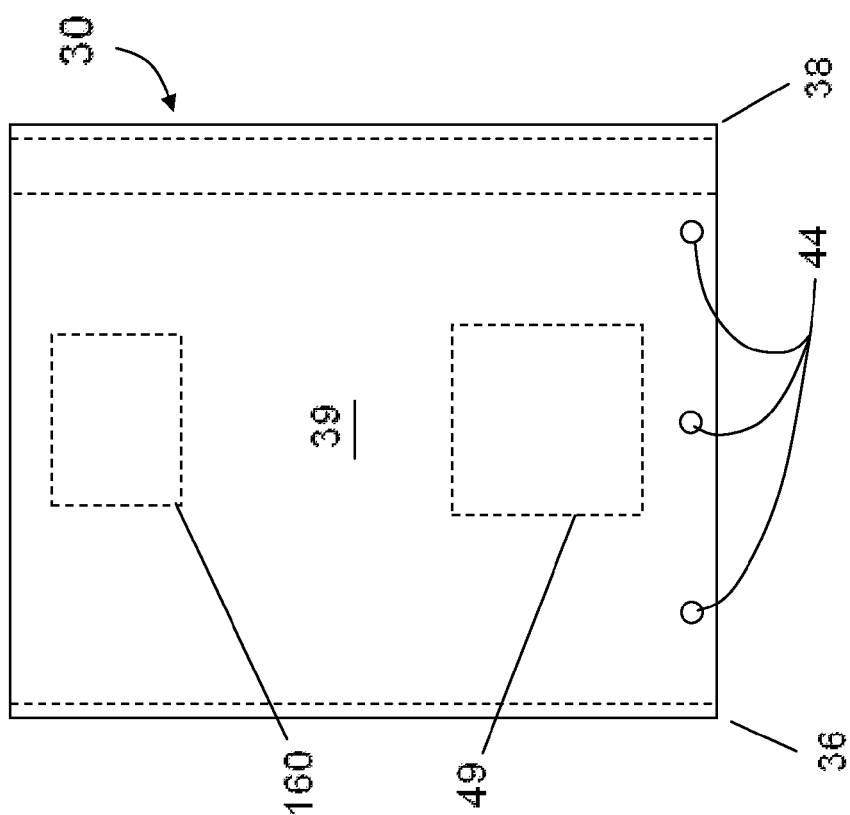

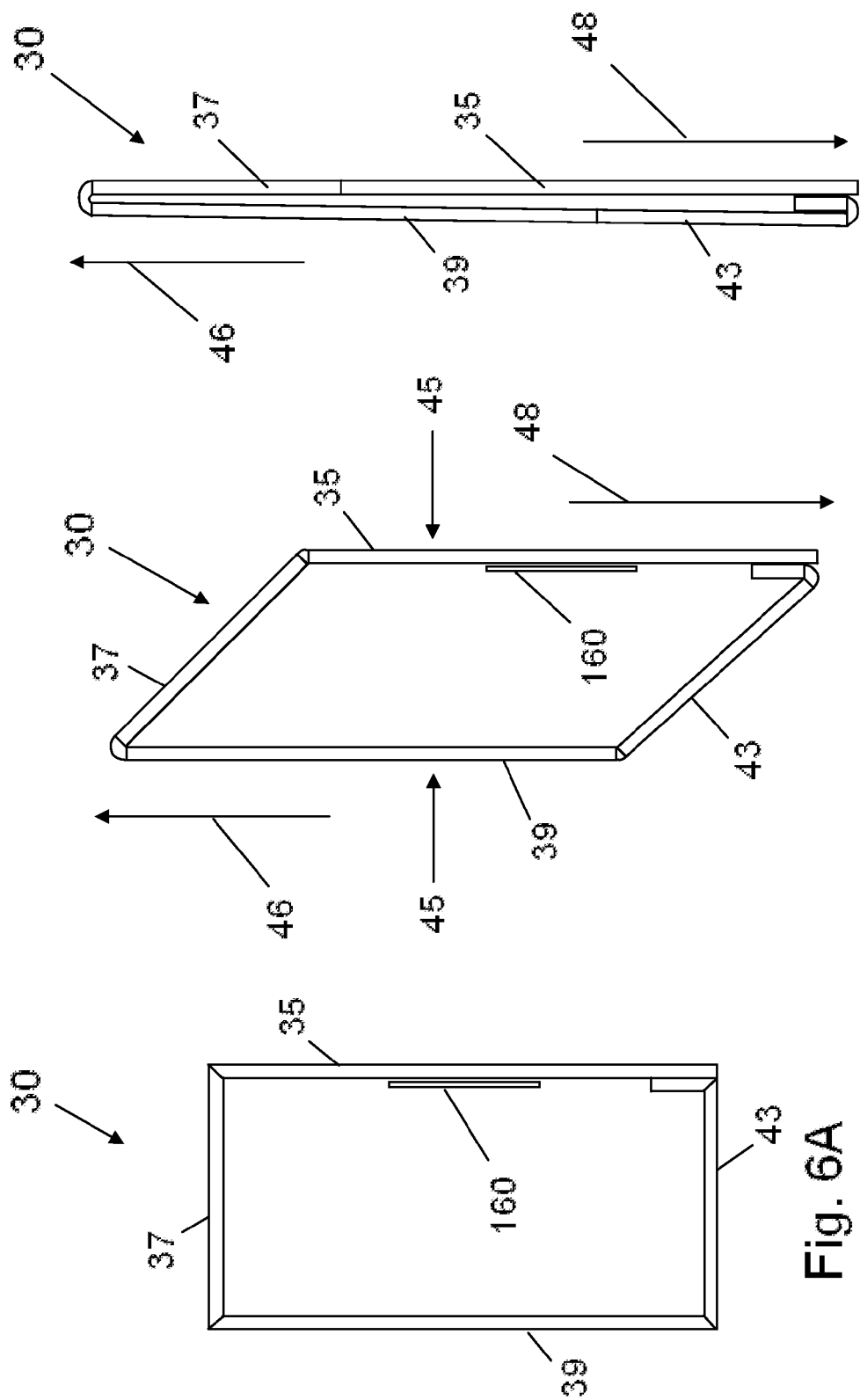

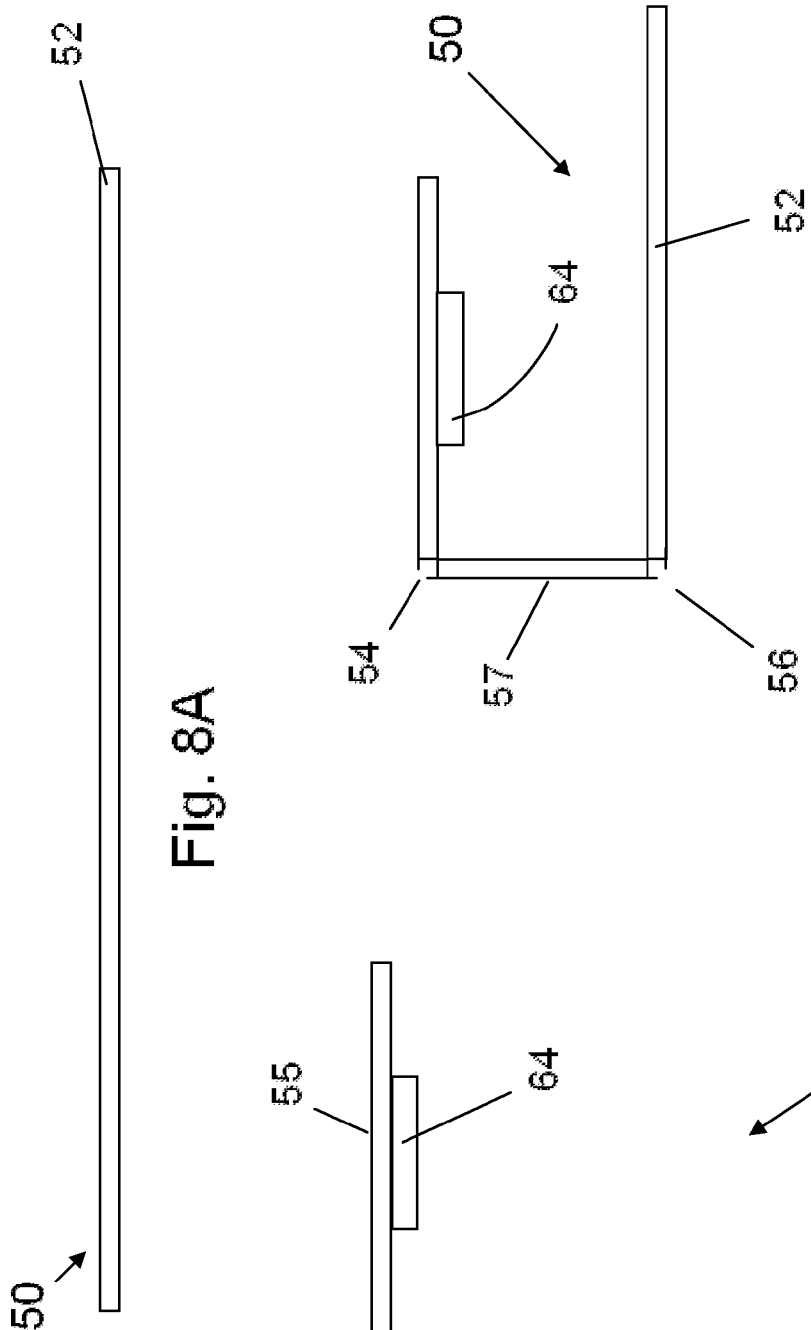

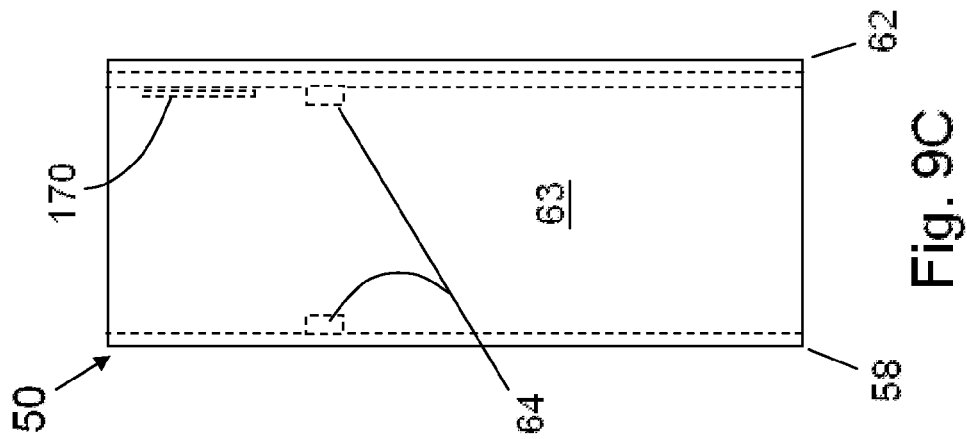
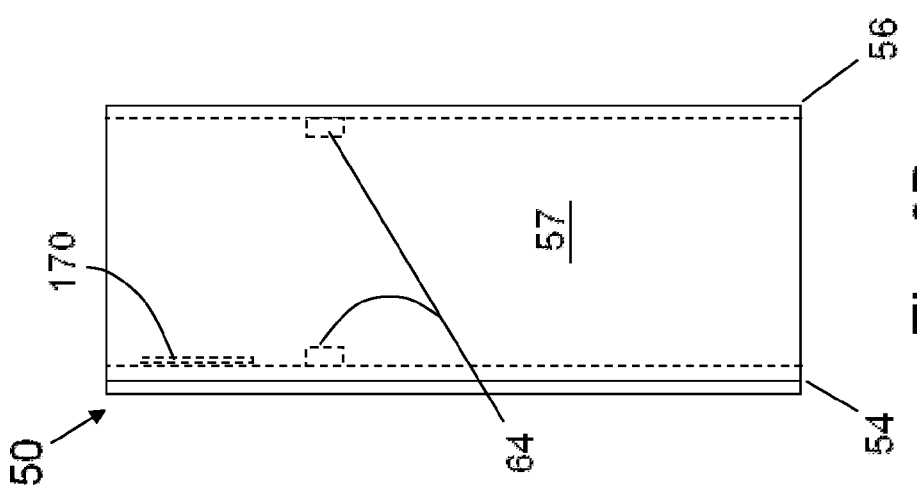
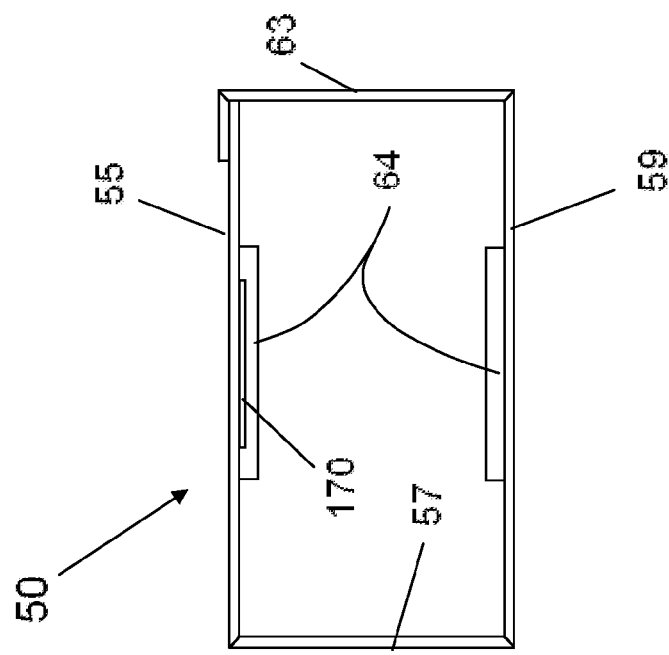

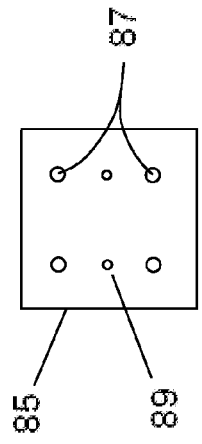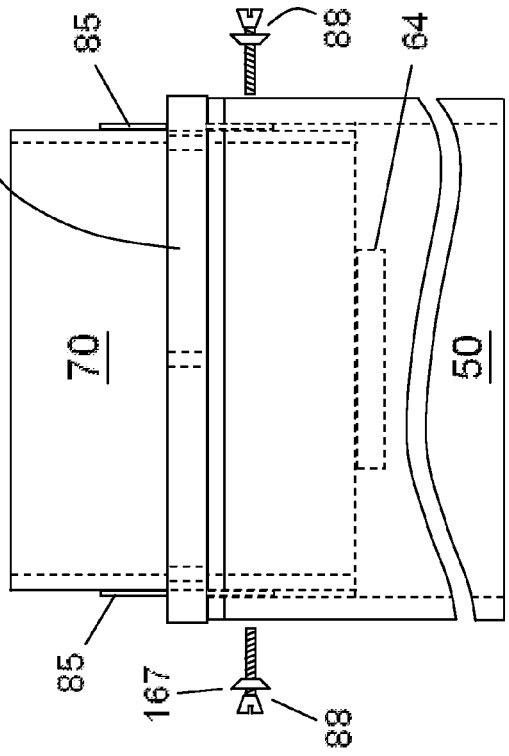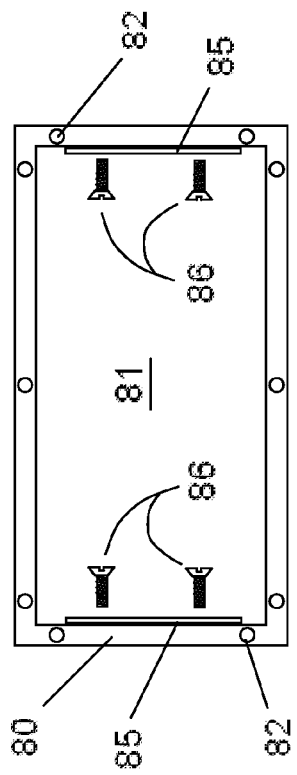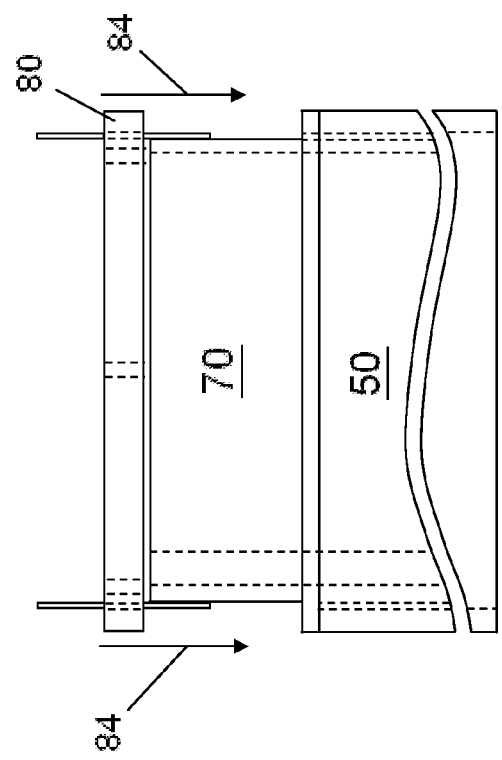

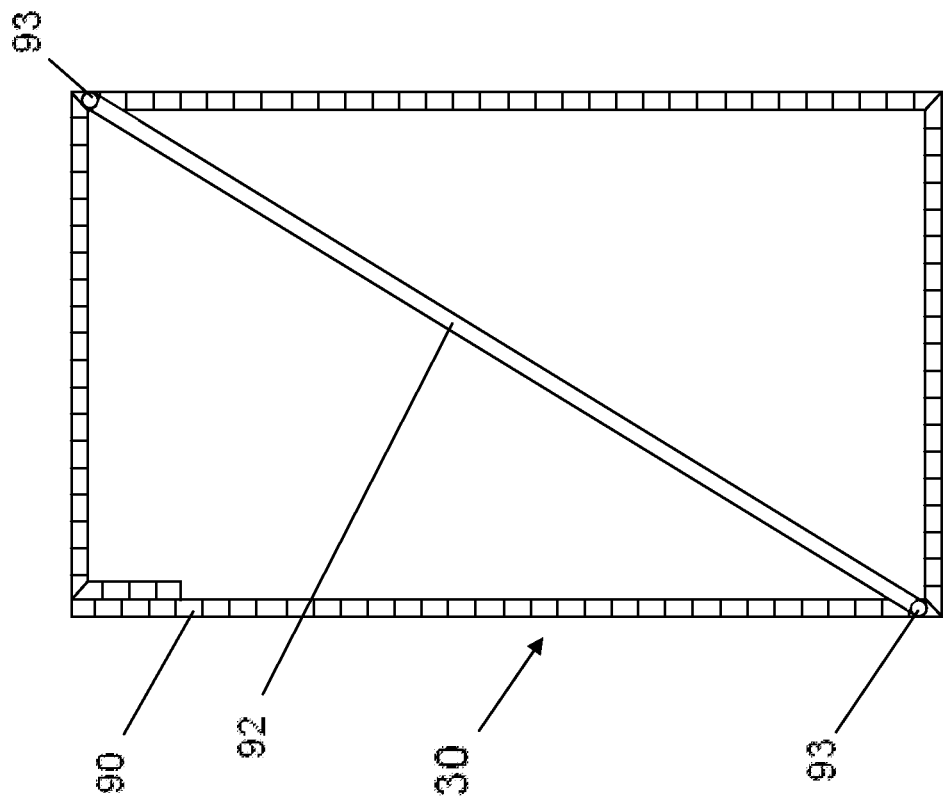
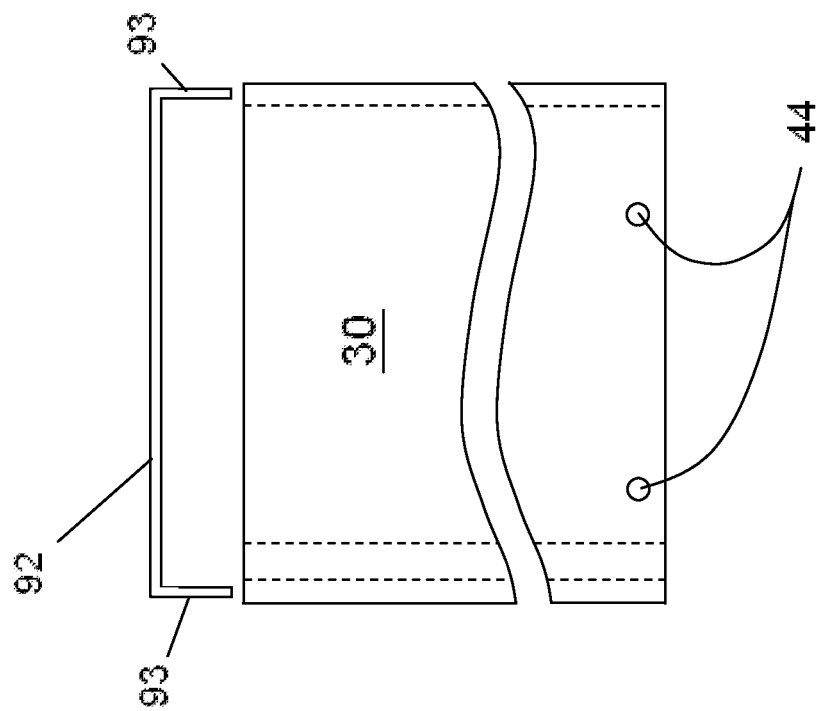
Fig. 14B
Fig. 14A

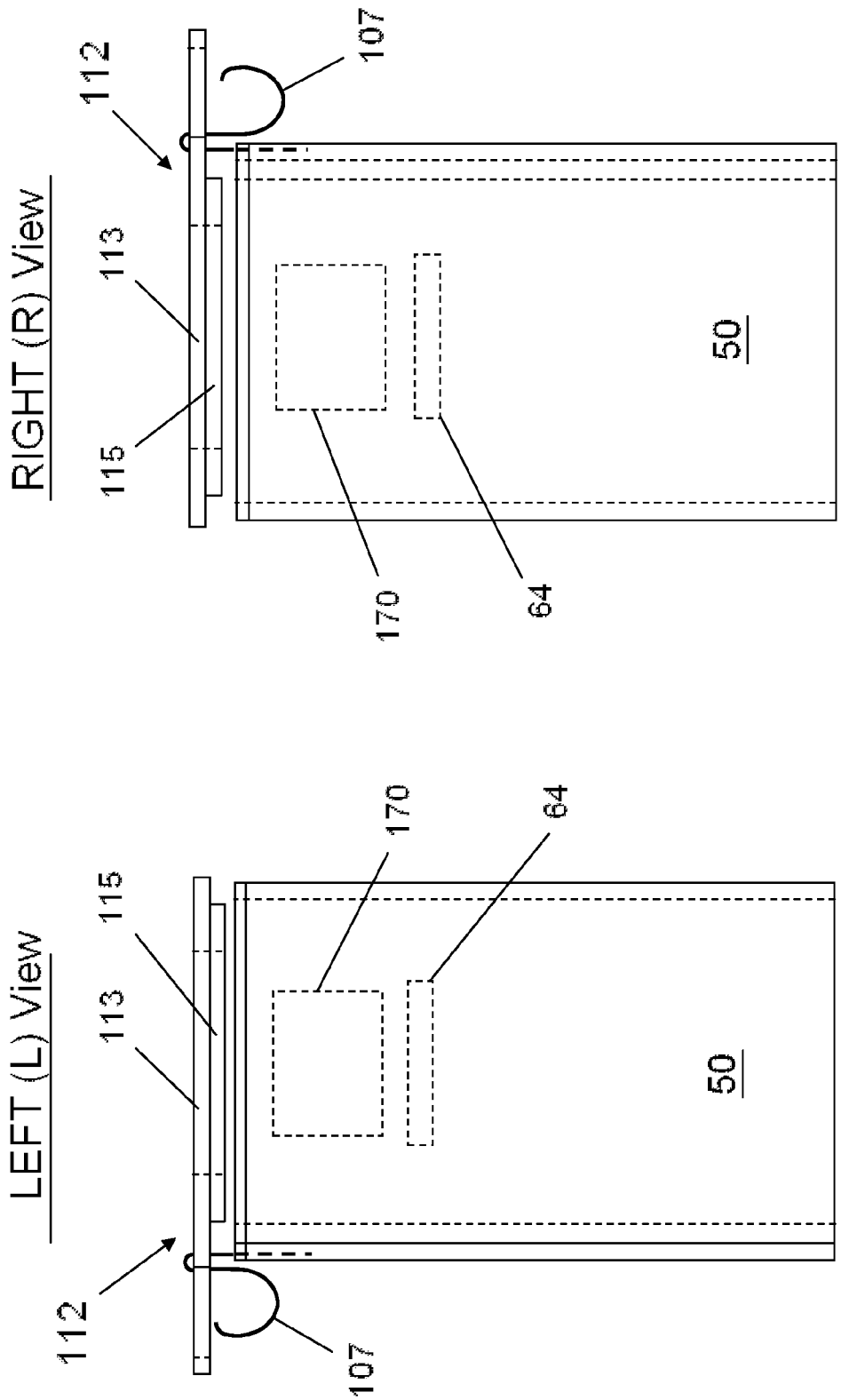

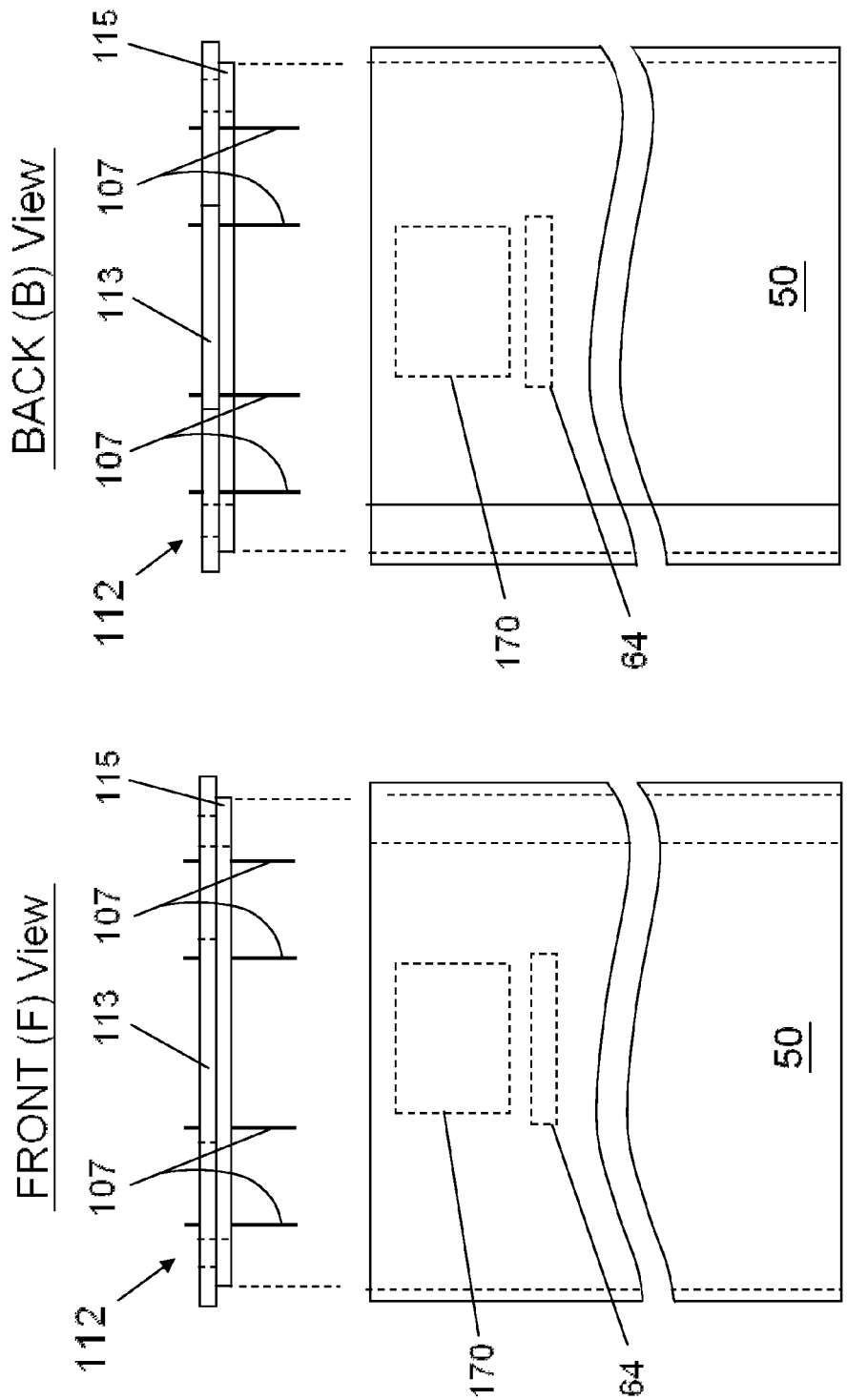

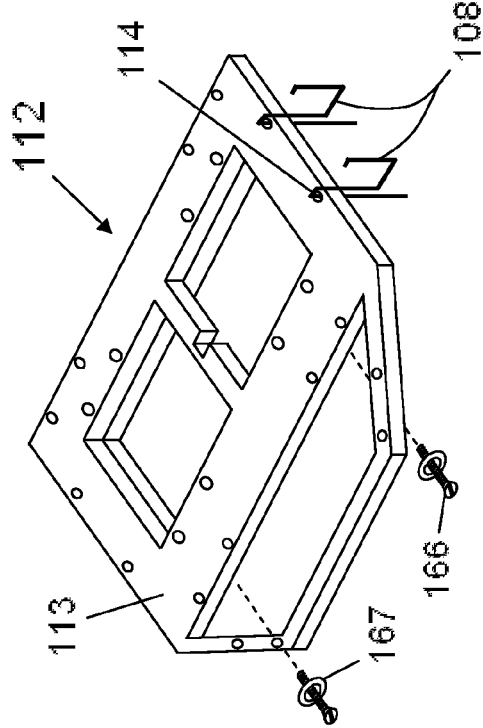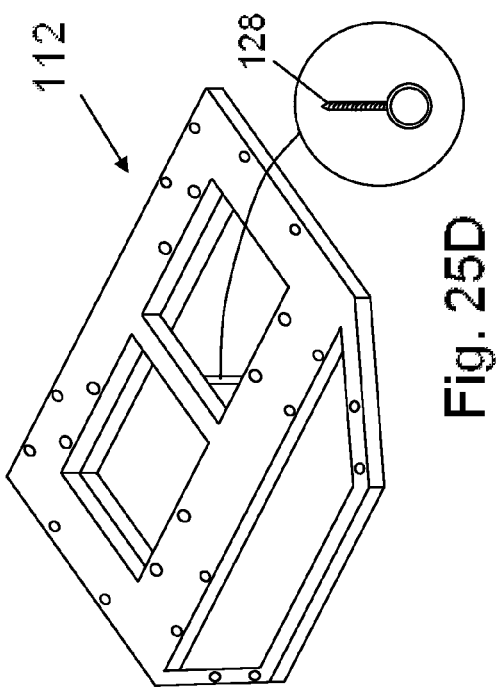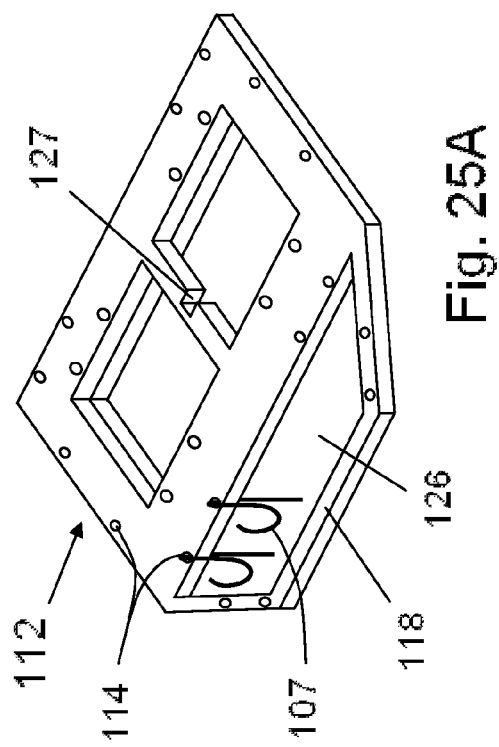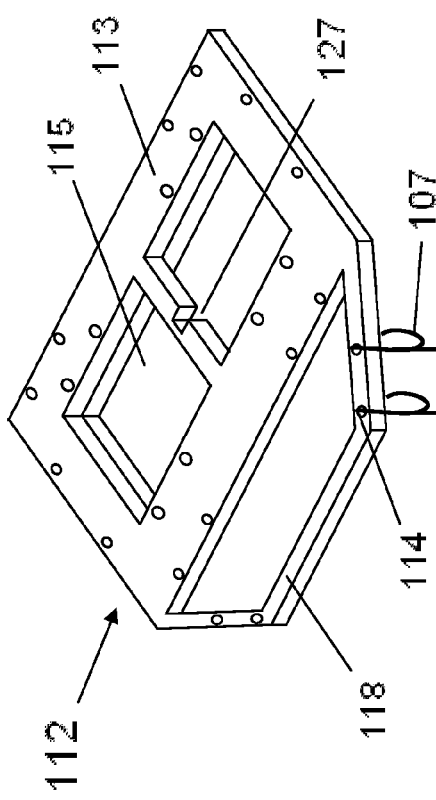

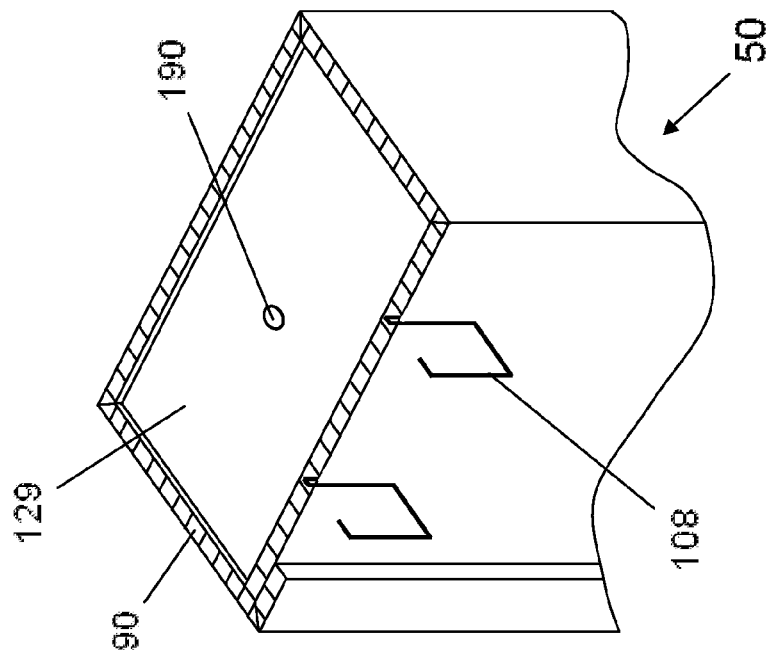
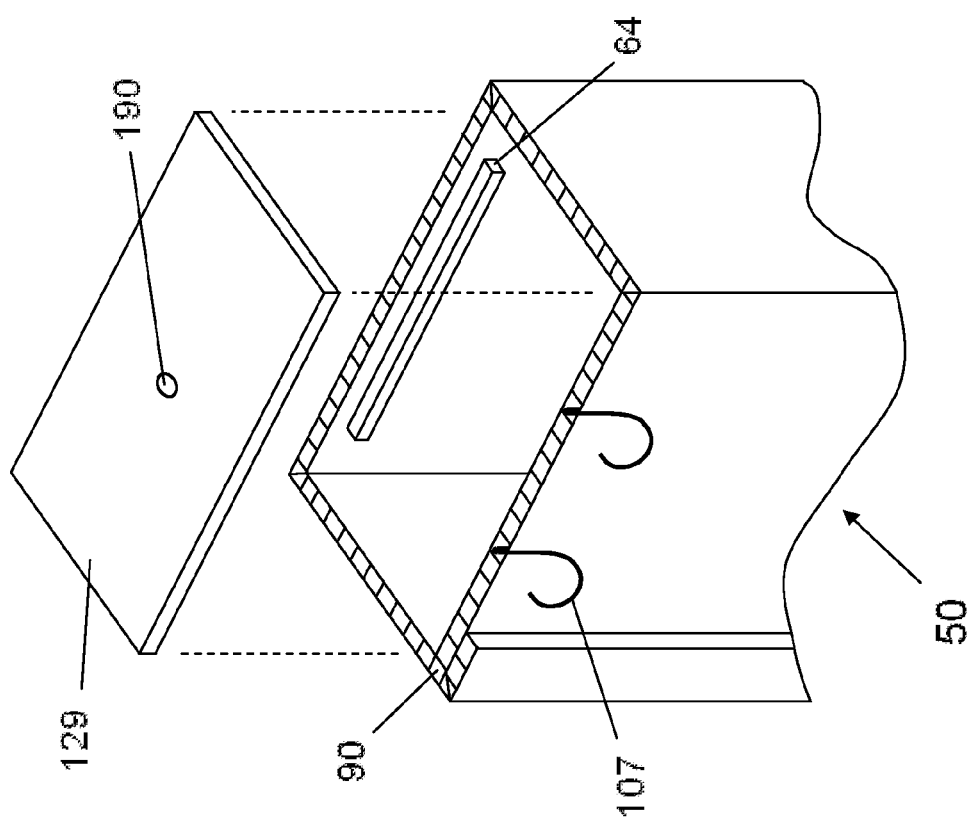
Fig. 26C
Fig. 26B

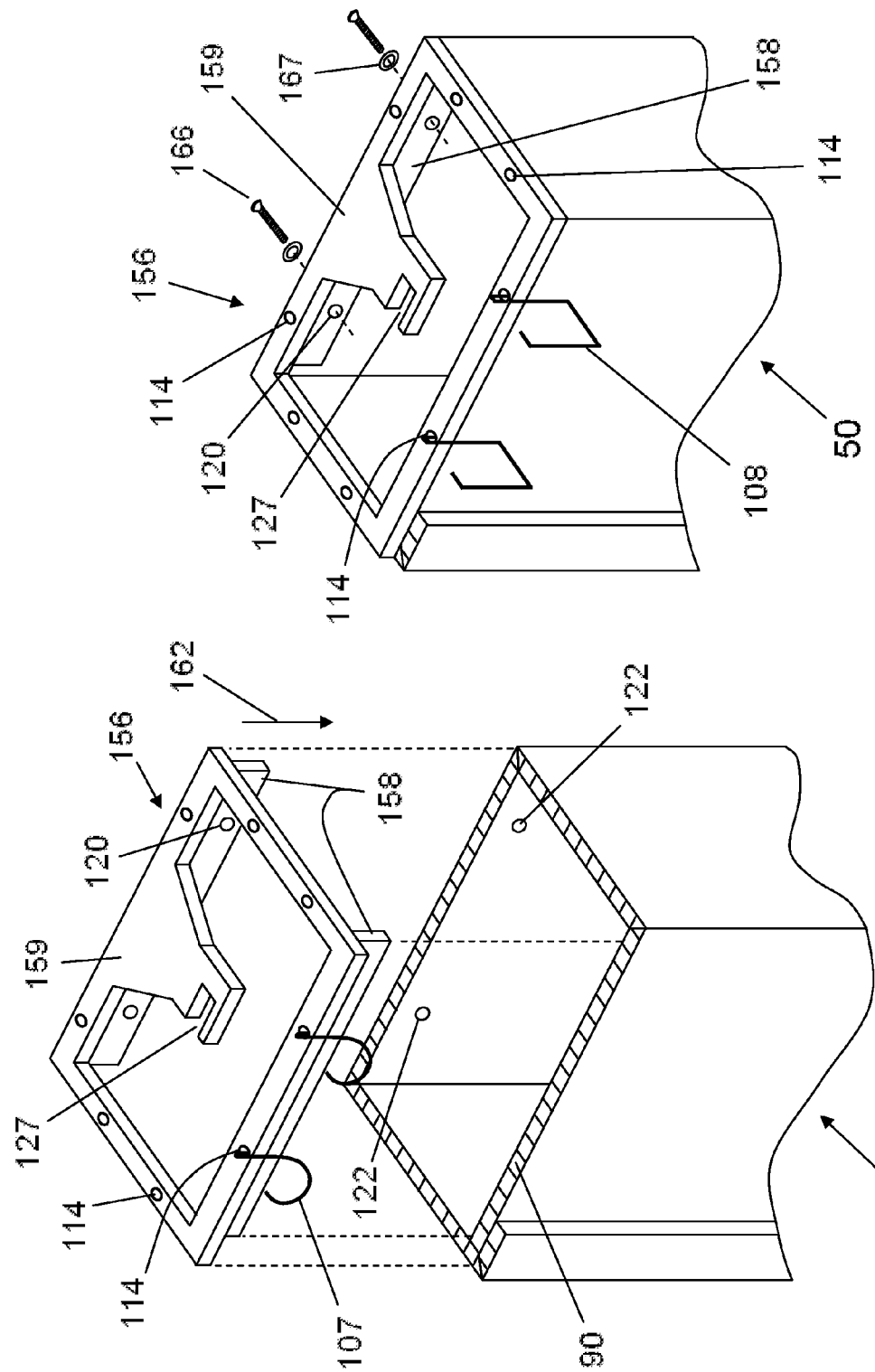

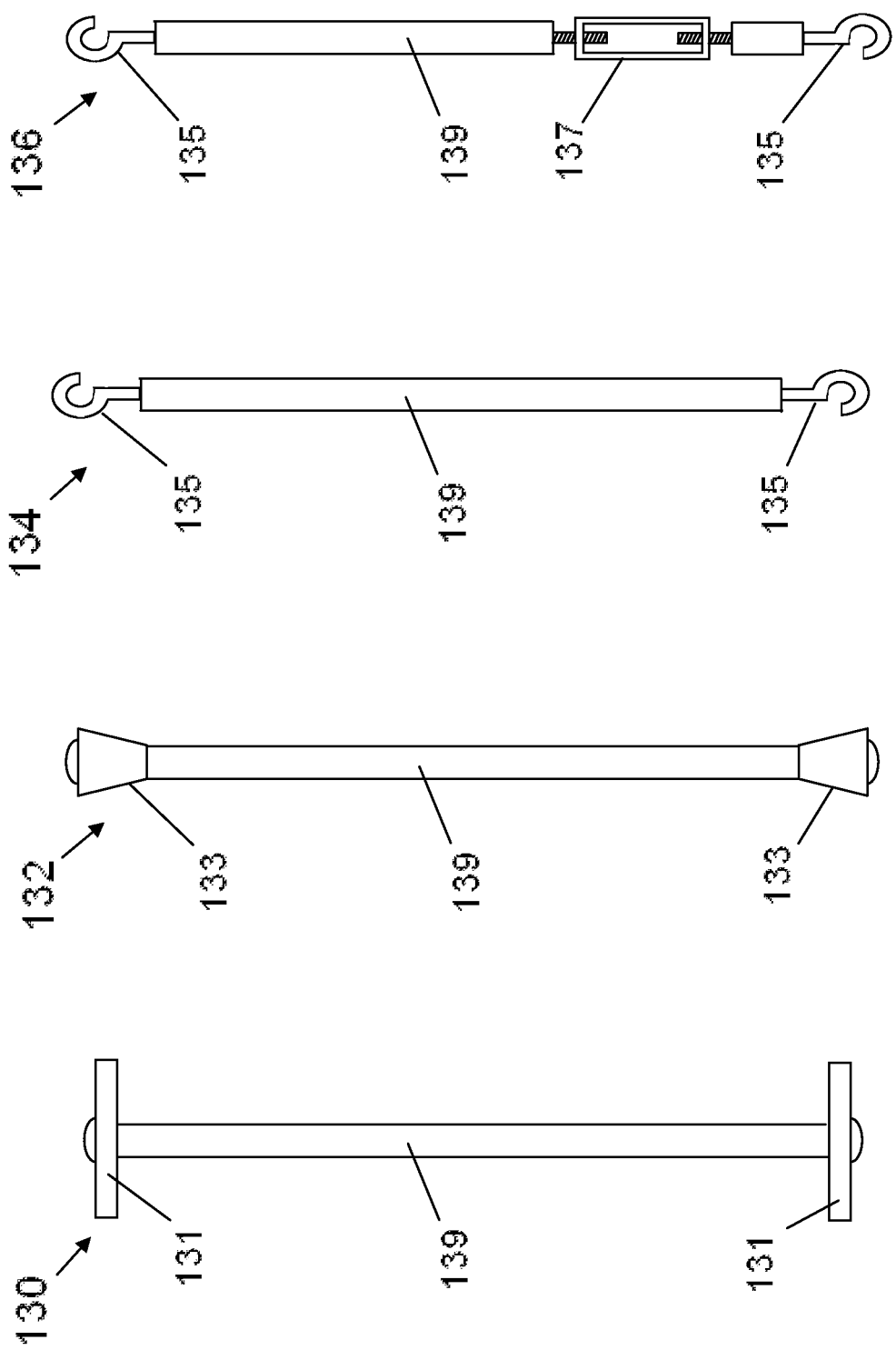

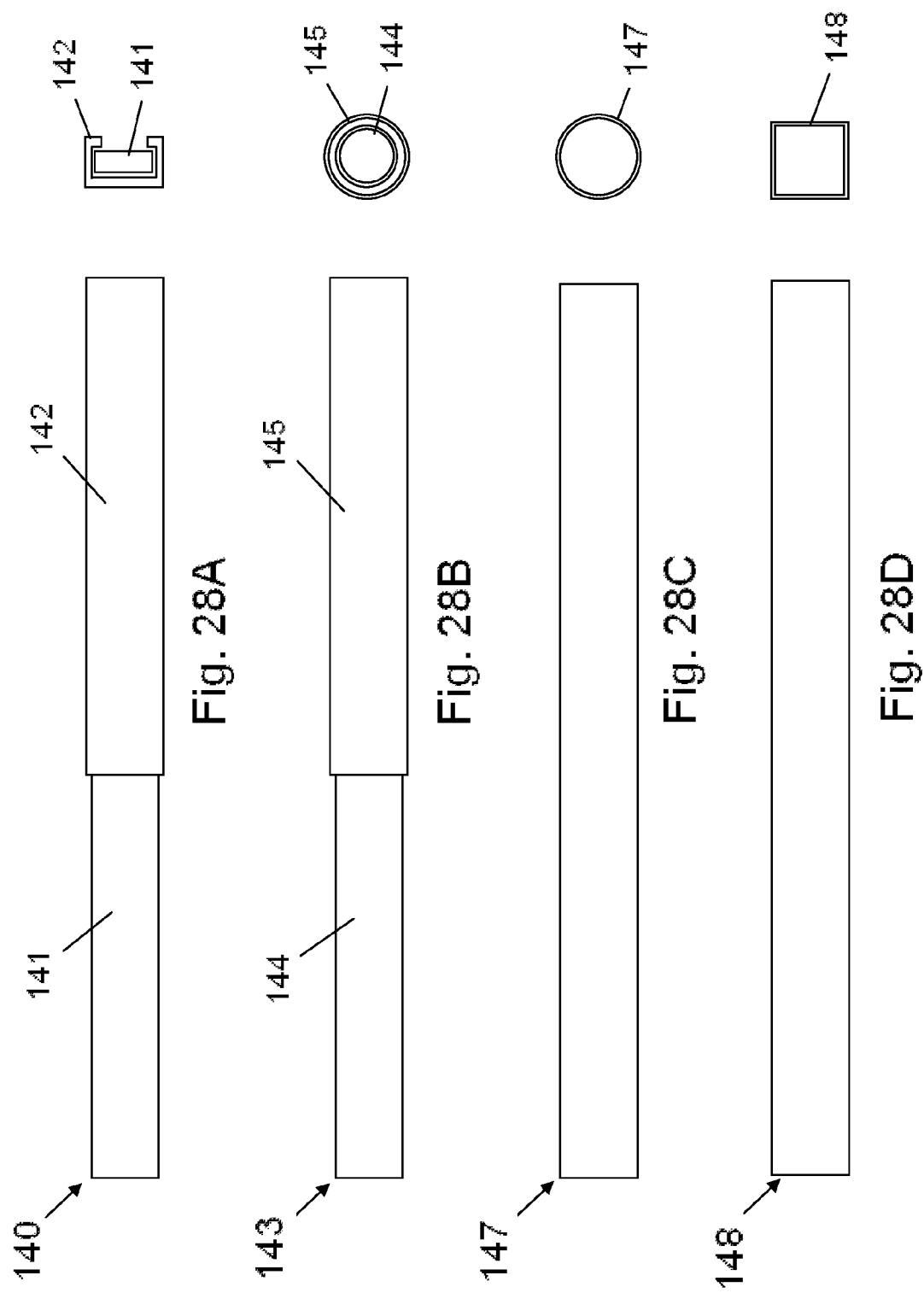

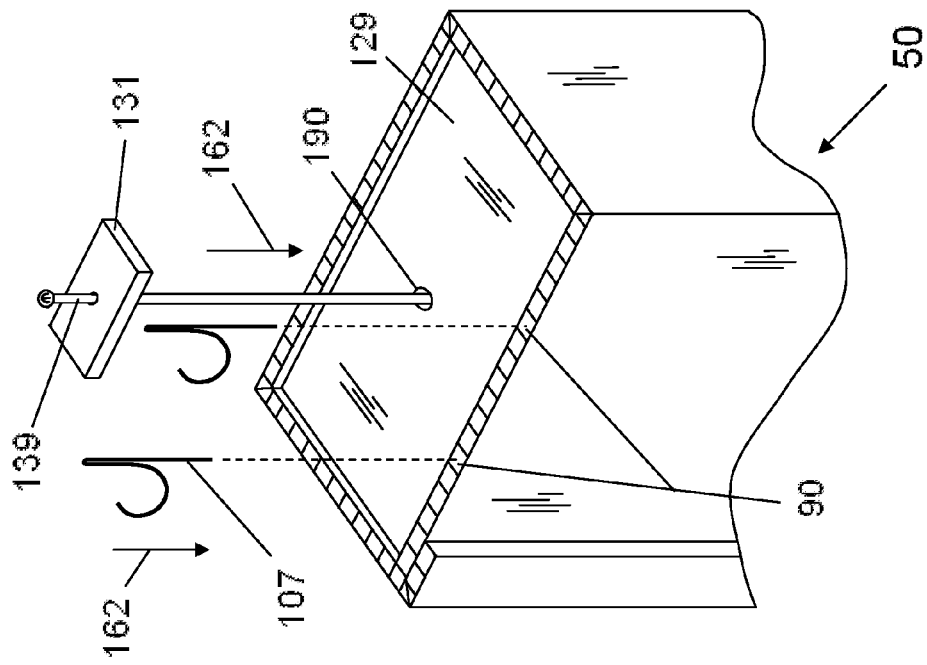
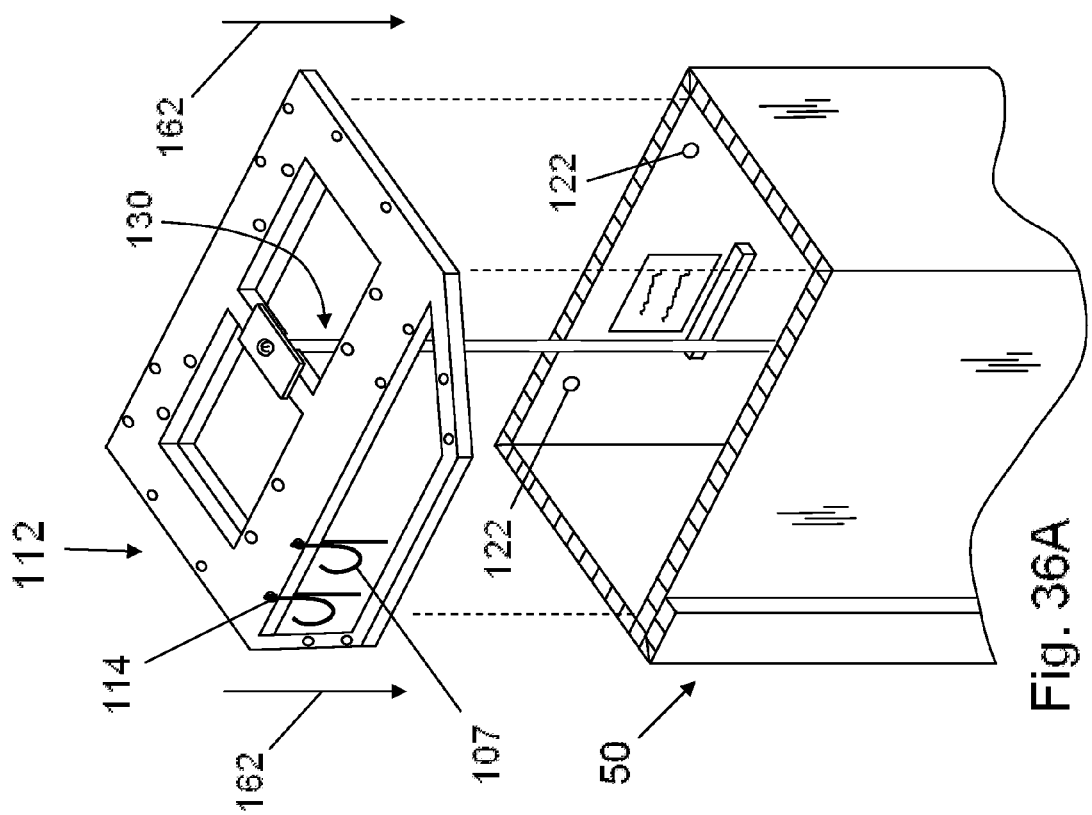

PORTABLE COLLAPSIBLE MODULAR BACKGROUND SET AND METHOD OF USE

CROSS REFERENCES TO RELATED APPLICATIONS

Not applicable.

BACKGROUND

1. Field of Invention

The present embodiment relates generally to free standing columns, connectors, and backdrops, and methods of use. More particularly, the present embodiment relates to easily-assembled, modular background sets for use in broadcast television, theatre stages, tradeshow booths, and the like, and for displays in other settings, such as retail stores, physician's offices, and the like, that is, wherever information needs to be displayed.

2. State of the Art

The background art is characterized by U.S. Pat. Nos. 4,275,520; 4,561,798; 5,125,205; 5,323,836; 5,439,043; 5,537,766; 5,611,384; 5,826,397; 5,903,993; 6,370,803 B1; 6,643,966 B2; 7,140,307 B1; 7,337,567 B2; and 6,359,218 B1; and U.S. Patent Application Nos. 2003/0046893A1; 2004/0107666A1; 2004/0163778A1; and 2005/0034409A1; the disclosures of which patents and patent application are incorporated by reference as if fully set forth herein.

Non-patent background art is characterized on the following Internet pages: http://www.displayit.com/10-ft-Standard-Curved-Popup-Trade-Show-Display.aspx; http://www.siegeldisplay.com/productdetail.aspx?id=t6005-48237; http://www.affordabledisplays.com/shopexd.asp?id=300; and http://www.affordabledisplays.com/shopdisplayproducts.asp?id=40.

SUMMARY OF THE INVENTION

This embodiment provides for a portable, easily-assembled, modular background set that can be used in television studios, theatre stages, and tradeshow booths, to name a few, and for displays in other settings, such as retail stores, physician's offices, and the like, that is, wherever information needs to be displayed. According to this embodiment, an apparatus and method for providing said background set or display comprises a plurality of base structures; a plurality of outer and inner collapsible corrugated plasticboard sleeves; a plurality of supporting frames; a hanger system; an elastic cord stabilizing system; and a collapsible backdrop system. These components are assembled from a very compact, collapsed, disassembled state in a quick and easy manner, with no special tools, to create a professional set or display that can be used in a plurality of different venues.

BRIEF DESCRIPTION OF THE DRAWINGS

FIGS. 2J through 2M show further alternate embodiments of the support base using an additional alternate tension cable connection;

FIGS. 4A, 4B, 4C, 4D, and 4E describe the construction of the base inner sleeve and inner column sleeve of this embodiment;

FIG. 5A is a top view of the base inner sleeve of this embodiment;

FIG. 5B is a left elevation view of the base inner sleeve of this embodiment;

FIG. 5C is a right elevation view of the base inner sleeve of this embodiment;

FIG. 5D is a front elevation view of the base inner sleeve of this embodiment;

FIG. 5E is a back elevation view of the base inner sleeve of this embodiment;

FIGS. 6A, 6B, and 6C describe the method of collapsing the base inner sleeve, and inner column sleeve, of this embodiment, for storage and transport;

FIGS. 8A, 8B, 8C, 8D, and 8E describe the construction of the outer column sleeve of this embodiment;

FIG. 9A is a top view of the outer column sleeve of this embodiment;

FIG. 9B is a left elevation view of the outer column sleeve of this embodiment;

FIG. 9C is a right elevation view of the outer column sleeve of this embodiment;

FIGS. 13A and 13B show the inner column sleeve support frame, and method of use, in this embodiment;

FIGS. 13C and 13D show the optional outer column support bracket, and method of use, in this embodiment;

FIGS. 14A and 14B show an inner column sleeve support rod, and method of use, in this embodiment;

FIG. 23A is a left elevation view of the column top cap ready for installation onto an outer column sleeve in this embodiment;

FIG. 23B is a right elevation view of the column top cap ready for installation onto an outer column sleeve in this embodiment;

FIG. 23C is a front elevation view of the column top cap ready for installation onto an outer column sleeve in this embodiment;

FIG. 23D is a back elevation view of the column top cap ready for installation onto an outer column sleeve in this embodiment;

FIG. 25A is a perspective view of the column top cap with a set of backdrop rod hangers installed in the rear position of this embodiment;

FIG. 25B is a perspective view of the column top cap with a plurality of alternate types of backdrop rod hangers installed in the side position of this embodiment;

FIG. 25C is a perspective view of the column top cap with a plurality of backdrop rod hangers installed in an off-angle position of this embodiment;

FIG. 25D is a perspective view of the column top cap with an alternate tension cable connection used to optionally keep the column aligned during assembly;

FIG. 26B shows a perspective view of the alternate column top cap ready for installation onto an outer column sleeve of this embodiment, and a plurality of backdrop rod hangers installed in the rear flutes of an outer column sleeve in this embodiment;

FIG. 26C shows a perspective view of the alternate column top cap installed onto an outer column sleeve of this embodiment, and a plurality of alternate backdrop rod hangers installed in the rear flutes of an outer column sleeve in this embodiment;

FIG. 26D shows a perspective view of an additional column top cap ready for installation onto an outer column sleeve of this embodiment, and a plurality of backdrop rod hangers installed in rear apertures of the additional column top cap in this embodiment;

FIG. 26E shows a perspective view of an additional column top cap installed in an outer column sleeve of this embodiment, and a plurality of alternate backdrop rod hangers installed in rear apertures of the additional column top cap in this embodiment;

FIG. 27A shows a side view of a tension cable optionally used in this embodiment;

FIG. 27B shows a side view of an alternate tension cable optionally used in this embodiment;

FIG. 27C shows a side view of an additional embodiment of a tension cable optionally used in this embodiment;

FIG. 27D shows a side view of an optional adjustable tension cable optionally used in this embodiment;

FIG. 28A shows a front and side elevation view of an adjustable backdrop rod in this embodiment;

FIG. 28B shows a front and side elevation view of an alternate embodiment of an adjustable backdrop rod in this embodiment;

FIG. 28C shows a front and side elevation view of a fixed backdrop rod in this embodiment;

FIG. 28D shows a front and side elevation view of an alternate embodiment of a fixed backdrop rod in this embodiment;

FIG. 36A describes the installation of a column top cap, with installed backdrop rod hangers, onto an outer column sleeve in this embodiment;

FIG. 36B describes the installation of an alternate column cap top, along with a plurality of backdrop rod hangers positioned to install into an outer column sleeve in this embodiment;

DETAILED DESCRIPTION

One Embodiment—FIGS. 1-27, and FIG. 39

Figure 1:
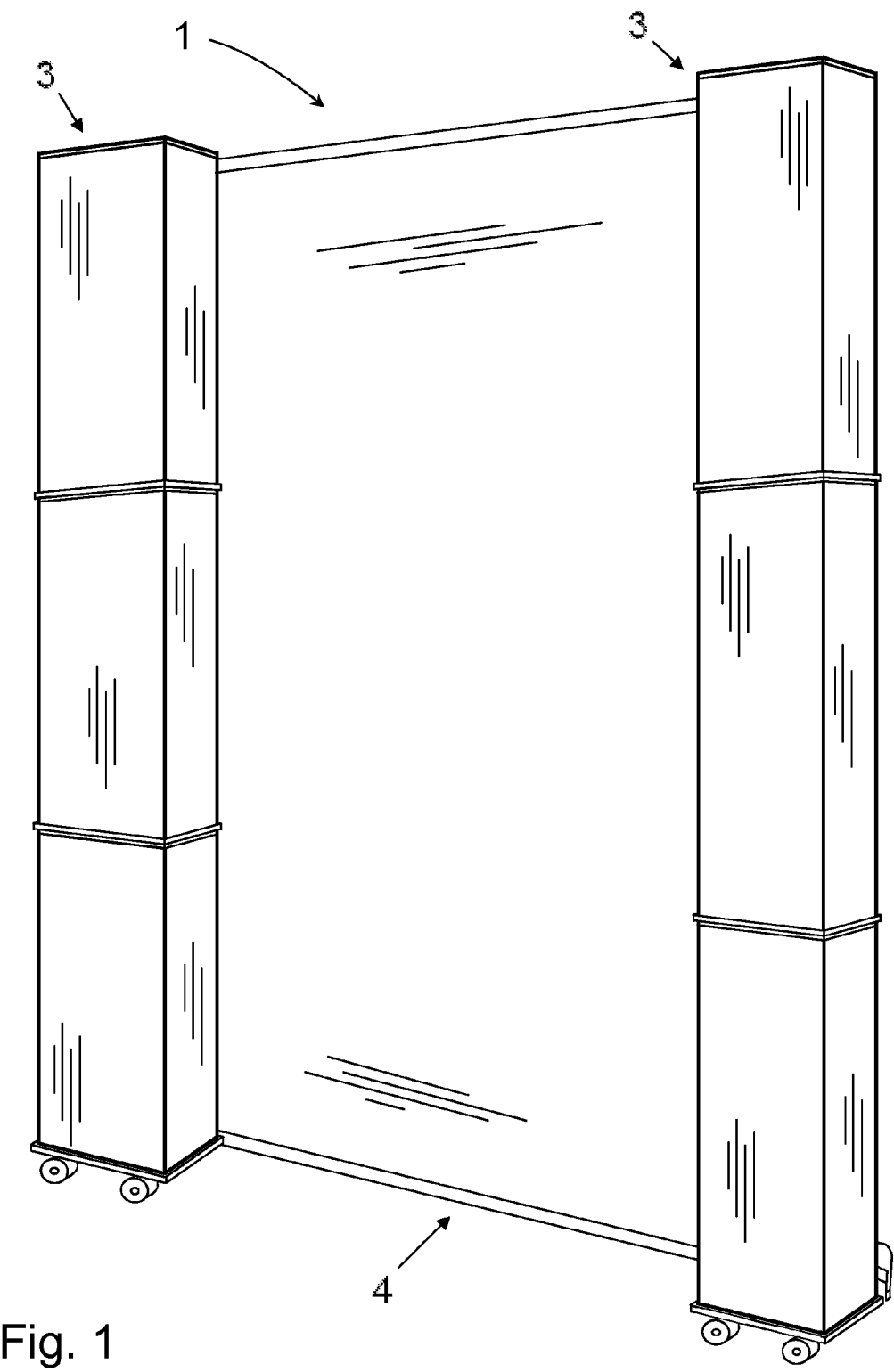
FIG. 1 shows a perspective view of one embodiment in its assembled state.
Figure 44:
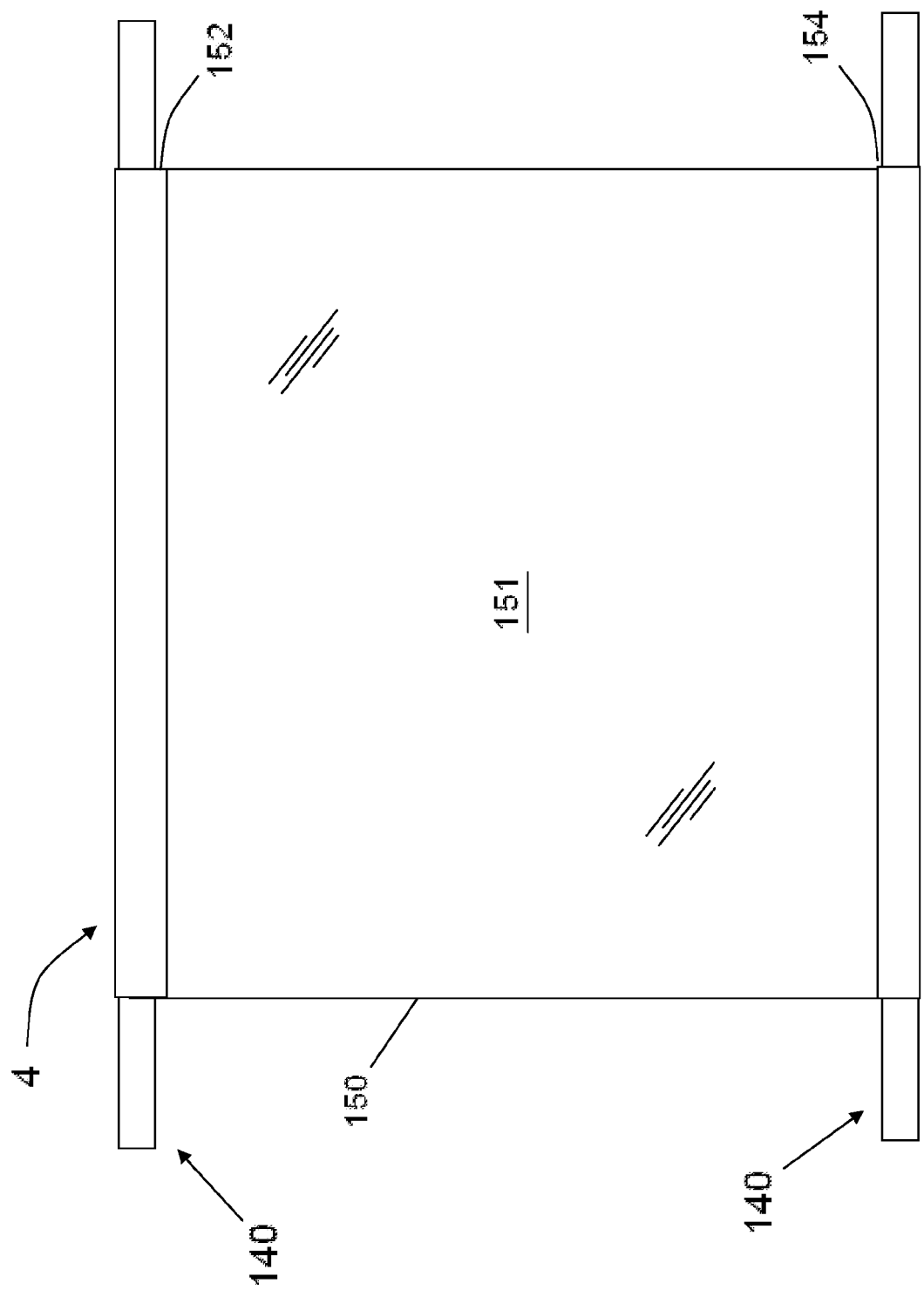
FIG. 44 shows one embodiment of a backdrop assembled with a backdrop upper support rod, a backdrop, and a backdrop lower support rod in this embodiment.

With reference now to the drawings, FIG. 1 through FIG. 28 (A, B, C, and D), and FIG. 44, illustrate the components of one embodiment. As shown in FIG. 1, in this embodiment, a modular background set 1 consists of a plurality of completed columns 3 and a backdrop assembly 4.

As seen in FIG. 2 through FIG. 27 (A, B, C, and D), column 3 is comprised of a support base assembly 5, a base inner sleeve 30, a plurality of outer column sleeves 50, a plurality of inner column sleeves 70, a plurality of inner sleeve support frames 80, a plurality of curved backdrop rod hangers 107, a column top cap 112, and a tension cable 130.

Turning now to FIGS. 2A through 2G, support base assembly 5 is comprised of a support base 6, a column wall attachment assembly 7, and a plurality of casters 20. For this embodiment, support base 6 and attachment assembly 7 are preferably made from a cellular (closed cell) utility polymer sheet material, such as King StarLite® XL, available from Piedmont Plastics in Memphis, Tenn., using conventional machining methods, such as cutting or milling. King StarLite® XL is available in a variety of thicknesses and colors. For this embodiment Utility Black StarLite® XL was used with various thicknesses. Alternatively, support base 6 and attachment assembly 7 may be made from other durable materials, such as other plastics, wood, metal, or other materials, using alternative manufacturing processes such as injection molding, wire electrical discharge machining (wire EDM); chemical etching machining; abrasive water jet machining; or laser machining, e.g., Stereolithography (SLA), Selective Laser Sintering (SLS), or laser cutting; to name a few.

Figure 2A:
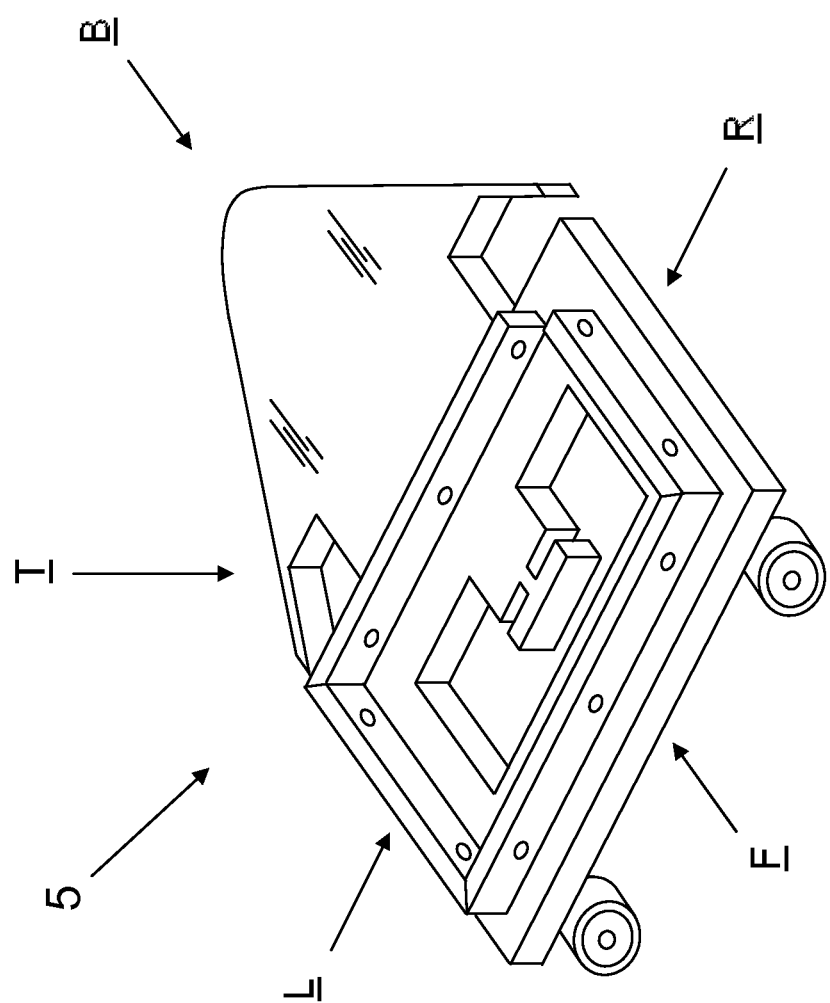
FIG. 2A is a perspective view of the support base of each column of this embodiment.
Figure 2B:
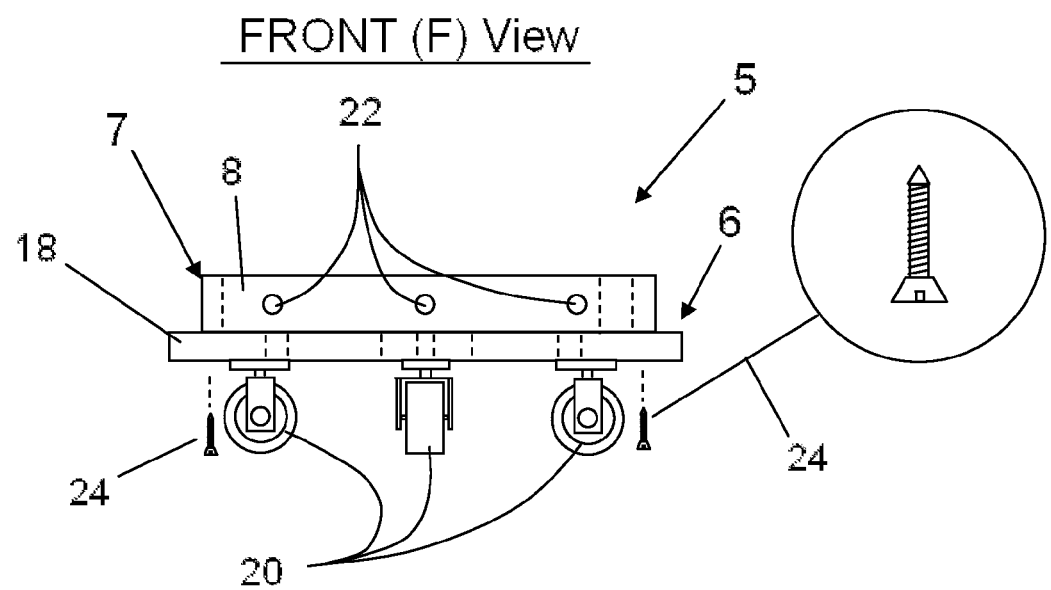
FIG. 2B is a front elevation view of the support base of this embodiment.
Figure 2C:
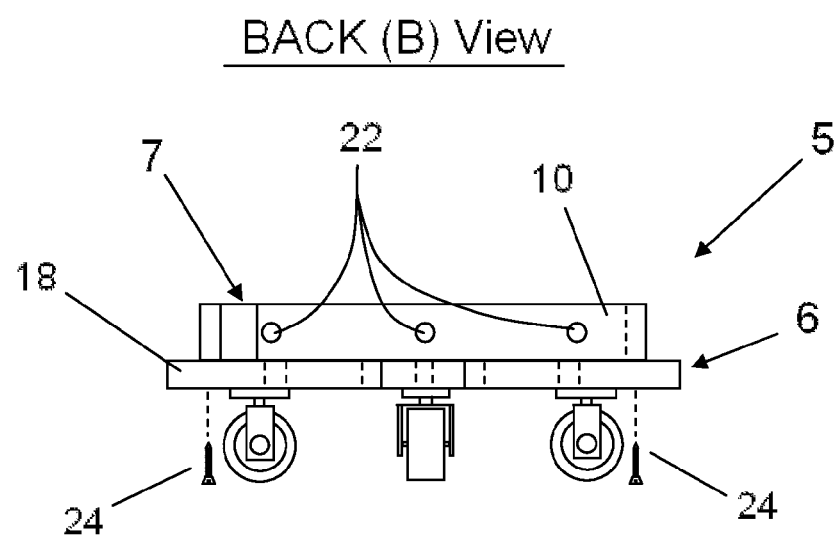
FIG. 2C is a back elevation view of the support base of this embodiment.
Figure 2D:
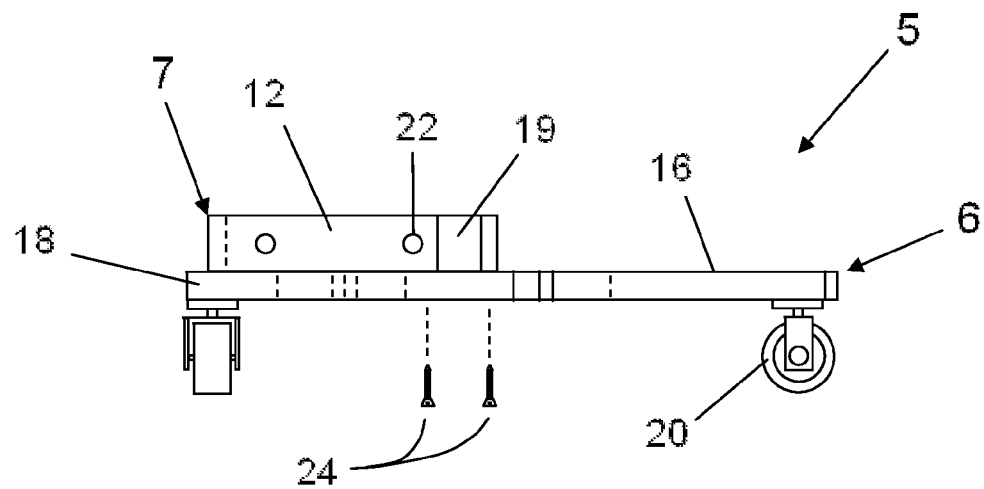
FIG. 2D is a right elevation view of the support base of this embodiment.
Figure 2E:
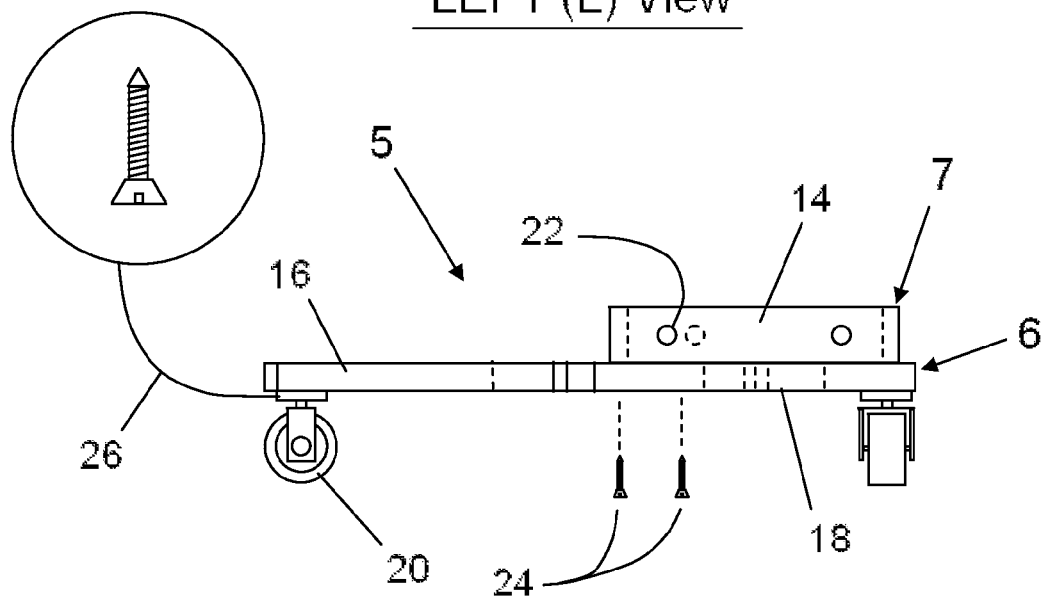
FIG. 2E is a left elevation view of the support base of this embodiment.
Figure 2F:
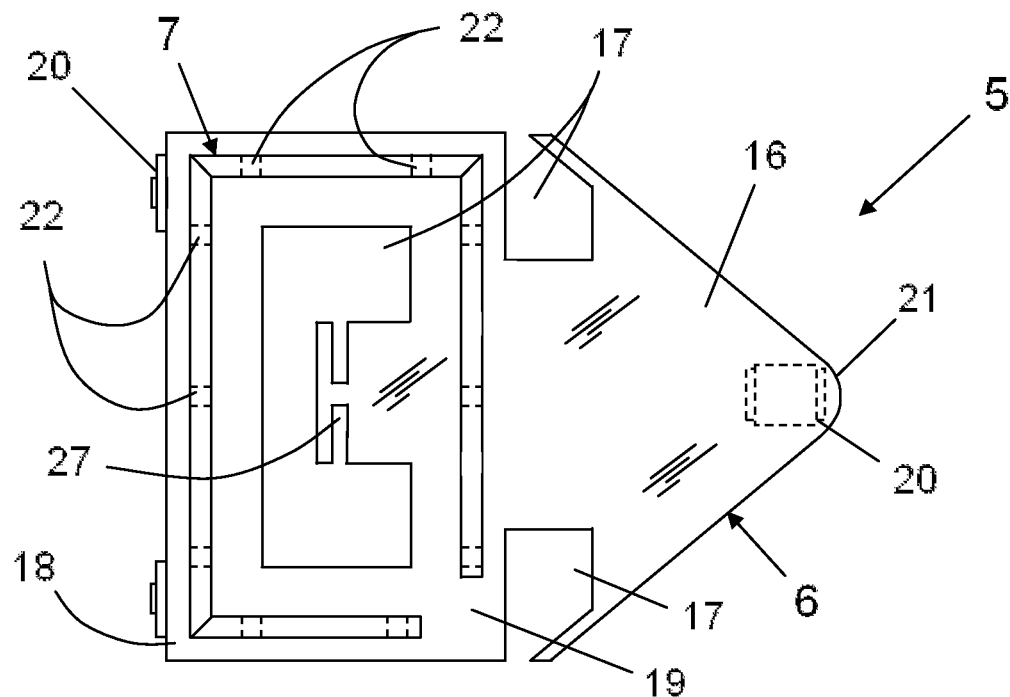
FIG. 2F is a top view of the support base of this embodiment.
Figure 2G:
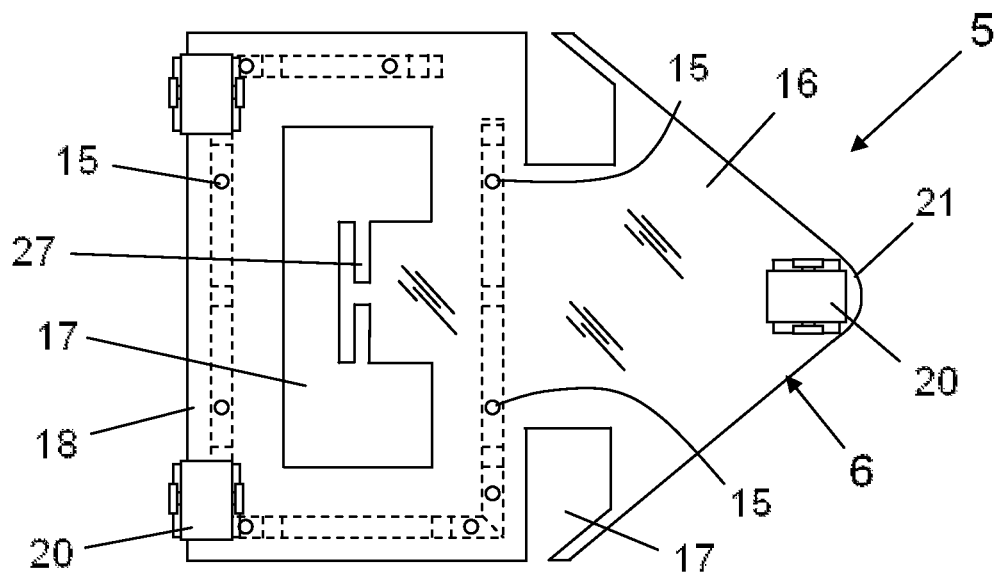
FIG. 2G is a bottom view of the support base of this embodiment.
Figure 2H:
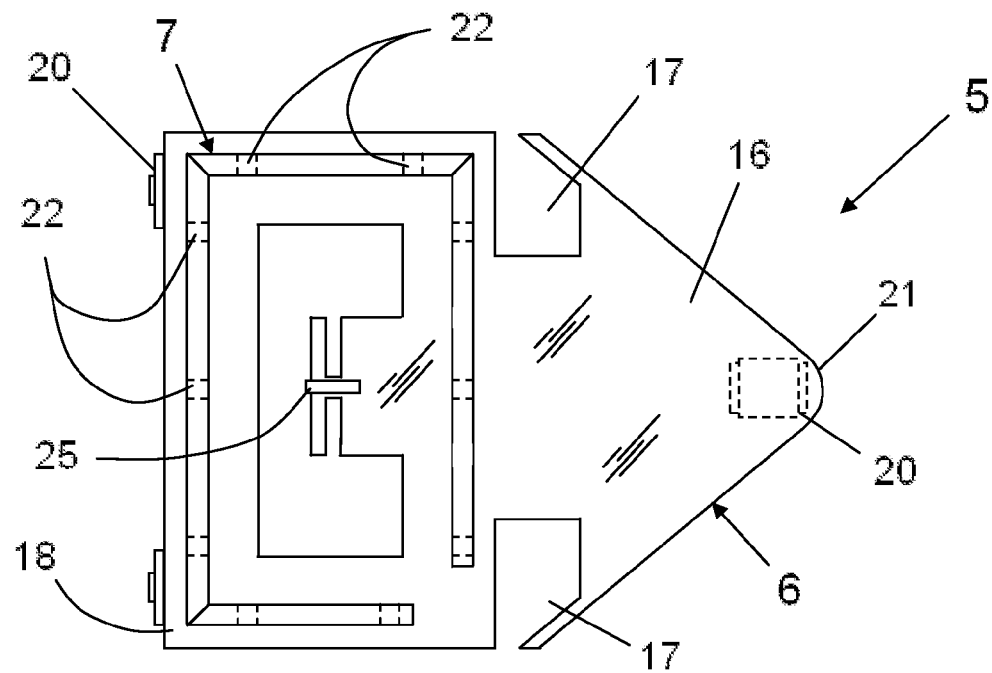
FIG. 2H is a top view of an alternate tension cable connection used to keep the column aligned during assembly.
Figure 2I:
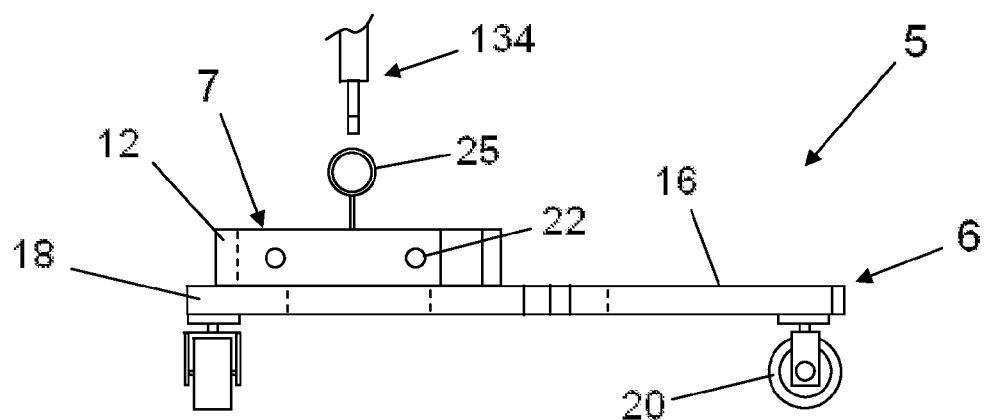
FIG. 2I is a right elevation view of the alternate tension cable connection used to keep the column aligned during assembly.

In this embodiment support base 6 measures 17.125-inches wide by 15.125-inches deep with a thickness of 0.5-inches. As shown in FIGS. 2F and 2G, support base 6 includes a plurality of cutout slots 17 intended to reduce the weight of support base assembly 5 to enhance its portability, although cutout slots 17 may be omitted without disrupting the functionality. Support base assembly 5 may be further described by two subsections: a footpad section 16, which is also used as a counterweight, and a column support section 18, which provides support for the assembled column components. In this embodiment footpad section 16 is shown with a rounded shape 21 to: facilitate further weight reduction; enhance the portability; and provide an ergonomic appearance; although footpad section 16 could be machined to other shapes without disrupting the functionality. Column support section 18 further includes a lower tension cable slot 27, used to keep the column aligned during assembly (described in a later section of the Specification). In an alternate embodiment, as shown in FIGS. 2H and 2I, column support section 18 includes a lower tension hook 25, which engages the top surface of column support section 18, and is subsequently used to keep the column aligned during assembly (described in a later section of the Specification). Lower tension hook 25 preferably has a ⅜-inch eye hook opening with a 2-inch long, #8 wood screw shaft, and is available from Aubuchon Hardware, Putnam, Conn., P/N Model #130-08915, although other eye sizes and shaft lengths will suffice.

As shown in FIGS. 2B through 2G, wall attachment assembly 7 is comprised of a plurality of attachment supports: a front attachment wall 8; a back attachment wall 10; a right attachment wall 12; and a left attachment wall 14. In the current embodiment attachment walls 8, 10, 12 and 14 measure 0.625-inches thick and 1.5-inches high. Front attachment wall 8 measures 15.6-inches long; back attachment wall 10 measures 14.35-inches long; right attachment wall 12 measures 5.0-inches long; and left attachment wall 14 measures 6.3-inches long. Note that other thicknesses, heights and lengths could be used. Attachment walls 8, 10, 12 and 14 attach to column support section 18 using a plurality of attachment wall fasteners 24. In the current embodiment, attachment wall fasteners 24 are 1-inch long, #6 wood screws, P/N 87906137, available from MSC Industrial Supply, located in Melville, N.Y., which are inserted through a plurality of attachment wall fastener apertures 15 and subsequently engage attachment walls 8, 10, 12 and 14 to securely fasten them to column support section 18, although attachment walls 8, 10, 12 and 14 could be attached to column support section 18 using a variety of other attachment means, such as adhesive, nails, etc. Attachment walls 8, 10, 12 and 14 also have a plurality of support base fastener apertures 22, with diameters measuring 0.2-inches in the current embodiment, although support base fastener apertures 22 may be threaded to accept machine threaded screws or bolts, such as a #6-32 size. Support base fastener apertures 22 are used in the assembly of this embodiment's column, to be detailed later in the Specification. As seen in FIG. 2F, a support base attachment wall gap 19 also provides a space needed in the assembly of this embodiment's column, as detailed later in the Specification.

Lastly, casters 20 are attached to the bottom surface of support base 6. In the current embodiment, three 2.25-inch diameter swivel casters, such as a Nylon hooded plate, twin wheel caster, P/N 24215T46, available from McMaster-Carr Supply Company, located in Atlanta, Ga., are attached to support base 6 using a plurality of caster fasteners 26 (FIG. 2E), such as a 0.625-inch inch long, #8 wood screws, P/N 87906269, available from MSC Industrial Supply, although other fasteners may be used to attach casters 20 to support base 6, such as bolt-nut combinations, rivets, etc. Additionally, pop-out, socket-mounted casters may be used whereby the wheel can be removed when not in use, further adding to the portability of this embodiment. Alternately, base 5 may not need to be on casters, and thus other components, such as Easy-Slide Glides, P/N 2551T36 from McMaster Carr, of Atlanta, Ga., may be used instead, allowing the completed column 3 to be moved by sliding it on a surface.

Finally, FIGS. 2J through 2M show alternate shapes of support base assembly 5, which enhance this embodiment's ergonomic appearance, without disrupting the functionality. That is, support base assembly 5 can be designed in a variety of configurations to meet special requirements of different installation environments.

Figure 3:
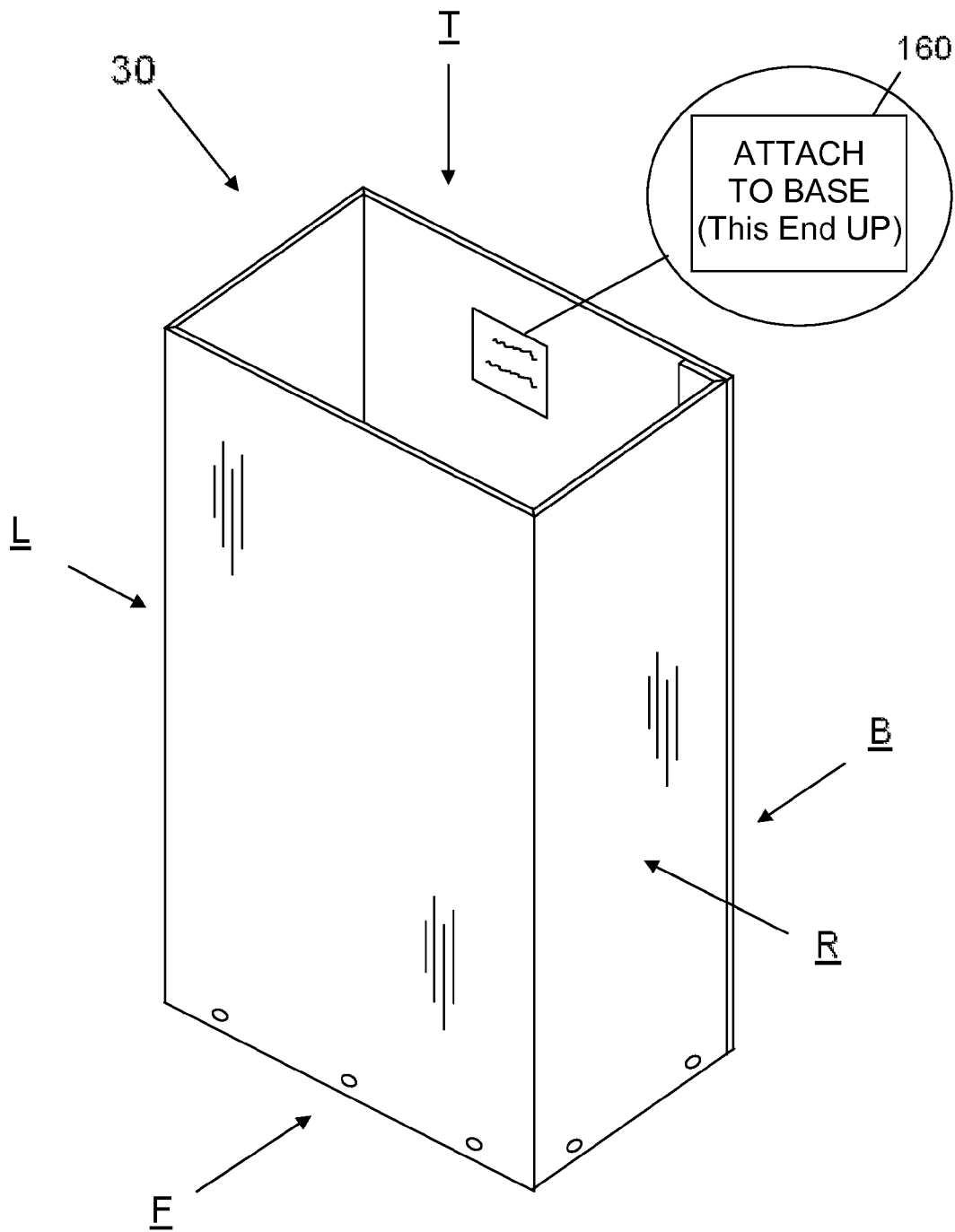
FIG. 3 is a perspective view of the base inner sleeve of this embodiment.

Turning now to FIGS. 3; 4A to 4E; 5A to 5E; and 6A to 6C; base inner sleeve 30 is preferably made from corrugated plastic sheets, commonly referred to as Coroplast®, available from Coroplast, Inc. of Dallas, Tex., although other types of corrugated material may be used, such as corrugated fiberboard, corrugated cardboard, etc. Coroplast® is available in a variety of lengths, widths, thicknesses and colors. For this embodiment base inner sleeve 30 is constructed from 5/32-inch (4-mm) thick Coroplast® in a JM Gray Utility Gray color, although other thicknesses and colors may be used. Turning now to FIG. 3, in the present embodiment, base inner sleeve 30 measures 15.9-inches wide by 6.625 inches deep by 15-inches high (outside dimensions). As shown in FIGS. 4A through 4E, and FIGS. 5A through 5E, base inner sleeve 30 is formed from an initial corrugated plastic sheet 32 with dimensions of 47-inches (L) by 15-inches (W) by 5/32-inch thick. A back surface 35, with an outside dimension of 15.9 inches, is formed by implementing a first inner sleeve bend 34. First inner sleeve bend 34 is facilitated by scoring/cutting the inside surface of back surface 35 at the position of the bend. A left surface 37, with an outside dimension of 6.625 inches, is formed by implementing a second inner sleeve bend 36. Second inner sleeve bend 36 is facilitated by scoring/cutting the inside surface of left surface 37 at the position of the bend. A front surface 39, with an outside dimension of 15.9 inches, is formed by implementing a third inner sleeve bend 38. Third inner sleeve bend 38 is facilitated by scoring/cutting the inside surface of front surface 39 at the position of the bend. As shown in FIG. 4D, an adhesive 40, such as a 3M® double-sided foam tape, P/N 00021200232053, available from MSC Industrial Supply, with a 1-inch width, is applied along the total height of corrugated plastic sheet 32 to a tab attachment area 41. Adhesive 40 can also be of another type, such as Velcro® strips, epoxy, etc. A right surface 43, with an outside dimension of 6.625 inches, is formed by implementing a fourth inner sleeve bend 42. Fourth inner sleeve bend 42 is facilitated by scoring/cutting the inside surface of right surface 43 at the position of the bend. Fourth inner sleeve bend 42 also places tab attachment area 41, with a width of 1.95 inches, in a position to complete the formation of base inner sleeve 30 by pressing the inside of back surface 35 against adhesive 40 (see FIG. 4E). Once base inner sleeve 30 is constructed, a first instruction label 160, with an adhesive backing, is attached to the center of the inside surface of back surface 35 approximately 1-inch from the top of base inner sleeve 30. First instruction label 160 may contain several types of information including installation instructions, part numbers, etc. Turning now to FIGS. 5A through 5E, in the present embodiment, base inner sleeve 30 includes a plurality of base inner sleeve attachment apertures 44, measuring 0.25" in diameter in the current embodiment, although other diameters would suffice, which are used with support base fastener apertures 22 in the assembly of this embodiment's column 3. Optionally, a rubber grommet, such as a McMaster Carr Part #9307K38, with a 0.25-inch ID, a 0.625-inch OD, and a panel thickness of 3/16-inches, can be installed in apertures 44 to add support during assembly and disassembly. Additionally, base inner sleeve 30 further includes an access aperture 49, measuring 5-inches in width by 5-inches in height, which is located in the center of back surface 35, and 1-inch from the bottom of base inner sleeve 30. Access aperture 49 is used during the assembly of column 3, as described later in the Specification. FIGS. 6A, 6B and 6C demonstrate the collapsibility, and thus portability, of this embodiment of base inner sleeve 30. In FIG. 6A, base inner sleeve 30 is shown in its expanded state, and ready for assembly. As shown in FIG. 6B, base inner sleeve 30 is collapsed by apply a plurality of collapsing forces 45, which in turn cause front surface 39 and right surface 43 to align in a first collapsing direction 46, and left surface 37 and back surface 35 to align in a second collapsing direction 48, resulting in a collapsed, two surface configuration as shown in FIG. 6C. In this embodiment, the 6.625 inch deep base inner sleeve 30 is reduced to about 0.5-inches depth after it is collapsed, making for very easy storage and transportation in a small box, suitcase, or similar enclosure.

Figure 7:
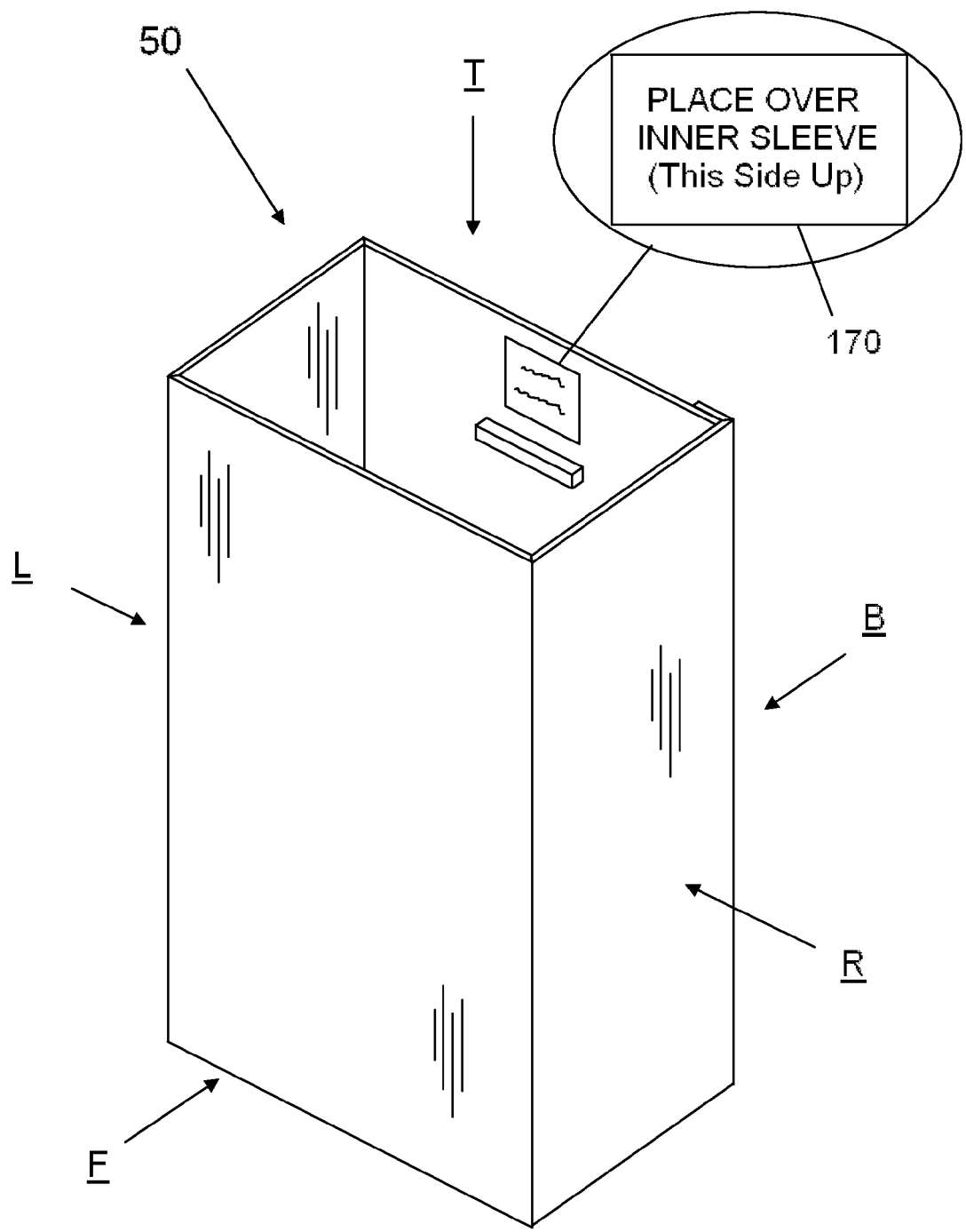
FIG. 7 is a perspective view of the outer column sleeve of this embodiment.
Figure 8E:
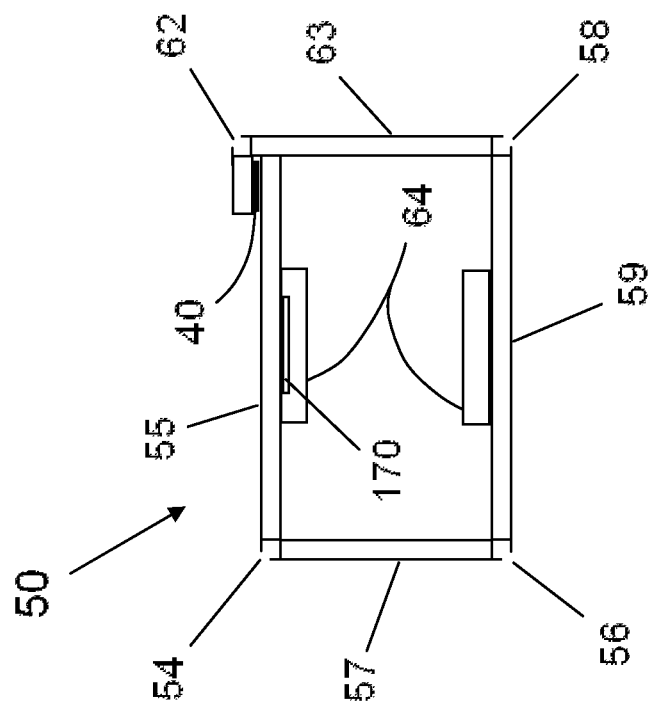
Figure 8D:
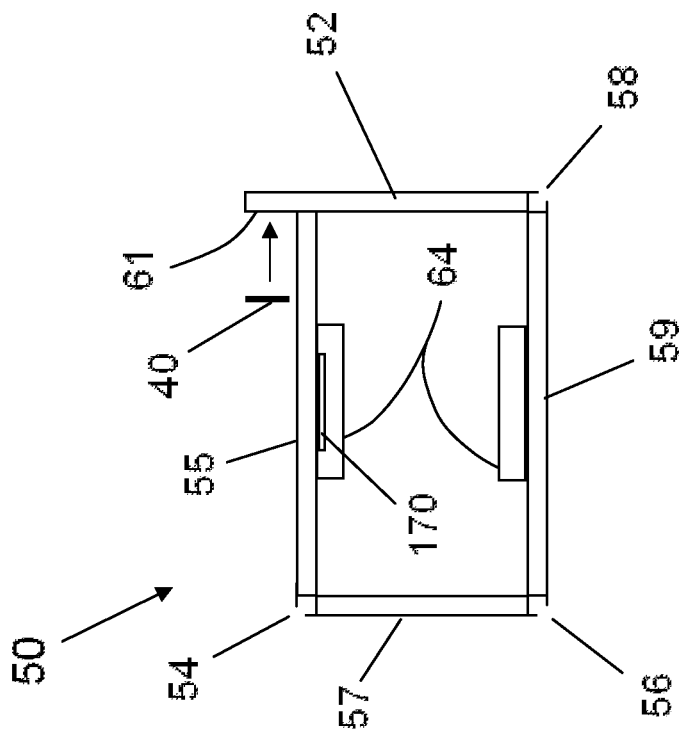
Figure 9E:
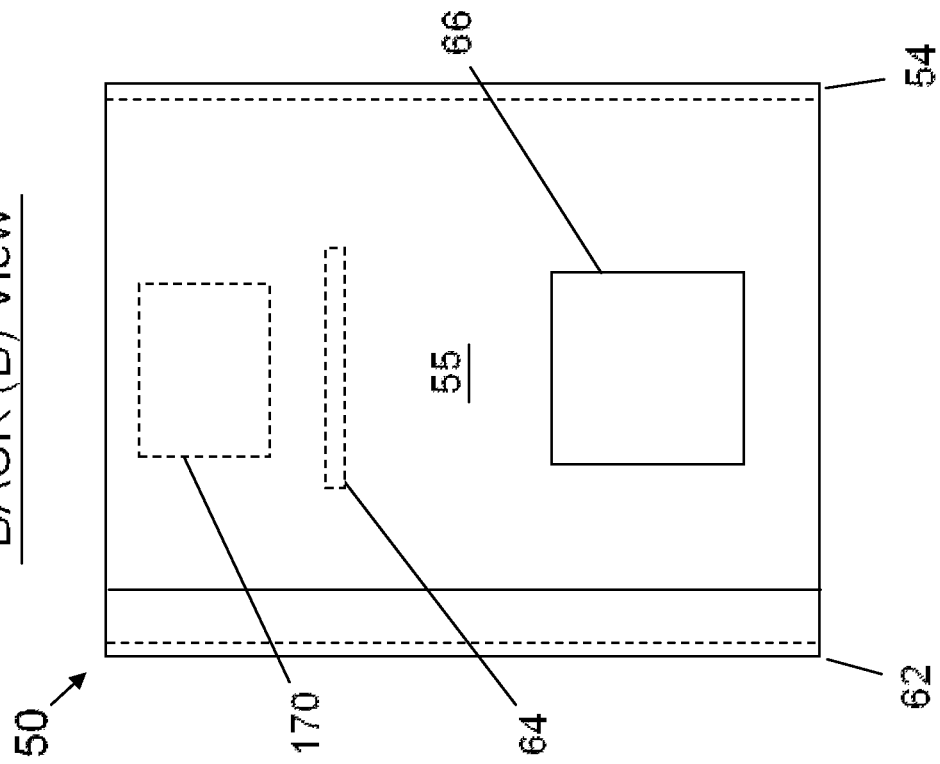
FIG. 9E is a back elevation view of the outer column sleeve of this embodiment.
Figure 9D:
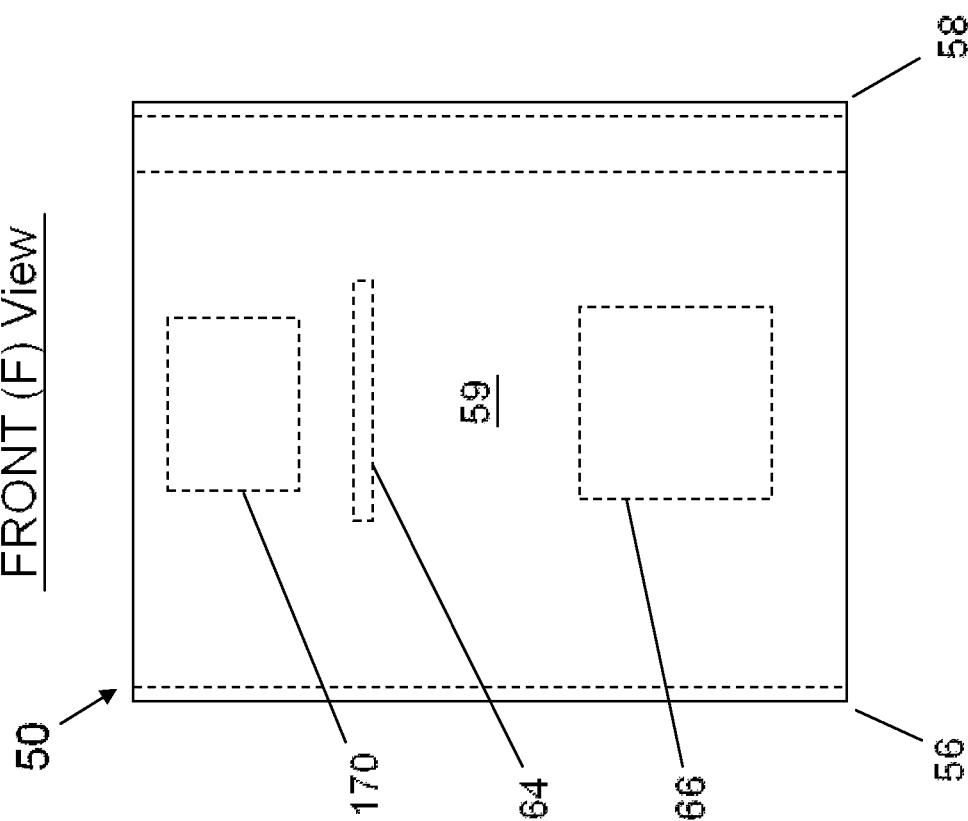
FIG. 9D is a front elevation view of the outer column sleeve of this embodiment.
Figure 10C:
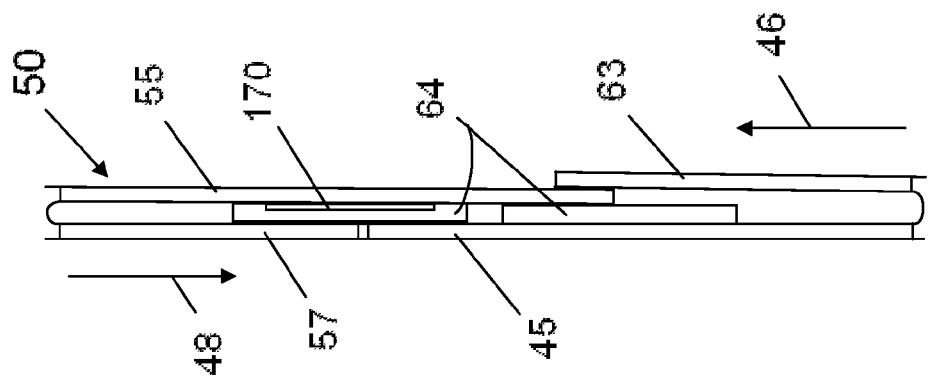
FIGS. 10A, 10B, and 10C describe the method of collapsing the outer column sleeve of this embodiment, for storage and transport.
Figure 10B:
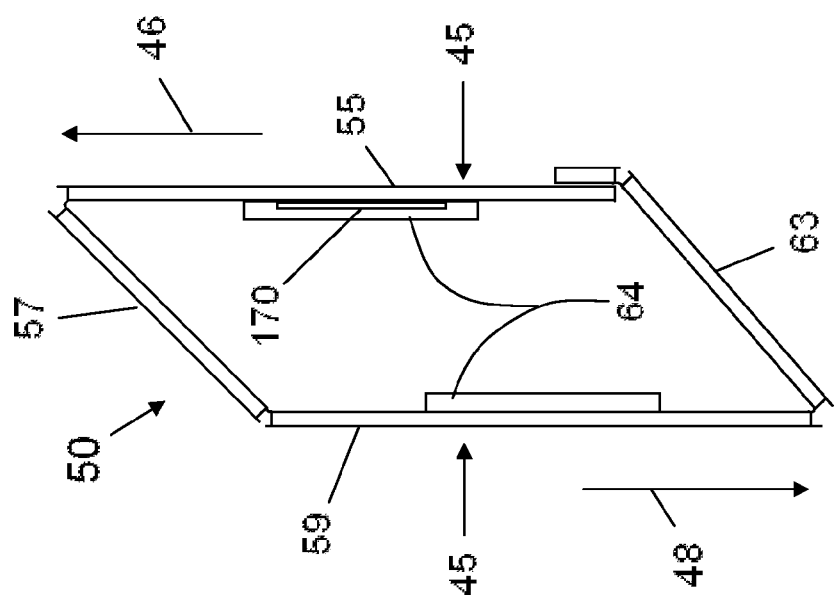
Figure 10A:
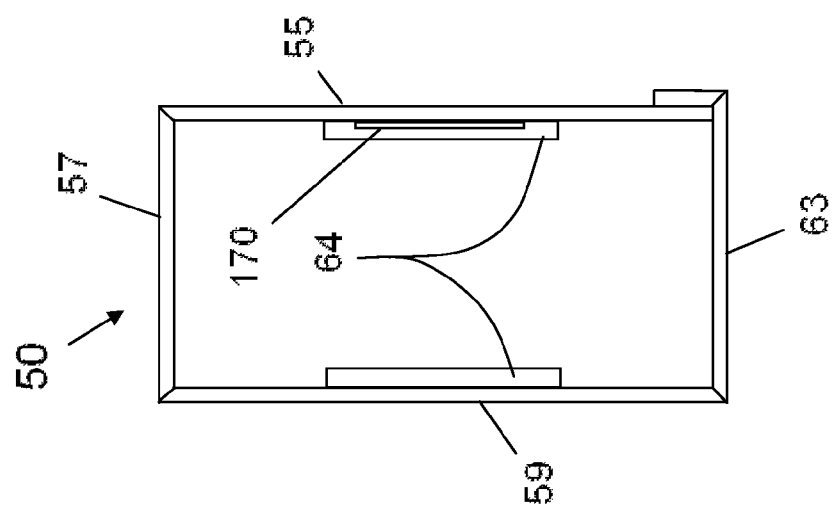

Turning now to FIGS. 7; 8A to 8E; 9A to 9E; and 10A to 10C; outer column sleeve 50 is preferably made from corrugated plastic sheets, commonly referred to as Coroplast®, although other types of corrugated material may be used, such as corrugated fiberboard, corrugated cardboard, etc. For this embodiment outer column sleeve 50 is constructed from 5/32-inch (4-mm) thick Coroplast® in a JM Utility Gray color, although other thicknesses and colors may be used. Turning now to FIG. 7, in the present embodiment, outer column sleeve 50 measures 16.5-inches wide by 7.0 inches deep by 31.5-inches high (outside dimensions). As shown in FIGS. 8A through 8E, and FIGS. 9A through 9E, outer column sleeve 50 is formed from an outer corrugated plastic sheet 52 with dimensions of 48-inches (L) by 31.5-inches (W) by 5/32-inch thick. An outer sleeve back surface 55, measuring 16.5 inches, is formed by implementing a first outer sleeve bend 54. First outer sleeve bend 54 is facilitated by scoring/cutting the outside surface of outer sleeve back surface 55 at the position of the bend. Once first outer sleeve bend 54 is made, an inner sleeve support shelf 64, measuring 1-inch high by 6.5-inches long by 0.50-inches thick, and comprised of a self-adhesive, extruded polystyrene foam laminated between clay-coated paper liners (often called foam core board, P/N PSFB-700, available from FoamBoardSource.com) is centered and attached approximately 5-inches from the top of the inside of outer sleeve back surface 55. Alternatively, a foam core board without self-adhesive could be used by applying a double-sided adhesive tape, epoxy, or some other type of attachment means. Additionally, other lightweight, but sturdy, materials could be used for inner sleeve support shelf 64. An outer sleeve left surface 57, measuring 7.0 inches, is formed by implementing a second outer sleeve bend 56. Second outer sleeve bend 56 is facilitated by scoring/cutting the outside surface of outer sleeve left surface 57 at the position of the bend. An outer sleeve front surface 59, measuring 16.5 inches, is formed by implementing a third outer sleeve bend 58. Third outer sleeve bend 58 is facilitated by scoring/cutting the outside surface of outer sleeve front surface 59 at the position of the bend. Once third outer sleeve bend 58 is made, a second inner sleeve support shelf 64 is centered and attached approximately 5-inches from the top of the inside of outer sleeve front surface 59. As shown in FIG. 8D, adhesive 40 is applied along the total height of outer corrugated plastic sheet 52 to an outer sleeve tab attachment area 61. An outer sleeve right surface 63, measuring 7.0 inches, is formed by implementing a fourth outer sleeve bend 62. Fourth outer sleeve bend 62 is facilitated by scoring/cutting the outside surface of outer sleeve right surface 63 at the position of the bend. Fourth outer sleeve bend 62 also places outer sleeve tab attachment area 61, with a width of 1.0 inch, in a position to complete the formation of outer column sleeve 50 by pressing outer sleeve back surface 55 against adhesive 40, as shown in FIG. 8E. Turning now to FIGS. 9A to 9E, once outer column sleeve 50 is constructed, a second instruction label 170, with an adhesive backing, is attached to the center of the inside surface of outer sleeve back surface 55 approximately 1-inch from the top of outer column sleeve 50, and just above inner sleeve support shelf 64. Second instruction label 170 may contain several types of information including installation instructions, part numbers, etc. Additionally, outer column sleeve 50 further includes an outer sleeve access aperture 66, measuring 5-inches in width by 5-inches in height, which is located in the center of outer sleeve back surface 55, and 1-inch from the bottom of outer column sleeve 50. Outer sleeve access aperture 66 is used during the assembly of column 3, as described later in the Specification. FIGS. 10A, 10B and 10C demonstrate the collapsibility, and thus portability, of this embodiment's outer column sleeve 50. In FIG. 10A, outer column sleeve 50 is shown in its expanded state, and ready for assembly. As shown in FIG. 10B, outer column sleeve 50 is collapsed by applying collapsing forces 45, which in turn cause outer sleeve left surface 57 and outer sleeve front surface 59 to align in second collapsing direction 48, and outer sleeve right surface 63 and outer sleeve back surface 55 to align in first collapsing direction 46, resulting in a collapsed, two surface configuration as shown in FIG. 10C. In this embodiment, the 7.0-inch deep outer column sleeve 50 is reduced to about 1.5-inches depth (depends on the depth of inner sleeve support shelf 64) after it is collapsed, making for very easy storage and transportation in a small box, suitcase, or similar enclosure. In the current embodiment, outer column sleeve 50 displays a gray color inherent to base corrugated plastic sheet 52, however, outer column sleeve 50 may also display images, such as company logos, custom scenes, or text, implemented via a decal or screen printing applied to corrugated plastic sheet 52. Likewise, corrugated plastic sheet 52 may be covered with wall covering material, such as Medium Oak Natural Brown faux wood grain vinyl wall covering, P/N WWX405, available from Design Your Wall, Inc., of Van Nuys, Calif., causing outer column sleeve 50 to resemble wood, although many other wall covering patterns, such as faux stone or brick, or laminate, could be used. That is, outer column sleeve 50 is capable of providing many variations of visually appealing columns suited for a variety of settings.

Figure 11:
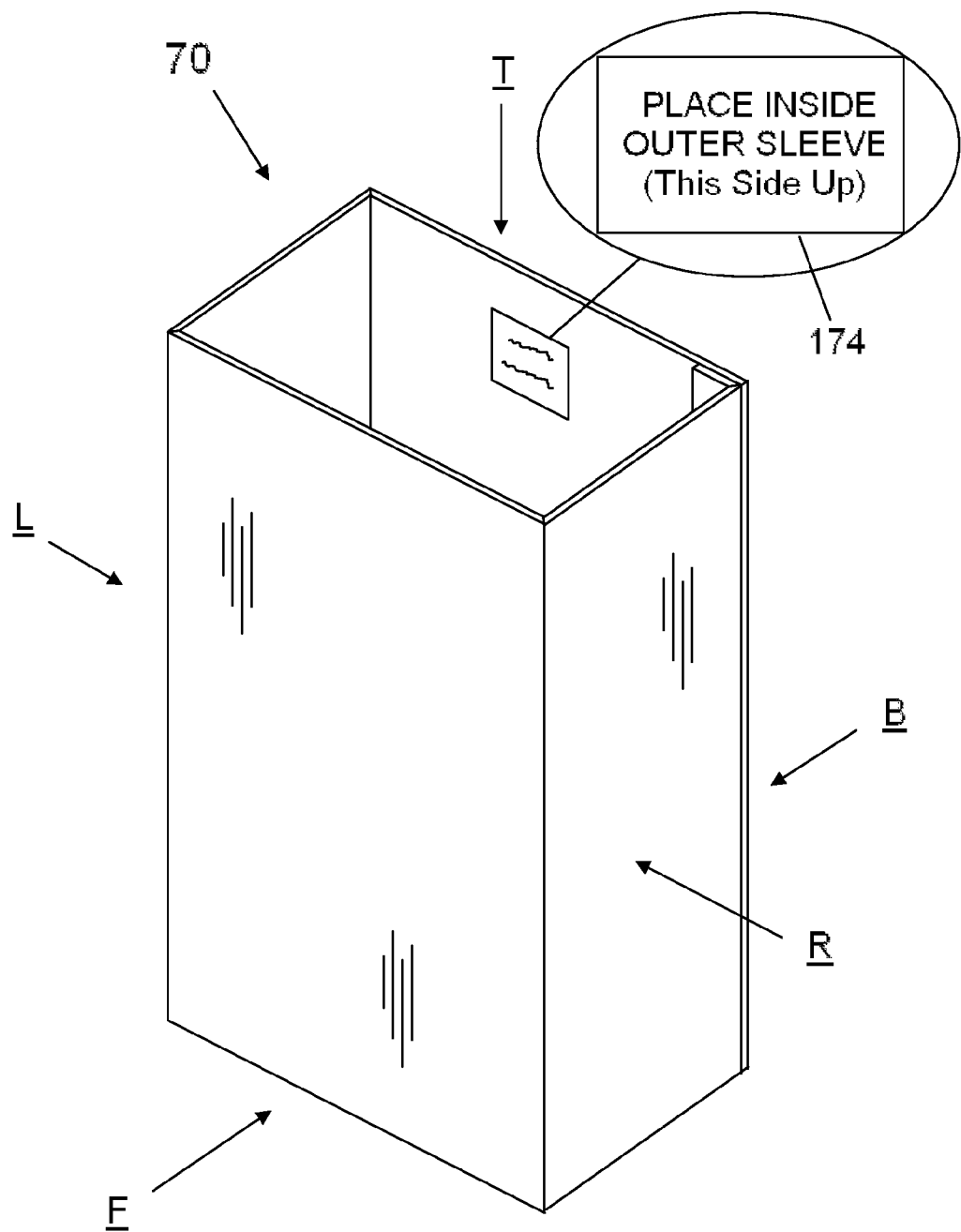
FIG. 11 is a perspective view of the inner column sleeve of this embodiment.
Figures 12A, 12B, 12C:
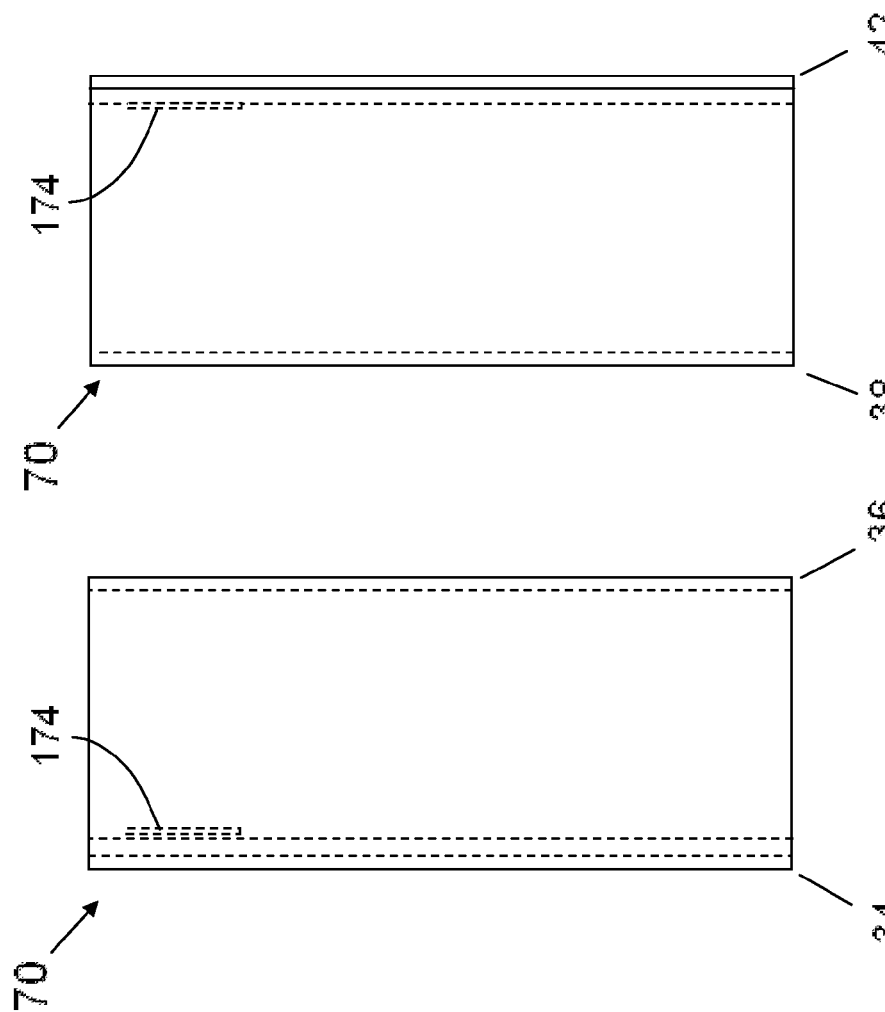
FIG. 12A is a top view of the inner column sleeve of this embodiment.
FIG. 12B is a left elevation view of the inner column sleeve of this embodiment.
FIG. 12C is a right elevation view of the inner column sleeve of this embodiment.
Figure 12E:
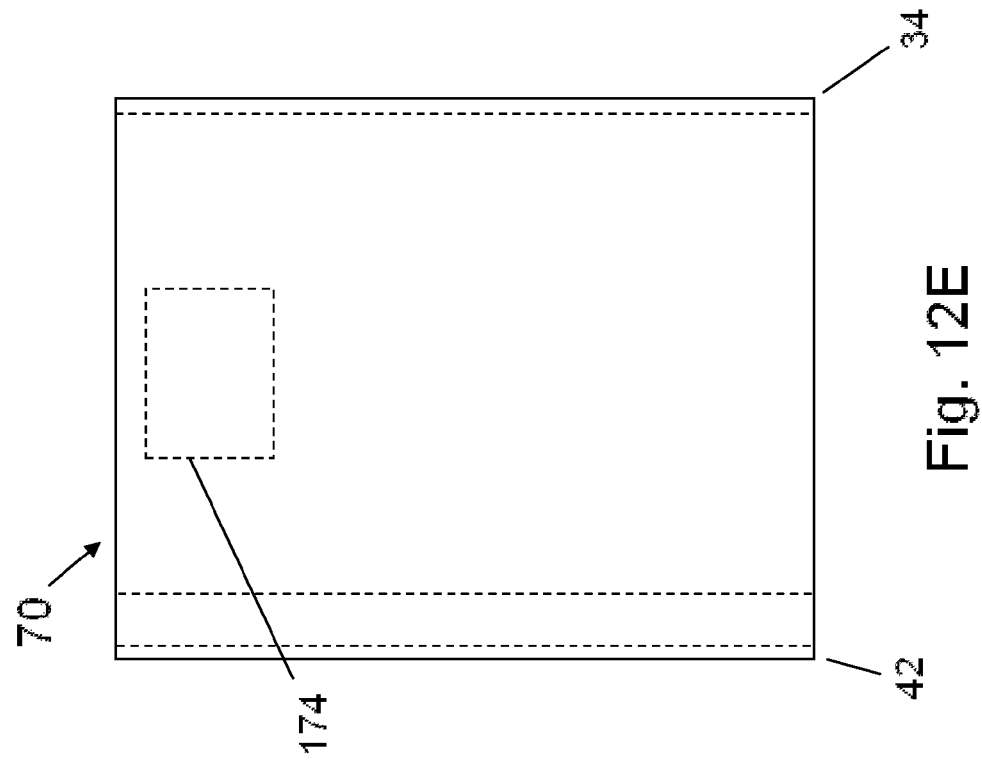
FIG. 12E is a back elevation view of the inner column sleeve of this embodiment.
Figure 12D:
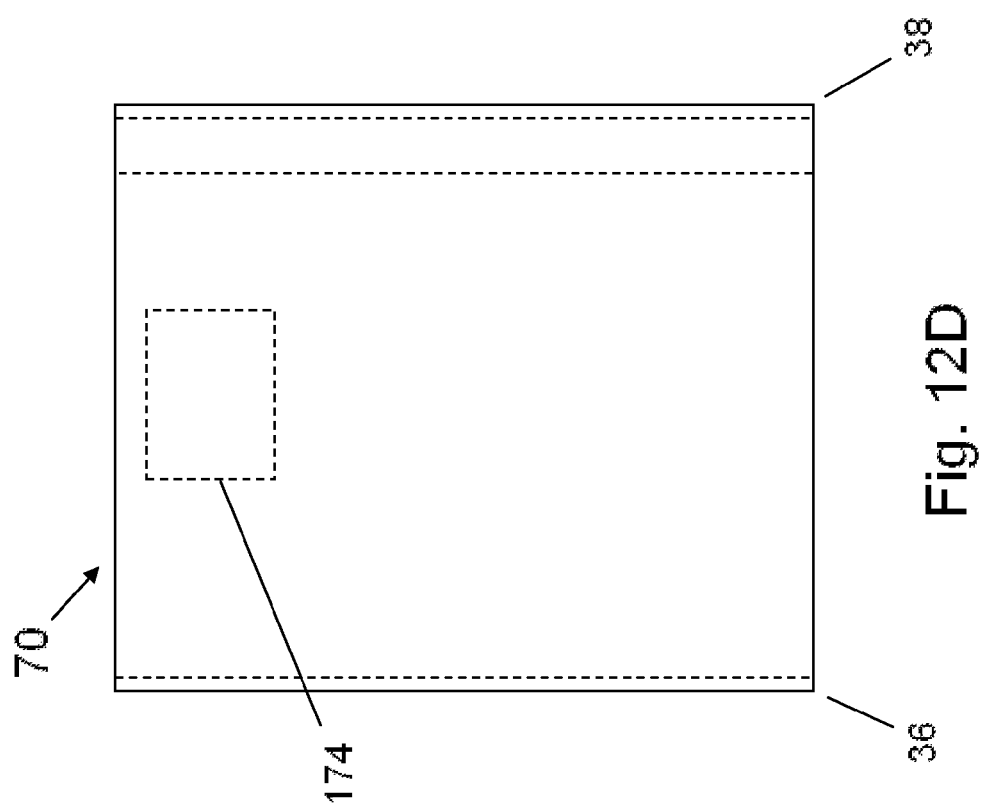
FIG. 12D is a front elevation view of the inner column sleeve of this embodiment.

Turning now to FIGS. 11, and 12A through 12E, inner column sleeve 70 is preferably made from corrugated plastic sheets, commonly referred to as Coroplast®, although other types of corrugated material may be used, such as corrugated fiberboard, corrugated cardboard, etc. Coroplast® is available in a variety of lengths, widths, thicknesses and colors. For this embodiment inner column sleeve 70 is constructed from 5/32-inch (4-mm) thick Coroplast® in a JM Gray Utility Gray color, although other thicknesses and colors may be used. Turning now to FIG. 11, in the present embodiment, inner column sleeve 70 measures 15.9-inches wide by 6.625 inches deep by 15-inches high (outside dimensions). As shown in FIGS. 12A through 12E, inner column sleeve 70 is formed in the same manner as base inner sleeve 30 above, using the same material (corrugated plastic sheet 32), except that a third instruction label 174 is attached, as opposed to first instruction label 160. Third instruction label 174 may contain several types of information including installation instructions, part numbers, etc. Inner column sleeve 70 can be collapsed in the same manner as described for base inner sleeve 30 above, resulting in the same compact size for storage and transportation.

Figure 13E:
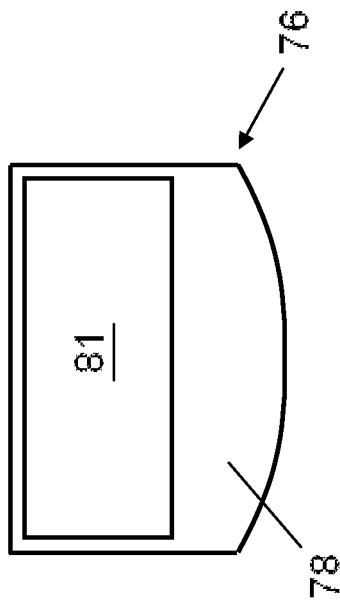
FIGS. 13E through 13H show optional inner column sleeve support frames in this embodiment, offering different shapes, featuring shelves and ledges.
Figure 13G:
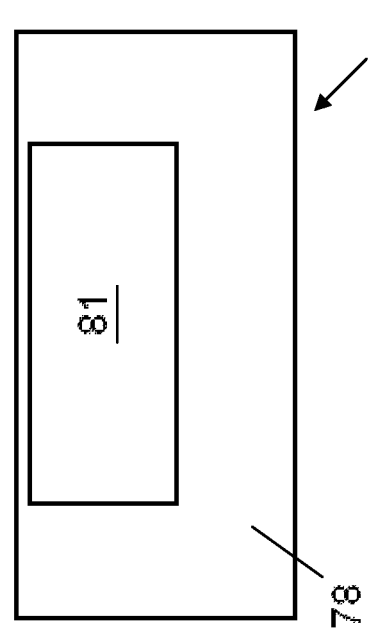
Figure 13F:
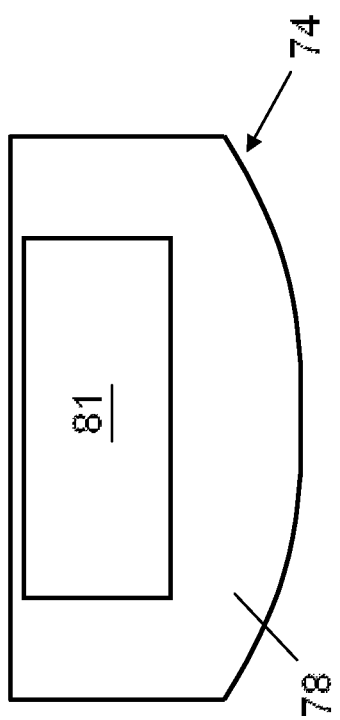
Figure 13H:
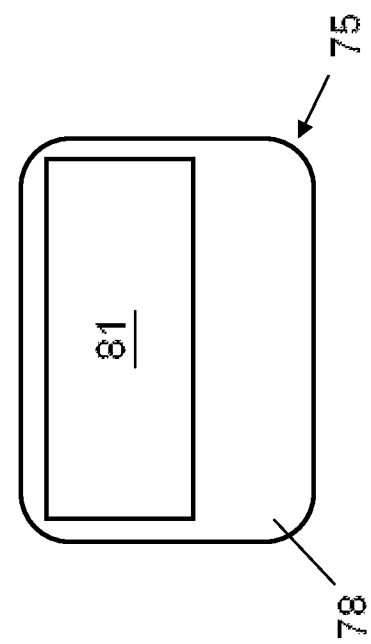

Turning now to FIGS. 13A, 13B, 13C and 13D, inner sleeve support frame 80, which keeps outer column sleeve 50, base inner sleeve 30, and inner column sleeve 70 corners more square, is preferably made from a closed cell polymerized vinyl chloride (PVC) material, such as Sintra®, which is lightweight with a high-stiffness; is available in a variety of thicknesses and colors; and can be cut, milled, routed or drilled to form many shapes. Note that other stiff, lightweight materials could be used, such as cellular utility polymer sheet material (e.g., King StarLite® XL); acetal plastics (e.g., Delrin®); and Polyamide (Nylon); to name a few. For this embodiment inner sleeve support frame 80 is constructed from ½-inch (13-mm) thick Sintra® in a black color, although other thicknesses and colors may be used. In the present embodiment, inner sleeve support frame 80 measures 16.9-inches wide by 7.625 inches deep by ½-inches high (outside dimensions), with an internal cutout 81 measuring 16.0-inches wide by 6.75 inches deep, allowing it to fit around inner column sleeve 70 in an installation direction 84, as seen in FIGS. 13B and 13D, thus keeping it more square. Inner sleeve support frame 80 optionally includes a plurality of alignment dowel apertures 82, which may optionally be used during the assembly of column 3 (described later in the Specification). To add optional support for outer column sleeve 50 during assembly (described later in the Specification), an outer column support bracket 85, preferably made from polymer sheet material (e.g., King StarLite® XL), although other materials, such as other plastics, aluminum, or wood could be used, and measuring 4-inches wide by 4-inches high by 0.1-inches thick in the current embodiment, may be attached to each shorter side of inner sleeve support frame 80, either by a plurality of bracket attachment fasteners 86 (such as a #6-32, by ½-inch long machine screw, available from MSC Industrial) engaging a plurality of threaded support bracket attachment apertures 89, or by an adhesive. Outer column support bracket 85 further includes a plurality of threaded support bracket apertures 87 which accept a plurality of outer column sleeve fasteners 88 and a plurality of washers 167 (used in the assembly of column 3 described later in the Specification). Additionally, as shown in FIGS. 13E through 13H, inner sleeve support frame 80 may be made in different shapes to add further functionality to this embodiment. A plurality of alternate inner sleeve support frames 74, 75, 76 and 77 are shown with a plurality of various support frame shelves 78. Support frame shelves 78 add additional surface area for placing supplementary items used in tradeshows, broadcast television studios, etc., such as brochures, display monitors, and speakers, to name a few.

Figure 15B:
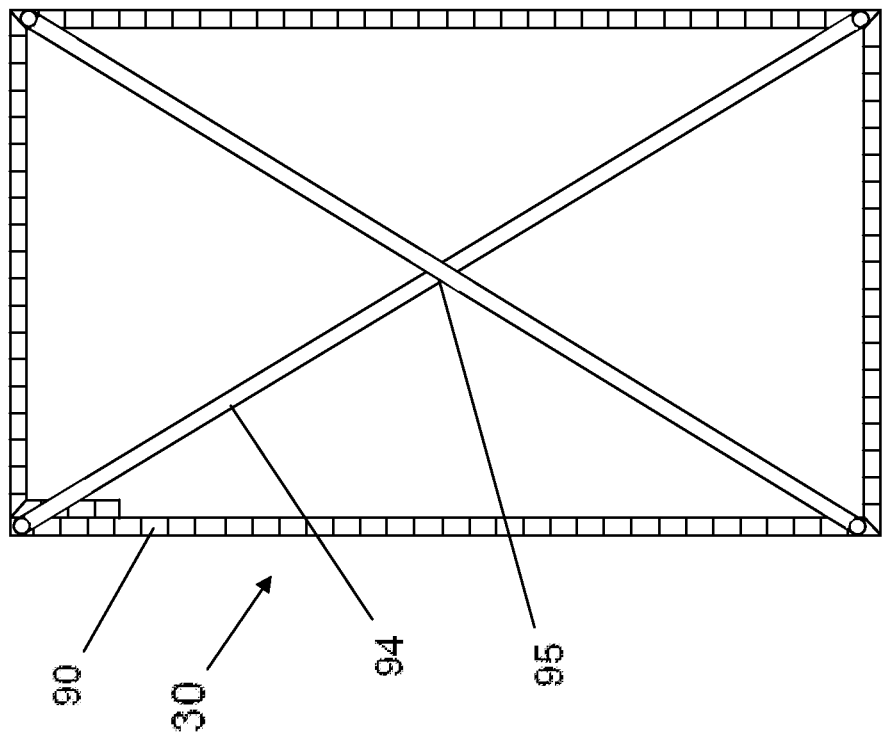
FIGS. 15A and 15B show an alternate embodiment of an inner column sleeve support rod, and method of use, in this embodiment.
Figure 15A:
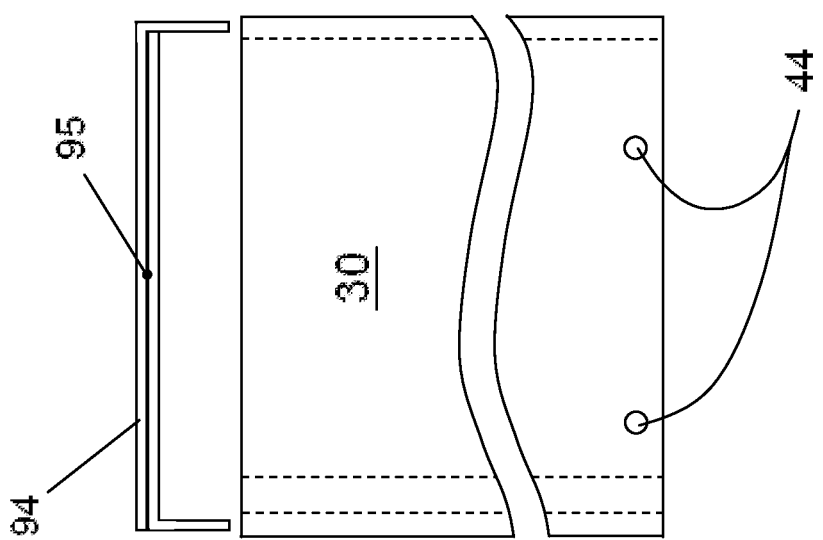
Figure 16B:
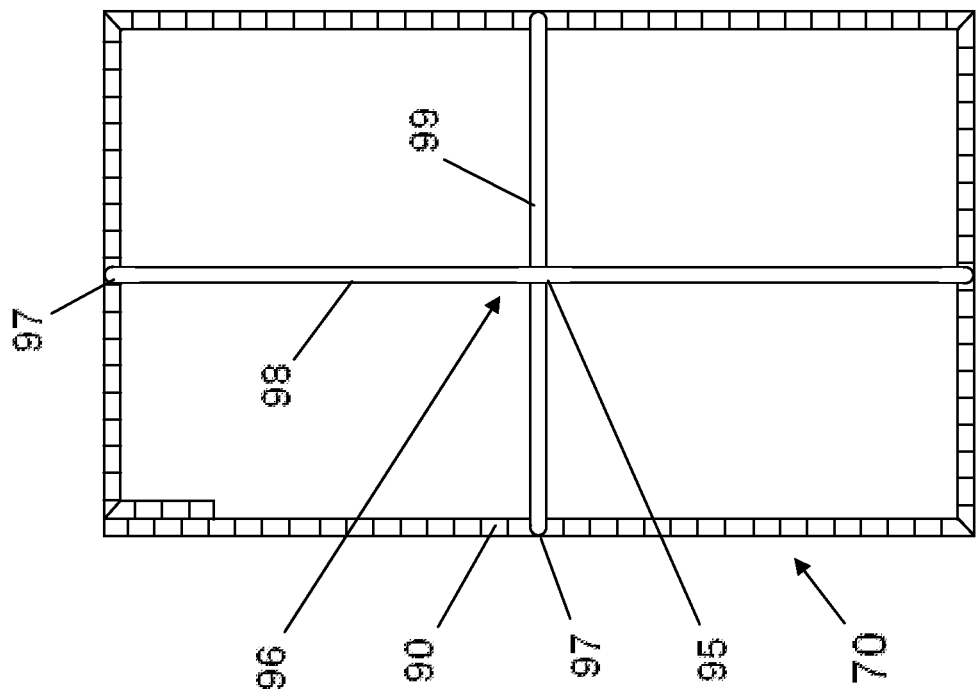
FIGS. 16A and 16B show yet another embodiment of an inner column sleeve support rod, and method of use, in this embodiment.
Figure 16A:
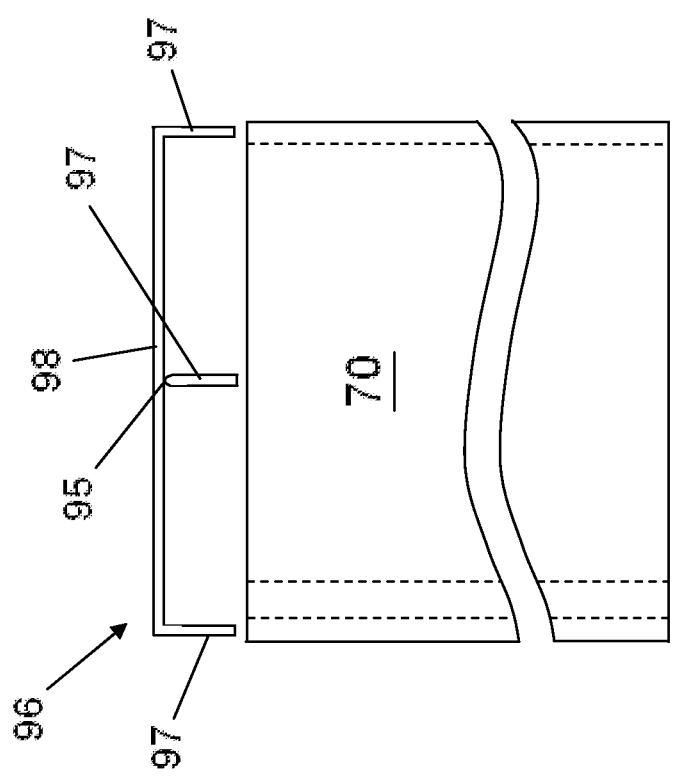

Alternatively, base inner sleeve 30 and inner column sleeve 70 (and thus outer column sleeve 50) may be kept more square by other types of structures, as shown in FIGS. 14A and 14B; 15A and 15B; and 16A and 16B. FIGS. 14A and 14B illustrate one approach using a single support rod 92. In the current embodiment, alternate single support rod 92 is made from a 19.3-inch long, 3/16-inch diameter 5052/H32 aluminum rod, available from Alloy Products Division of G.M.F. Industries, Inc. in Florida. Single support rod 92 is further formed by bending a plurality of one-inch long insert segments 93 at both ends of single support rod 92. As shown in FIG. 14B, insert segments 93 are inserted into a plurality of corrugated plastic sheet flutes 90 located at diagonally-opposite corners of base inner sleeve 30 (at a distance of 17.3-inches). FIGS. 15A and 15B describe another alternate approach using a diagonal cross support rod 94. In the current embodiment alternate diagonal cross support rod 94 is formed by joining two single support rods 92 in such a manner as to create a diagonal configuration. Single support rods 92 are preferably joined at a joint 95 by a welding method, although other methods for joining metals may be used, such as Araldite® 2021 epoxy, pop rivets, etc. Alternate diagonal cross support rod 94 is then inserted into a plurality of corrugated plastic sheet flutes 90 located at diagonally-opposite corners of base inner sleeve 30. Alternately, single support rods 92 do not have to be joined at joint 95, that is, one single support rod 92 can be inserted first, followed by a second single support rod 92 as shown. FIGS. 16A and 16B describe yet another alternate approach using an orthogonal cross support rod 96. In the current embodiment alternate orthogonal cross support rod 96 is formed by joining two single rods in such a manner as to create an orthogonal configuration. A first support rod 98 is preferably made from a 17.9-inch long, 3/16-inch diameter 5052/H32 aluminum rod, available from Alloy Products Division of G.M.F. Industries, Inc. in Florida. First support rod 98 is further formed by bending a plurality of one-inch long orthogonal insert segments 97 at both ends of first support rod 98. A second support rod 99 is preferably made from a 8.625-inch long, 3/16-inch diameter 5052/H32 aluminum rod, available from Alloy Products Division of G.M.F. Industries, Inc. in Florida. Second support rod 99 is further formed by bending a plurality of one-inch long orthogonal insert segments 97 at both ends of second support rod 99. As seen in FIG. 16A, alternate orthogonal cross support rod 96 is formed by joining second support rod 99 under first support rod 98 at joint 95, at a 90-degree angle, preferably by a welding method, although other methods for joining metals may be used, such as Araldite® 2021 epoxy, pop rivets, etc. Alternate orthogonal cross support rod 96 is then inserted into a plurality of corrugated plastic sheet flutes 90 located at orthogonal positions in inner column sleeve 70 as seen in FIG. 16B.

Figure 18:
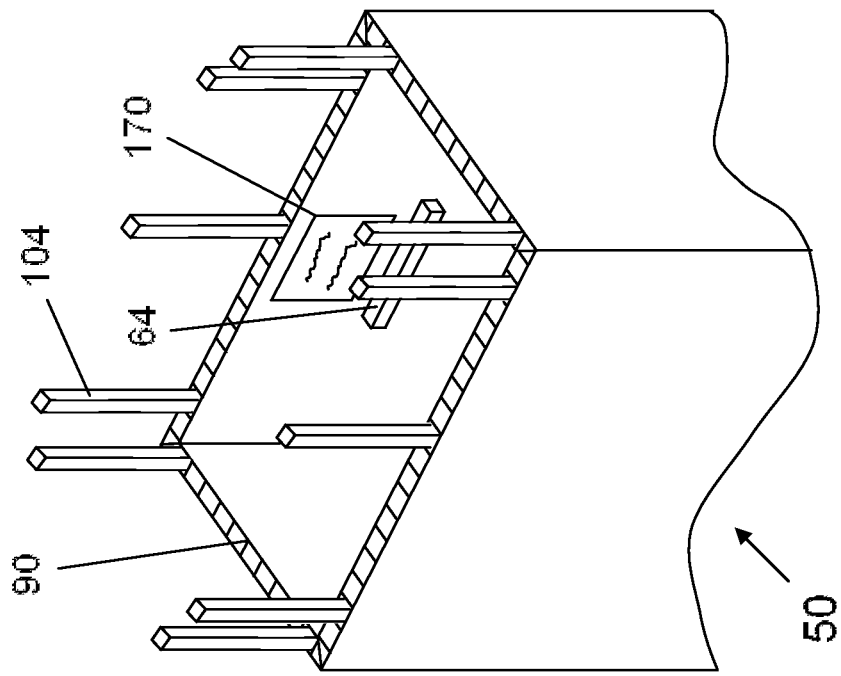
FIG. 18 shows an alternate type of optional outer column sleeve alignment rods, and method of use, in this embodiment.
Figure 17:
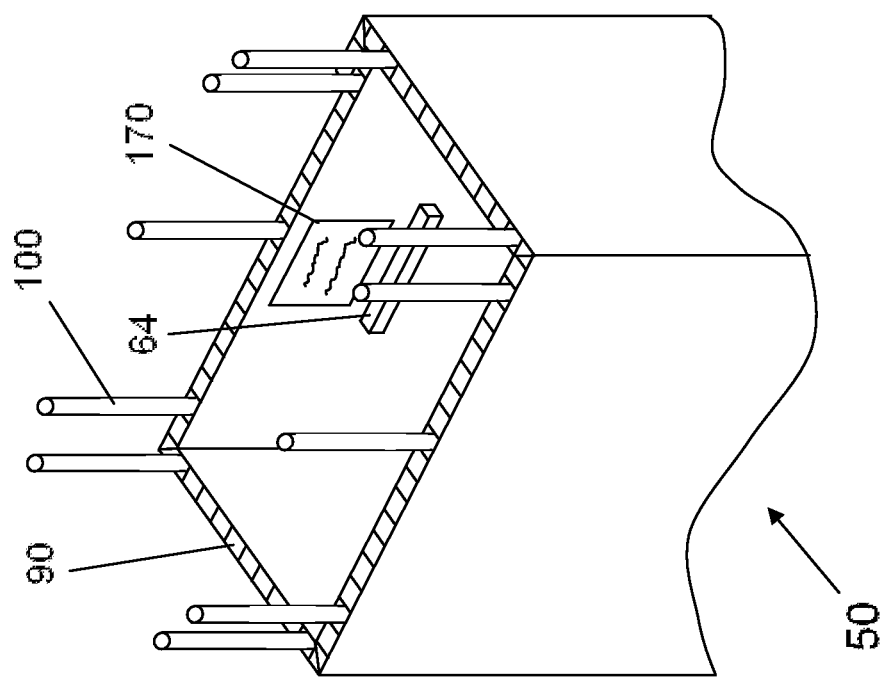
FIG. 17 shows a plurality of optional outer column sleeve alignment rods, and method of use, in this embodiment.

Turning now to FIG. 17, a circular outer sleeve alignment rod 100, which may optionally be used to align outer column sleeves 50 during assembly, is preferably made from a lightweight, but stiff plastic rod, such as Nylon 6/6, available from MSC Industrial, MSC P/N: 63393342, although other materials could be used, such as Delrin®, Acrylonitrile Butadiene Styrene (ABS), aluminum, etc. In the current embodiment circular outer sleeve alignment rod 100 is preferably 5-inches long with a 3/16-inch diameter. FIG. 18 describes a rectangular outer sleeve alignment rod 104, which is an additional element for aligning outer column sleeves 50 during assembly. Rectangular outer sleeve alignment rod 104 is preferably made from a lightweight, but stiff plastic bar, such as Nylon 6/6, available from Small Parts Inc., Miami Lakes, Fla., P/N: U-SRN-0187, although other materials could used, such as Delrin®, Acrylonitrile Butadiene Styrene (ABS), aluminum, etc. In the current embodiment rectangular outer sleeve alignment rod 104 is preferably 5-inches long with a 3/16-inch width by 3/16-inch depth. Note that other shapes, such as hexagonal, could be used for the alignment rods.

Figure 19:
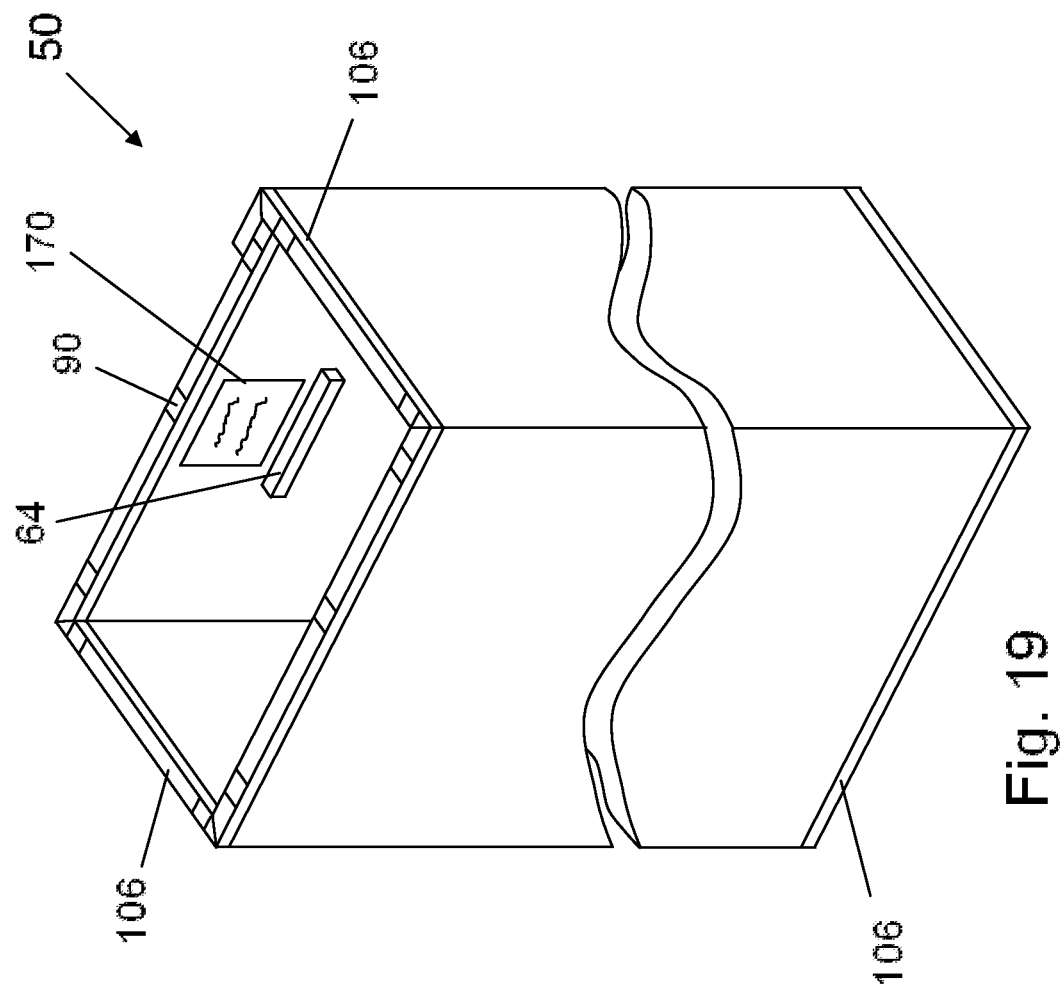
FIG. 19 shows the flute-covering material installed on the outer column sleeve in this embodiment.

Turning now to FIG. 19, an optional flute covering 106 is shown covering a plurality of corrugated plastic sheet flutes 90. Flute covering 106 provides visual aesthetics by hiding corrugated plastic sheet flutes 90 from sight. In this embodiment, flute covering 106 is preferably made from a strong, tough, cotton cloth pressure sensitive tape, often termed gaffer's tape, available from Identi-Tape, Inc. in Boulder, Colo., P/N: g.5gy, although other tapes or coverings could be used. In the current embodiment, flute covering 106 is preferably ½-inch wide, in a Gray color.

Figure 20:
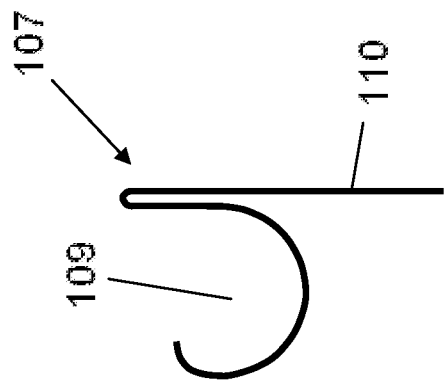
FIG. 20 shows a backdrop rod hanger in this embodiment.
Figure 21:
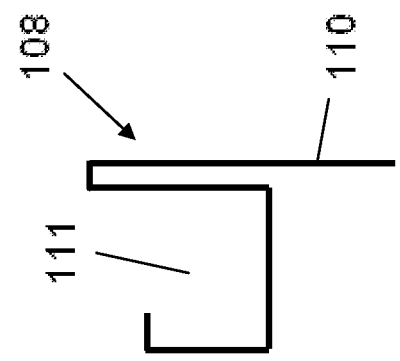
FIG. 21 shows an alternate type of a backdrop rod hanger that may be used in this embodiment.

Turning now to FIG. 20, a side view of curved backdrop rod hanger 107 is shown. A plurality of curved backdrop rod hangers 107 are used during the assembly process to support backdrop assembly 4. In the current embodiment curved backdrop rod hanger 107 is preferably formed from a ⅛-inch diameter, 6.5-inch long type 316 stainless steel rod material, available from Small Parts Inc., Miami Lakes, Fla., P/N: U-ZRXX-2-6, although other materials could used, such as other low-carbon steel materials, brass, etc. Curved backdrop rod hanger 107 is further formed by bending the 6.5-inch rod to form a circular backdrop rod opening 109, which is a 1.25-inch diameter "C" shape opening, and a straight shaft 110, measuring 3.25-inches, for insertion into one of a plurality of corrugated plastic sheet flutes 90. FIG. 21 shows an alternate rectangular backdrop rod hanger 108 is preferably formed from a 6.5-inch long, ⅛-inch by ⅛-inch, type 316 stainless steel bar material, available from Small Parts Inc., Miami Lakes, Fla., P/N: U-ZSXX-2-6, although other materials could used, such as other low-carbon steel materials, brass, etc. Rectangular backdrop rod hanger 108 is further formed by bending the 6.5-inch rod to form a rectangular backdrop rod opening 111, measuring 1.0-inch (high) by 1.25-inches (width), which resembles a rectangular opening, and straight shaft 110, measuring 3.25-inches, for insertion into one of a plurality of corrugated plastic sheet flutes 90. Alternatively, curved backdrop rod hanger 107 and rectangular backdrop rod hanger 108 could be formed from other techniques, such as metal injection molding (MIM).

Figure 22:
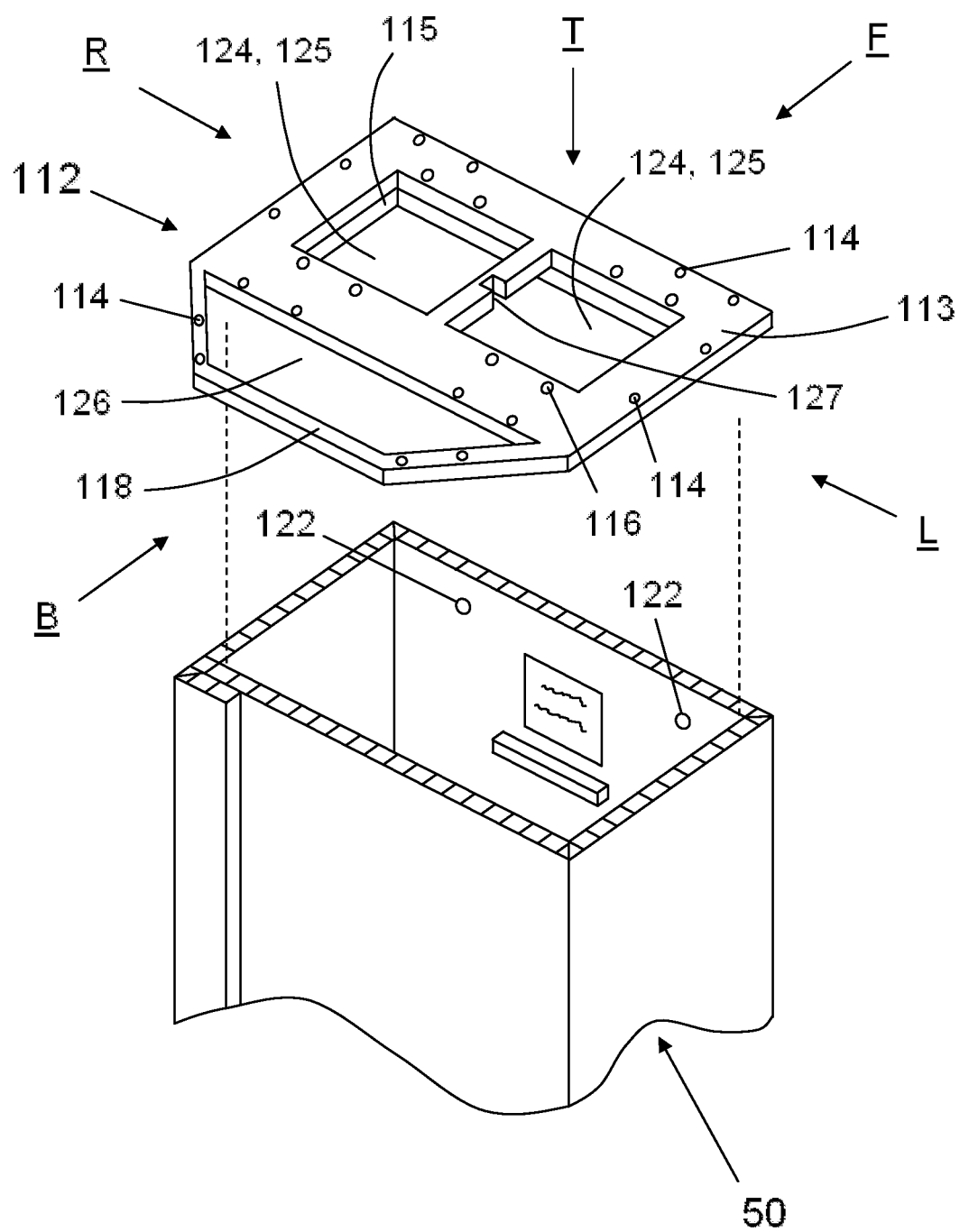
FIG. 22 shows a column top cap, and method of use, in this embodiment.
Figure 24A:
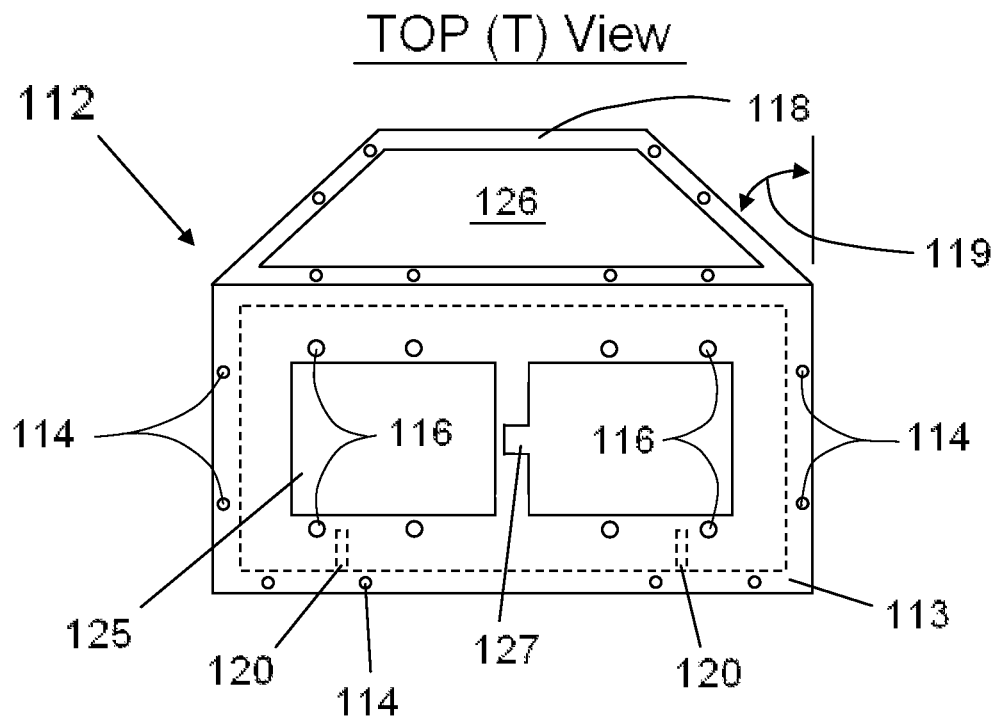
FIG. 24A is a top view of the column top cap in this embodiment.
Figure 24B:
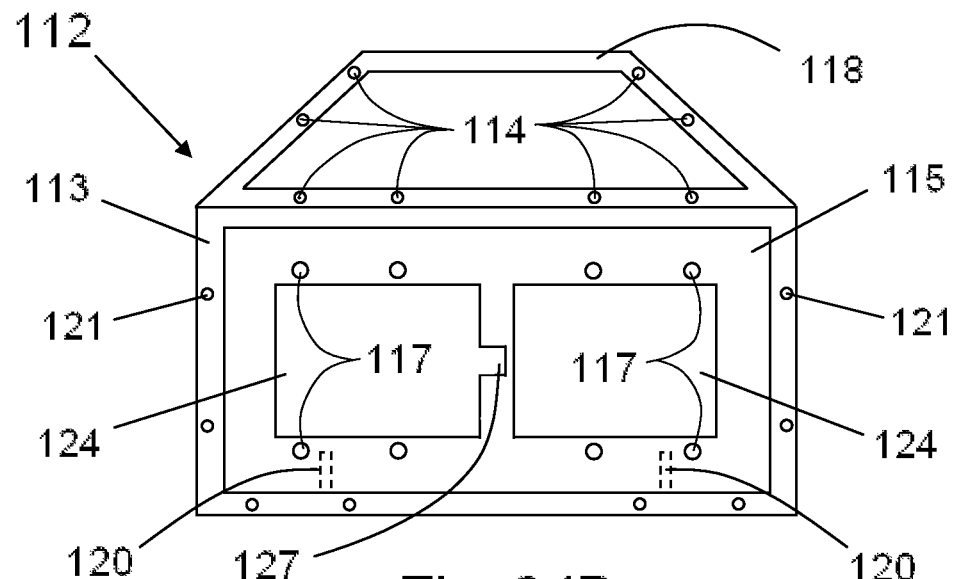
FIG. 24B is a bottom view of the column top cap in this embodiment.

Turning now to FIGS. 22; 23A through 23D; 24A and 24B; and 25A through 25D, column top cap 112, which offers support for curved backdrop rod hanger 107 (or rectangular backdrop rod hanger 108), and allows for various multi-column configurations (seen later in the Specification), is comprised of two components: a column top outer member 113 and a column top inner member 115. Column top outer member 113 is preferably made from a cellular utility polymer sheet material, such as King StarLite® XL, available from Piedmont Plastics in Memphis, Tenn., using conventional machining methods, such as cutting or milling. King StarLite® XL is available in a variety of thicknesses and colors. For this embodiment Utility Black StarLite® XL was used. Alternatively, column top outer member 113 may be made from other durable materials, such as other plastics, wood, metal, or other materials, using alternative manufacturing processes such as injection molding, wire electrical discharge machining (wire EDM); chemical etching machining; abrasive water jet machining; or laser machining, e.g., Stereolithography (SLA), Selective Laser Sintering (SLS), or laser cutting; to name a few. In this embodiment column top outer member 113 in general measures 16.5-inches wide by 12-inches deep with a thickness of 0.5-inches. As shown in FIG. 22, column top outer member 113 includes a plurality of outer member slots 125, each measuring 6.9-inches wide by 4.6 inches deep, intended to reduce the weight of column top cap 112 in order to enhance its portability; an upper tension cable slot 127, used to keep the column aligned during assembly (described in a later section of the Specification); and an outer member grip slot 126, intended to reduce the weight of column top outer member 113, and to facilitate the use of a column top cap handle 118 by allowing the user's fingers to grip handle 118 to manipulate column 3. As seen in FIGS. 24A and 24B, column top outer member 113 is further machined with a top cap angle 119, set to 45-degrees in the present embodiment, to facilitate the use of additional columns placed at 45-degree angles (additional columns will be discussed later in the Specification), although top cap angle 119 could be machined to other angles to form different background configurations. Column top outer member 113 further contains a plurality of backdrop rod hanger apertures 114 to receive curved backdrop rod hangers 107, and a plurality of outer member lintel attachment apertures 116 to facilitate the optional attachment of a lintel 200 (as presented later in the Specification).

As shown in FIGS. 23A through 23D, and 24B, column top inner member 115 is preferably made from a closed cell polymerized vinyl chloride (PVC) material, such as Sintra®, which is lightweight with a high-stiffness; is available in a variety of thicknesses and colors; and can be cut, milled, routed or drilled to form many shapes. Note that other stiff, lightweight materials could be used, such as cellular utility polymer sheet material (e.g., King StarLite® XL); acetal plastics (e.g., Delrin®); and Polyamide (Nylon); to name a few. For this embodiment column top inner member 115 is constructed from ½-inch (13-mm) thick, adhesive-backed Sintra® in a black color, although other thicknesses and colors may be used. In the present embodiment, column top inner member 115 in general measures 16.0-inches wide by 6.5 inches by ½-inch high (outside dimensions), allowing it to fit within outer column sleeve 50 as seen in FIGS. 23A through 23D. As seen in FIGS. 24A and 24B, column top inner member 115 further has a plurality of inner member slots 124 measuring 6.9-inches wide by 4.6 inches deep, which align with outer member slots 125, and are intended to reduce the weight of column top cap 112. Column top inner member 115 further contains a plurality of inner member backdrop rod hanger apertures 121, which align with backdrop rod hanger apertures 114. Column top inner member 115 further contains a plurality of inner member lintel attachment apertures 117, which align with outer member lintel attachment apertures 116, to facilitate the optional attachment of lintel 200 (as seen later in the Specification). Column top cap 112 is formed by attaching adhesive-backed column top inner member 115 to the bottom surface of column top outer member 113, taking care to align outer member lintel attachment apertures 116 with inner member lintel attachment apertures 117, backdrop rod hanger apertures 114 with inner member backdrop rod hanger apertures 121, and outer member slots 125 to inner member slots 124. Alternately, column top inner member 115 may be attached to column top outer member 113 by other fastening methods, including epoxy, screws, etc.

FIGS. 25A through 25C, describe the installation locations of curved backdrop rod hangers 107, or rectangular backdrop rod hangers 108, or other hanger types. Depending on modular background set 1 design, hangers may be placed on column top cap 112 in various backdrop rod hanger apertures 114, to form several different backdrop configurations. FIG. 25A shows the rear mounting position. FIG. 25B shows the side mounting position (using alternate rectangular backdrop rod hangers 108). FIG. 25C shows the mounting position of curved backdrop rod hangers 107 for forming the non-orthogonal wing configuration.

FIG. 25D describes an alternate embodiment of column top cap 112, wherein column top cap 112 includes an upper tension hook 128, which engages the bottom surface of column top cap 112 by screwing upper tension hook 128 into the bottom surface of column top cap 112. Upper tension hook 128 is subsequently used to keep the column aligned during assembly (described in a later section of the Specification). Upper tension hook 128 preferably has a ⅜-inch eye hook opening with a 2-inch, #8 wood screw shaft, and is available from Aubuchon Hardware, Putnam, Conn., P/N Model #130-08915, although other eye sizes and shaft lengths will suffice.

Figure 26A:
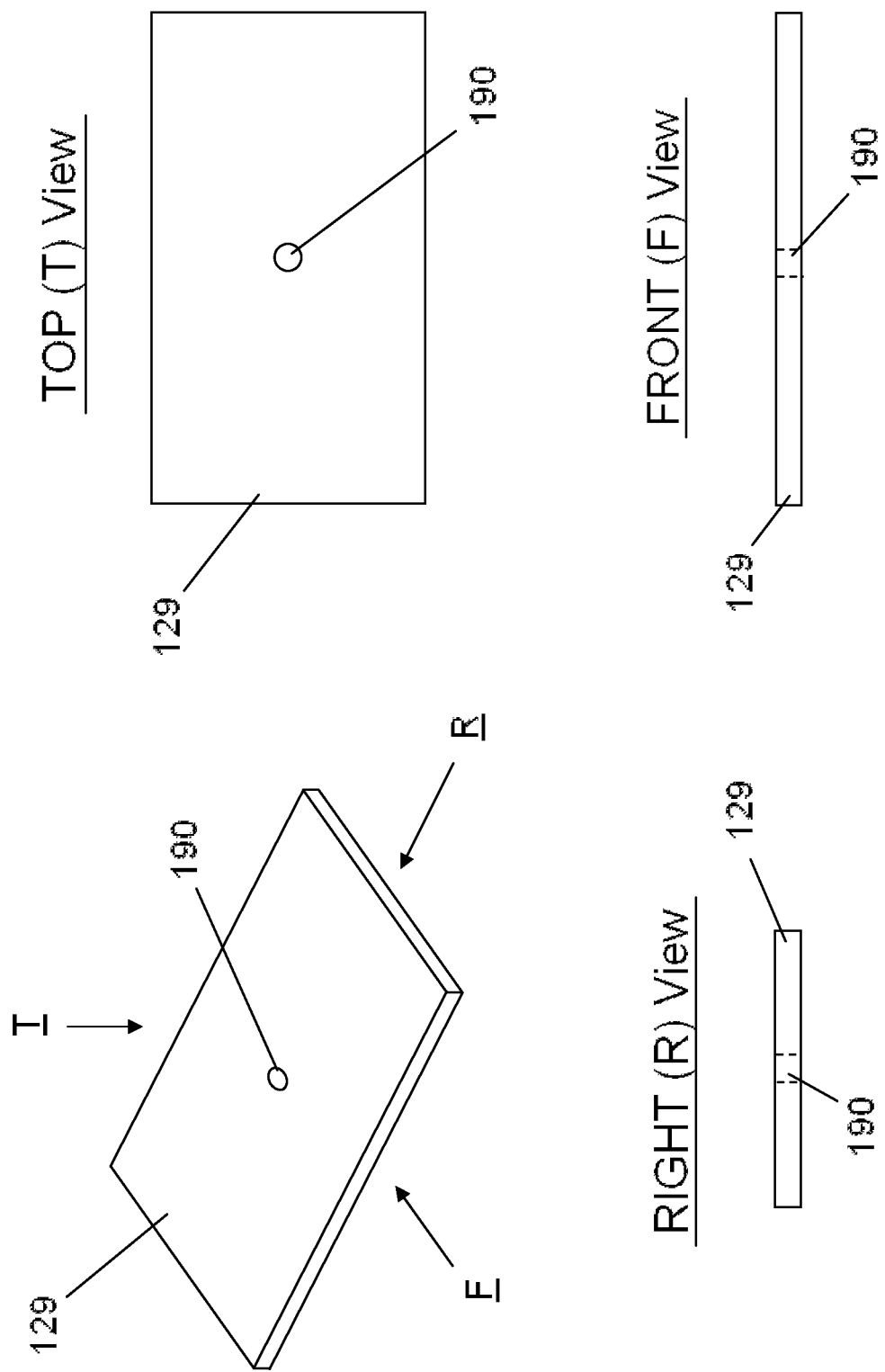
FIG. 26A shows a perspective view and several elevation views of an alternate column top cap of this embodiment.

FIGS. 26A through 26C describe a second column top cap 129. Second column top cap 129 is preferably made from corrugated plastic sheets, commonly referred to as Coroplast®, available from Coroplast, Inc. of Dallas, Tex., although other types of corrugated material may be used, such as corrugated fiberboard, corrugated cardboard, etc. Coroplast® is available in a variety of lengths, widths, thicknesses and colors. For this embodiment second column top cap 129 is constructed from ⁵⁄₃₂-inch (4-mm) thick Coroplast® in a JM Gray Utility Gray color, and measures 16.0-inches wide by 6.5 inches deep, although other thicknesses and colors may be used. Second column top cap 129 further contains a column top cable aperture 190, measuring ¼-inch in diameter, which is centered in second column top cap 129. When installed, second column top cap 129 rests on a plurality of support shelves 64, which have been attached to the inner surfaces of a final outer column sleeves 50 approximately 0.25-inches from the top of outer column sleeve 50. Further, in this alternate embodiment, curved backdrop rod hangers 107, or rectangular backdrop rod hangers 108, are inserted directly into corrugated plastic sheet flutes 90 in outer column sleeves 50, as shown in FIGS. 26B and 26C.

FIGS. 26D and 26E show a third column top cap 156. Third column top cap 156 is comprised of two components: a third column top cap outer member 159 and a plurality of third column top support walls 158. Third column top cap 156 is preferably made from a closed cell polymerized vinyl chloride (PVC) material, such as Sintra®, (Utility Black StarLite® XL is used for this embodiment), which is lightweight with a high-stiffness; is available in a variety of thicknesses and colors; and can be cut, milled, routed or drilled to form many shapes. Note that other stiff, lightweight materials could be used, such as cellular utility polymer sheet material (e.g., King StarLite® XL); acetal plastics (e.g., Delrin®); and Polyamide (Nylon); to name a few. Third column top cap outer member 159 also contains an upper tension cable slot 127, used to keep the column aligned during assembly (described in a later section of the Specification), and a plurality of backdrop rod hanger apertures 114 used to accept curved backdrop rod hanger 107, or rectangular backdrop rod hanger 108, or some other type of backdrop rod hanger device. Third column top support walls 158 measure 16-inches long by 2-inches deep by 0.5-inches wide and may attach to third column top cap outer member 159 using a variety of fastening methods, including epoxy, screws, etc. Third column top support walls 158 are positioned on third column top cap outer member 159 such that third column top cap 156 can frictionally fit within outer column sleeve 50 (see FIG. 26E).

FIGS. 27A through 27D show a number of embodiments of tension cables. FIG. 27A shows tension cable 130, which consists of an elastic cable 139 and a set of endpieces 131. In one embodiment, elastic cable 139 is ³⁄₁₆-inch in diameter, 7-feet in length, and composed of one or more elastic strands forming a core, covered in a woven nylon or cotton sheath, and is available from htbbungeecords.com. In one embodiment, endpiece 131 is made from polymer sheet material (e.g., King StarLite® XL), although other plastics, aluminum, wood, or other materials could be used, and measures 1-inch wide by 1-inch long by 0.25-inches thick, with a 0.25-inch diameter hole centered in the 1-inch by 1-inch material, in the current embodiment. FIG. 27B shows an alternate tension cable 132 which consists of elastic cable 139 and a set of alternate endpieces 133. In one embodiment, alternate endpiece 133 is made from a rubber material, with a 0.8-inch diameter top tapering to a 0.6-inch diameter bottom, with a 0.2-inch diameter hole, centered at the top and bottom of alternate endpiece 133, and continuing through alternate endpiece 133 from top to bottom. Alternate endpiece 133 can be obtained from MSC Industrial, P/N C-2686. Alternate endpiece 133 can also be constructed from plastic, aluminum, wood, or other materials. Additionally, alternate endpiece 133 could be a rubber or plastic washer or grommet. That is, alternate endpiece 133 can be made from a variety of materials in a variety of shapes. FIG. 27C shows an additional tension cable 134, which consists of elastic cable 139 and a set of additional endpieces 135. Additional endpiece 135 is preferably a hook that attaches to elastic cable 139, and is available from www.htbbungeecords.com, P/N Cord Hook J Style 3/16. Alternately, additional tension cable 134 can be purchased already assembled from www.htbbungeecords.com, P/N 3/16" CJH-7' (B). FIG. 27D shows an adjustable tension cable 136, which consists of elastic cable 139, additional endpieces 135, and a tension cable adjuster 137, available from MSC Industrial, P/N 05140-8. Further, tension cables could be constructed from a combination of an elastic cable, a fixed cable, such as a rope material or metal, and a set of endpieces selected from above. Even further, tension cables can be constructed from different endpieces located at each end of the cable, that is, there are a number of combinations of cables and endpieces that can form the tension cable.

FIGS. 28A through 28D show a plurality of different methods for supporting backdrop assembly 4. FIG. 28A shows a backdrop support rod 140 consisting of a support rod inner section 141, with a rectangular shape, and a support rod outer section 142 with a rectangular "C" shape. Support rod inner section 141 is formed in such a way as to move in and out of support rod outer section 142 allowing support rod 140 to be made variable in length. In the current embodiment, support rod outer section 142 is made from aluminum, and measures 7/16-inches wide by 11/16-inch high by 36-inches long (outside dimensions), with an inner opening measuring 3/8-inches wide by 11/16-inches high; while support rod inner section 141 is made from aluminum and measures 5/16-inches wide by 10/16-inches high by 36-inches long (outside dimensions). Although a rectangular shape is shown for upper support rod 140, other shapes, such as oval shapes, may be used. FIG. 28B shows an alternate upper backdrop support rod 143 consisting of a circular rod inner section 144 and a circular rod outer section 145. Circular rod inner section 144 is formed in such a way as to move in and out of circular rod outer section 145 allowing alternate upper support rod 143 to be made variable in length. In the current embodiment, circular rod outer section 145 is an aluminum tube with a 3/4-inch outside diameter, a 23/32-inch inside diameter, and is 36-inches long, while circular rod inner section 144 is an aluminum tube with a 11/16-inch outside diameter, a 21/32-inch inside diameter, and is 36-inches long. Although a circular shape is shown for alternate upper support rod 143, other shapes, such as oval shapes, may be used. FIG. 28C shows a fixed length support rod 147, which is used to keep backdrop assembly 4 fixed in place while hanging from curved backdrop rod hanger 107 in the current embodiment, or fixed length support rod 147 may be used in backdrop assembly 4 as a fixed length upper support rod. In the current embodiment fixed length support rod 147 is a cylindrical tube, preferably made from aluminum, although other materials could be used, measuring 3/4-inches in diameter, with a 23/32-inch inside diameter, and is 48-inches long. Although a circular shape is shown for fixed length support rod 147, other shapes, such as oval shapes, may be used. FIG. 28D shows an alternate fixed length support rod 148, which can be used in backdrop assembly 4 to keep it fixed in place while hanging from curved backdrop rod hanger 107 in the current embodiment, or alternate fixed length support rod 148 may be used in backdrop assembly 4 as a fixed length upper support rod. In the current embodiment alternate fixed length support rod 148 is a square tube, preferably made from aluminum, although other materials could be used, measuring 3/4-inches wide by 3/4-inches high, with an inside measurement of 23/32-inch width by 23/32-inch height, and is 48-inches long. Although a square shape is shown for alternate fixed length support rod 148, other shapes, such as rectangular shapes, may be used. Although in the current embodiment, aluminum is the preferred material for rods 140, 143, 147, and 148, other materials, such as wood, plastic, steel, etc., can be used.

Note that although specific sizes of the components forming modular background set 1 have been discussed, those components can be constructed in different sizes to form a variety of configurations of modular background set 1. Support base assembly 5, base inner sleeve 30, a plurality of outer column sleeves 50, a plurality of inner column sleeves 70, a plurality of inner sleeve support frames 80, and column top cap 112 can all be adjusted in width, depth and height to form a column 3, which is smaller or larger (in perimeter), or shorter or taller (in height). Column 3 height may also be adjusted using more or less of outer column sleeves 50, inner column sleeves 70, and inner sleeve support frames 80. Backdrop assembly 4 can be adjusted in height and width, and when combined with various column 3 sizes, form shorter or taller modular background set 1. That is, there are a number of modular background set 1 configurations that can be formed.

DETAILED DESCRIPTION

Method of Assembly—FIGS. 29-46

FIGS. 29 to 46 illustrate the method for assembly of modular background set 1, which consists of a plurality of completed columns 3 and backdrop assembly 4. FIGS. 29 to 43 illustrate the method of assembly of column 3, which, in the current embodiment, consists of support base assembly 5, base inner sleeve 30, three outer column sleeves 50, two inner column sleeves 70, two inner sleeve support frames 80, one column top cap 112, one tension cable 130, and a plurality of curved backdrop rod hangers 107.

Figure 29:
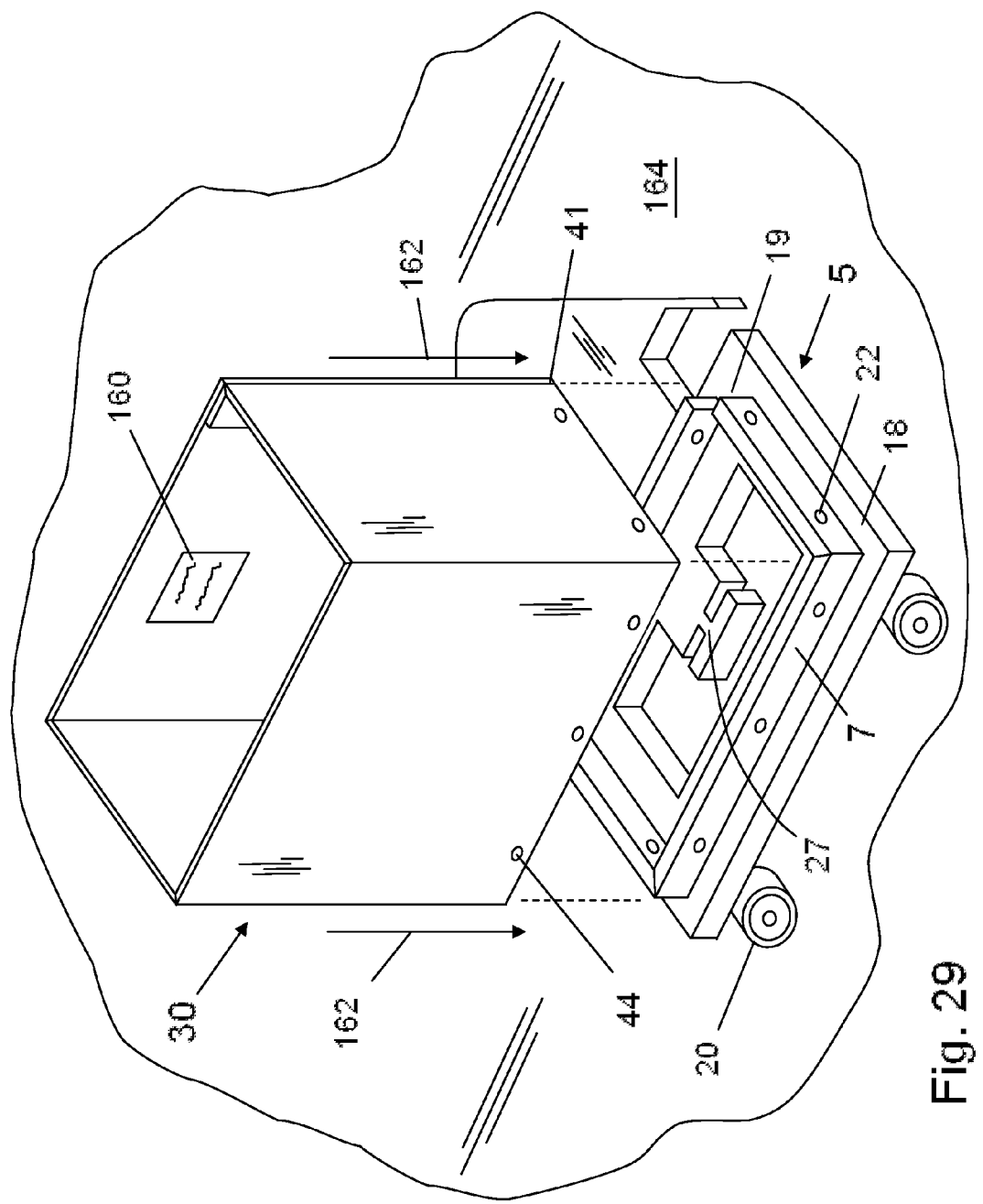
FIG. 29 describes the installation of the base inner sleeve of a column in this embodiment.

Turning now to FIG. 29, support base assembly 5 is initially placed on a solid surface 164, with column wall attachment assembly 7 facing upward. Next, base inner sleeve 30 is manipulated to it's expanded state; positioned with first instruction label 160 visible at the top of base inner sleeve 30; and placed on support base assembly 5 by moving it in an installation direction 162 until it engages column support section 18. Note that the bottom of tab attachment area 41 fits within support base attachment wall gap 19.

Figure 30:
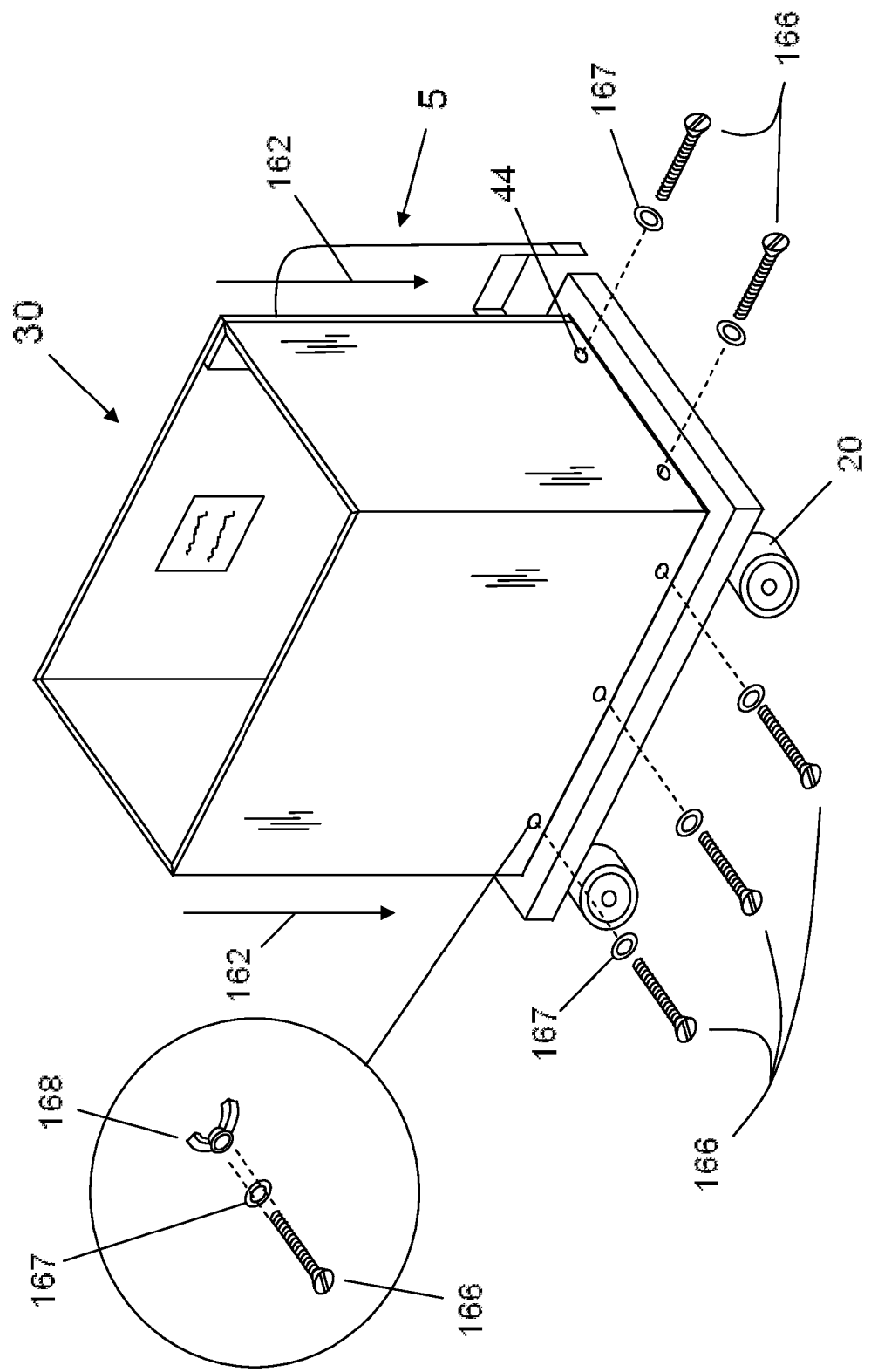
FIG. 30 describes the attachment of the base inner sleeve to the support base of a column in this embodiment.

Next, turning now to FIG. 30, base inner sleeve 30 is manipulated until base inner sleeve attachment apertures 44 align with support base fastener apertures 22. A plurality of fasteners 166 are combined with a plurality of washers 167, and then inserted through base inner sleeve attachment apertures 44, and support base fastener apertures 22. A nut fastener 168 is threadably engaged with each fastener 166 on the inside of column wall attachment assembly 7 until base inner sleeve 30 is securely attached to column wall attachment assembly 7 of support base assembly 5 (fastener 166 is preferably a #6-32, by 1/2-inch long machine screw, P/N 1488; washer 167 is preferably a #6 finishing washer, P/N 2923; and nut fastener 168 is preferably a wing nut, P/N 2685, all available from BoltDepot.com, North Weymouth, Mass.). Alternately, when base fastener apertures 22 are threaded, fasteners 166 may be threadably engaged directly to wall attachment assembly 7. Further, base inner sleeve 30 may be attached to wall attachment assembly 7 using quick release fasteners, such as the quick release ball lock pin from Fixtureworks in Michigan. That is, there are a number of fastener types that can be used to attach base inner sleeve 30 to wall attachment assembly 7.

Figure 31:
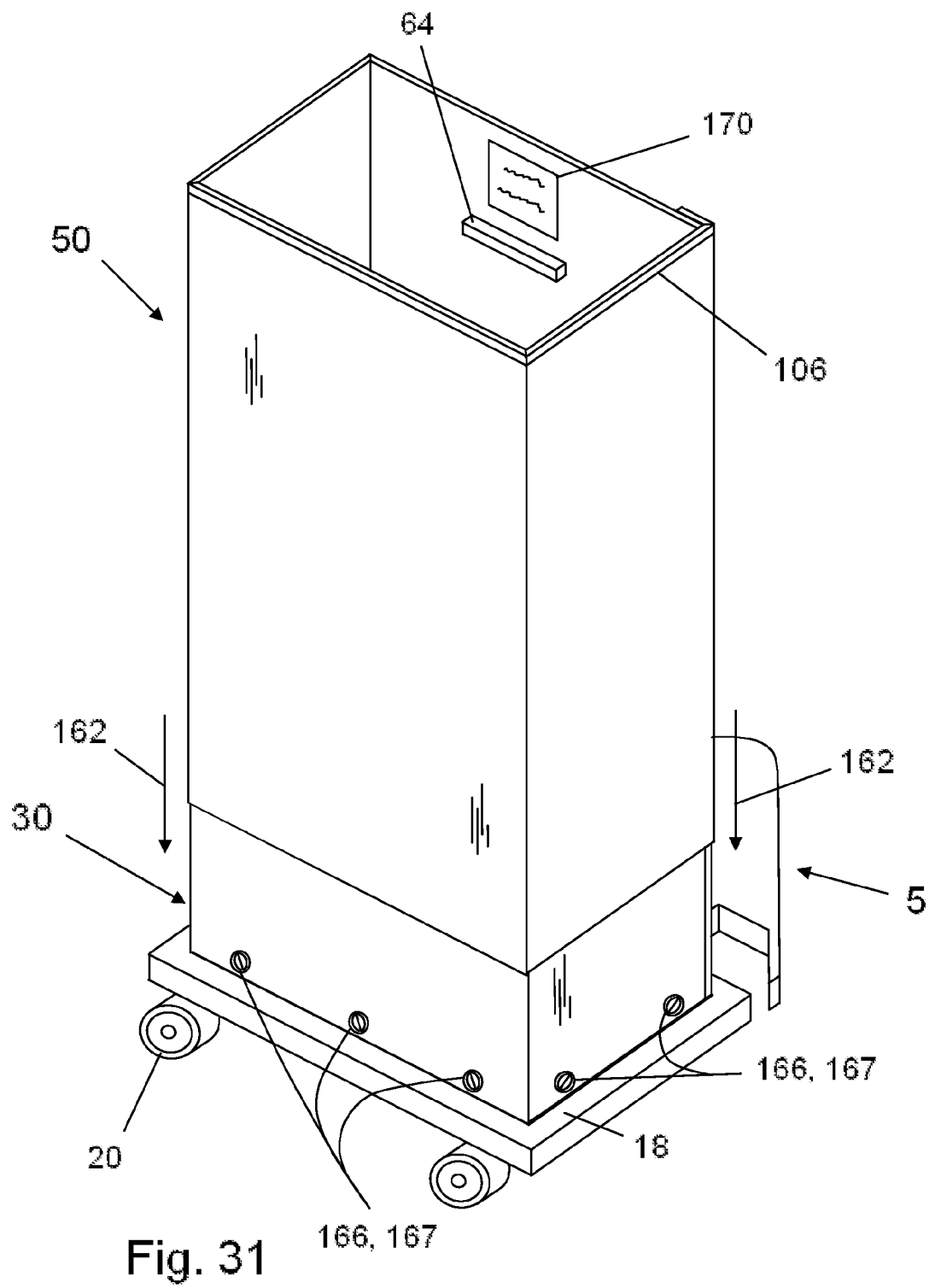
FIG. 31 describes the installation of the first outer column sleeve of a column in this embodiment.
Figure 32:
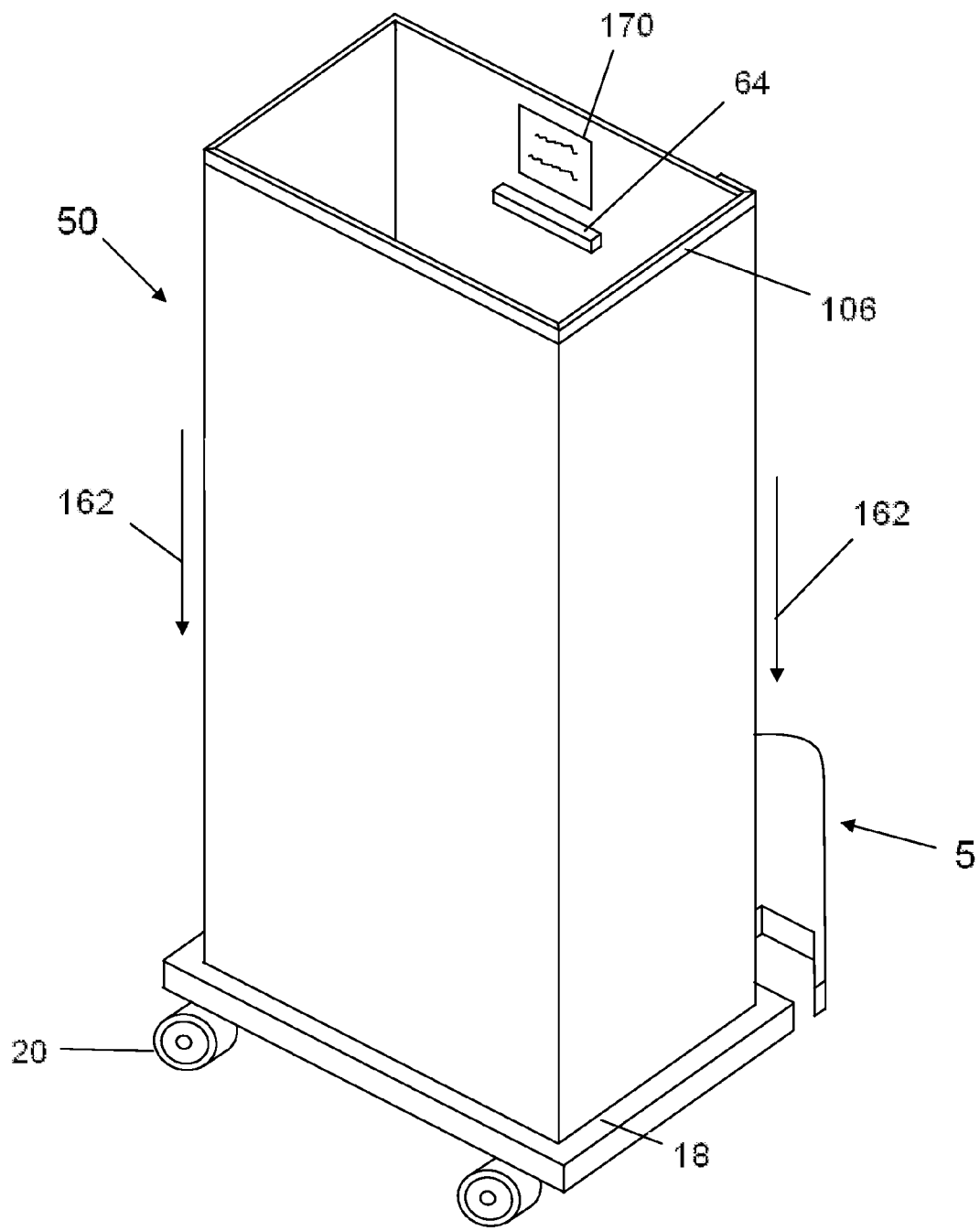
FIG. 32 describes the final position of the first outer column sleeve in this embodiment.

In the next step, as seen in FIGS. 31 and 32, the first outer column sleeve 50 is manipulated to it's expanded state; positioned with second instruction label 170 visible at the top of outer column sleeve 50; placed over base inner sleeve 30; and subsequently positioned on support base assembly 5 by moving it in installation direction 162 until it engages column support section 18. As shown in FIG. 32, with outer column sleeve 50 fully engaged, base inner sleeve 30 keeps outer column sleeve 50 from moving in directions orthogonal to installation direction 162. Optionally, flute covering 106 can be installed at this point to cover flutes 90 of outer column sleeve 50.

Figure 33:
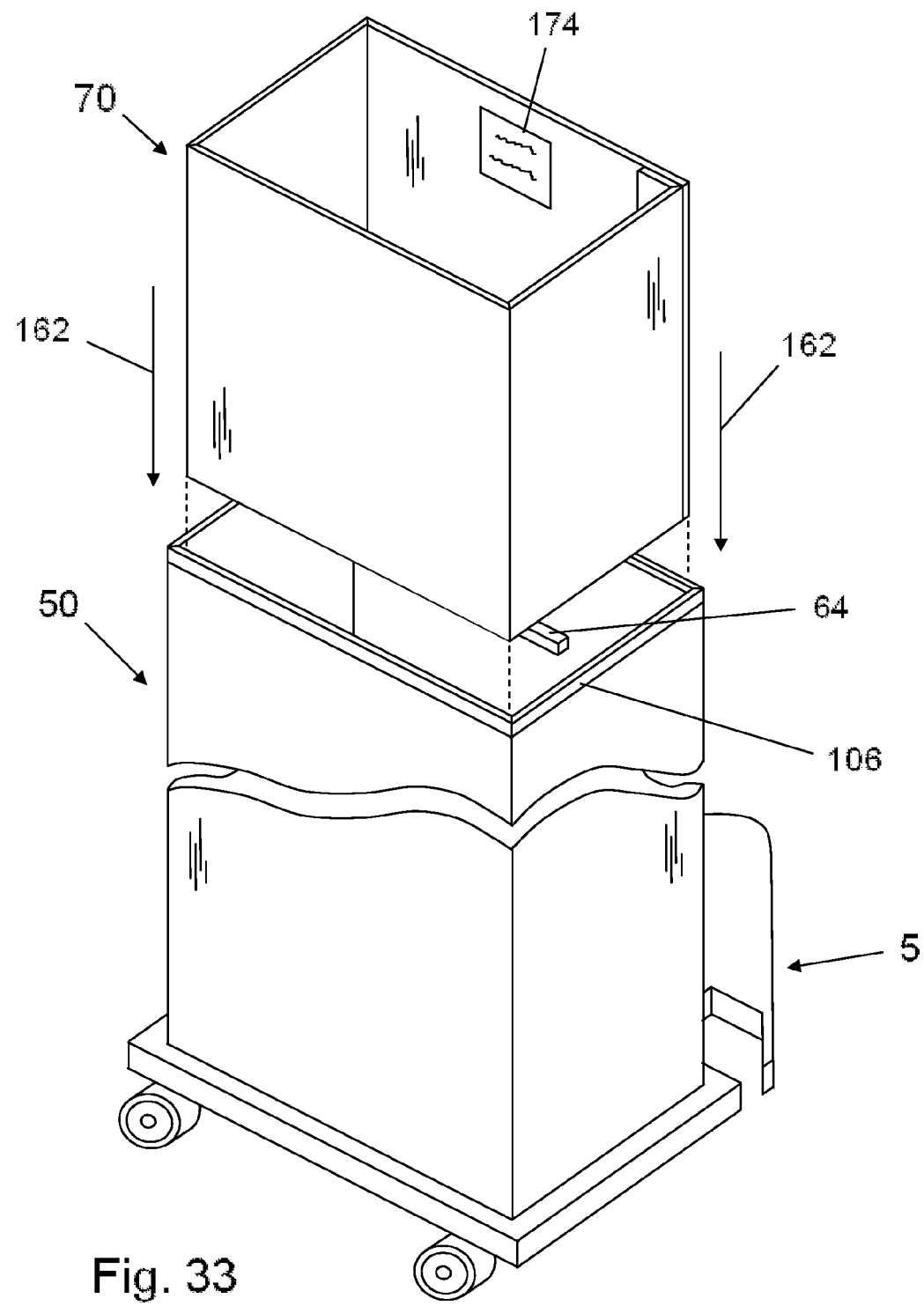
FIG. 33 describes the installation of an inner column sleeve within an outer column sleeve in this embodiment.

As seen in FIG. 33, in the next step of assembly of column 3, the first inner column sleeve 70 is manipulated to it's expanded state; positioned with third instruction label 174 visible at the top of first inner column sleeve 70; inserted within first outer column sleeve 50; and subsequently positioned on a plurality of inner sleeve support shelves 64 by moving it in installation direction 162.

Figure 34:
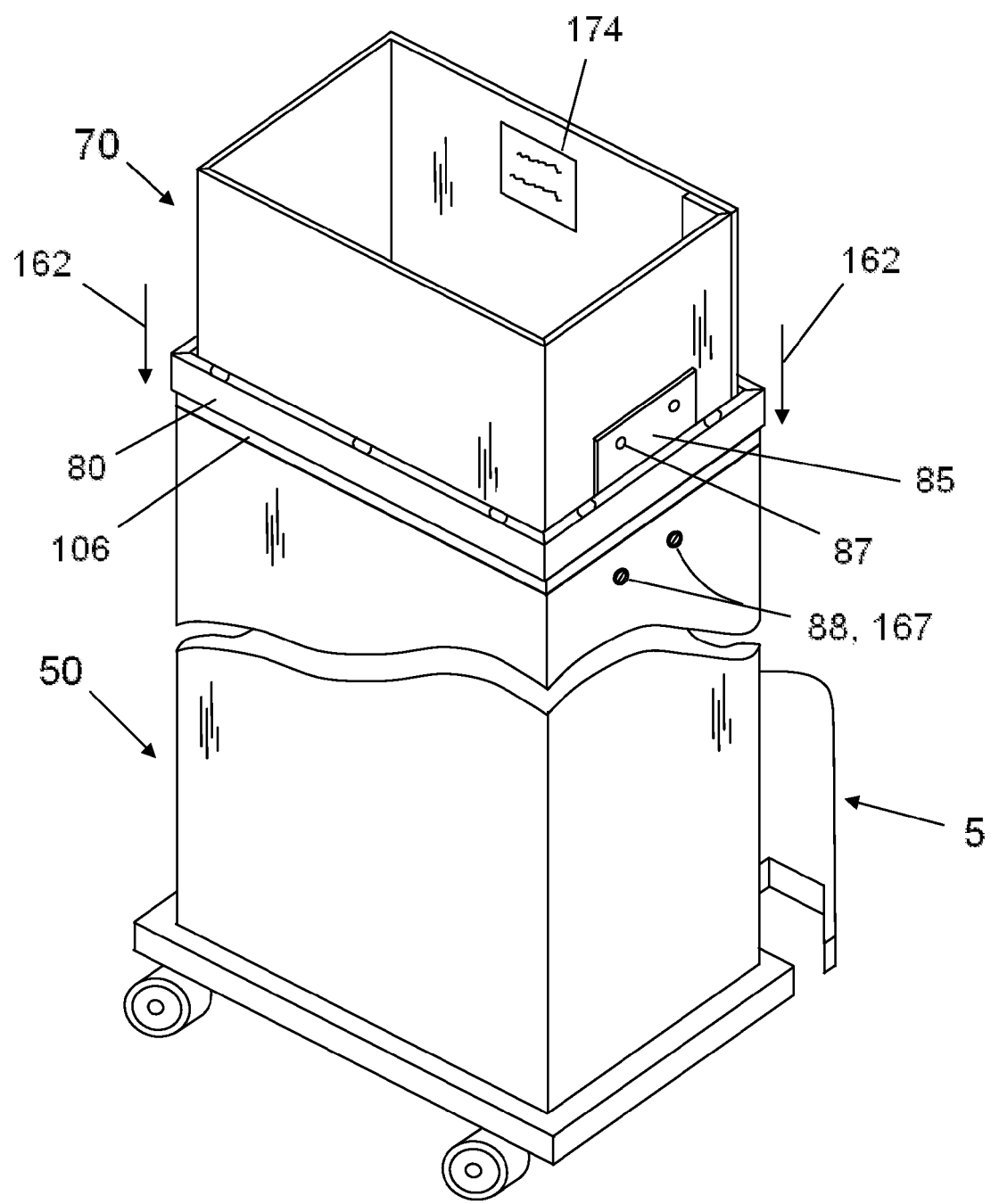
FIG. 34 describes the installation of an inner sleeve support frame, and an optional outer column support bracket, in this embodiment.
Figure 35:
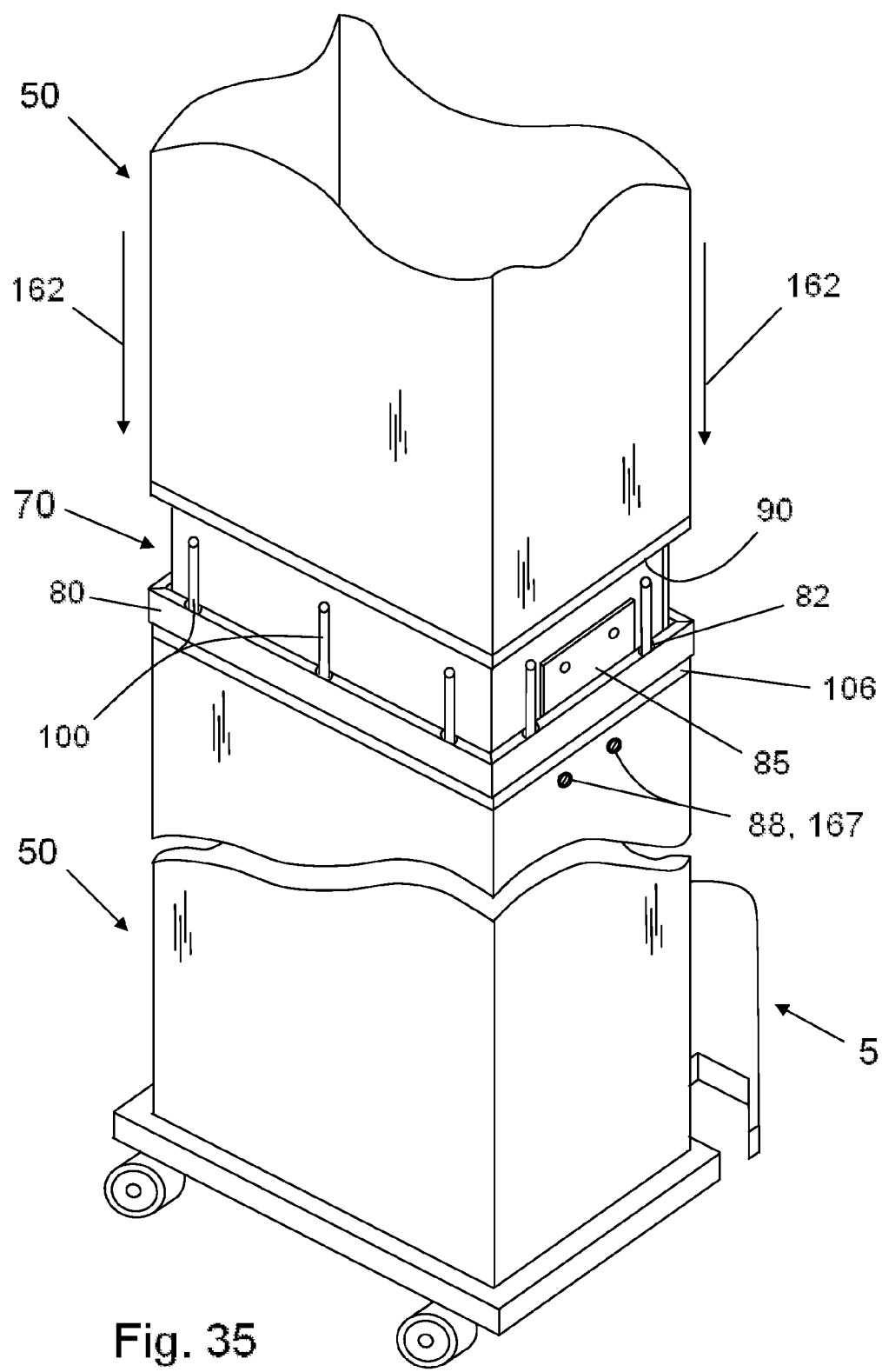
FIG. 35 describes the installation of a plurality of optional outer sleeve alignment rods, an inner sleeve support frame, and a second outer sleeve column in this embodiment.

As seen in FIGS. 34 and 35, first inner column sleeve 70 is further supported and kept square by installing first inner sleeve support frame 80. First inner sleeve support frame 80 is initially placed over first inner column sleeve 70 and then is moved in installation direction 162 until it engages the top of first outer column sleeve 50. When the installation of first inner column sleeve 70 and first inner sleeve support frame 80 are completed, a portion of first inner column sleeve 70 remains exposed in order to accept second outer column sleeve 50 in the next step. Optionally, first outer column sleeve 50 may be further supported by connecting it to optional first outer column support bracket 85, and thus indirectly to first inner sleeve support frame 80, using a plurality of outer column sleeve fasteners 88 and washers 167 (such as a #6-32, by ½-inch long machine screw coupled with a #6 finishing washer, P/N 2923, available from BoltDepot.com, North Weymouth, Mass.), which engage a plurality of threaded support bracket apertures 87. Additionally, first outer column sleeve 50 may be connected to optional first outer column support bracket 85 using quick release fasteners, such as the quick release ball lock pin from Fixtureworks in Michigan. That is, there are a number of fastener types that can be used to attach first outer column sleeve 50 to optional outer first column support bracket 85. Even further, as seen in FIG. 35, to optionally provide further alignment of first outer column sleeve 50, a plurality of circular outer sleeve alignment rods 100, or rectangular outer sleeve alignment rods 104, could be installed at this point through alignment dowel apertures 82 and into flutes 90 at the top of first outer column sleeve 50.

As seen in FIG. 35, the next outer column sleeve 50, which is the second outer column sleeve in the current embodiment, is manipulated to it's expanded state; positioned with second instruction label 170 visible at the top of second outer column sleeve 50; placed over first inner column sleeve 70; and subsequently positioned on first inner sleeve support frame 80 by moving it in installation direction 162 until it engages first inner sleeve support frame 80. With second outer column sleeve 50 fully engaged to first inner sleeve support frame 80, first inner column sleeve 70 keeps second outer column sleeve 50 from moving in directions orthogonal to installation direction 162. If desired, flute covering 106 can be installed at this point to cover flutes 90 at both the bottom and top of second outer column sleeve 50. Optionally, if installed in an earlier step, second outer column sleeve 50 may be further supported by connecting it to optional first outer column support bracket 85, and thus indirectly to first inner sleeve support frame 80, using a plurality of outer column sleeve fasteners 88 and washers 167. Further, if optionally installed in an earlier step, a plurality of outer sleeve alignment rods 100 (104) extending from first outer column 50 could engage a plurality of flutes 90 located at the bottom of second outer column sleeve 50.

Turning now to FIG. 36A, prior to installing the second, and final inner column sleeve 70 in the current embodiment, and the third and final outer column sleeve 50 in the current embodiment (both described just below in the Specification), a plurality of curved backdrop rod hangers 107 are installed into column top cap 112. To accomplish this installation, straight shaft 110 of each curved backdrop rod hangers 107 is inserted into backdrop rod hanger apertures 114. In the current embodiment, two curved backdrop rod hangers 107 are installed in the backdrop rod hanger apertures 114 located closest to the inside of constructed column 3 (where backdrop assembly 4 will be placed). Next, one end of tension cable 130 is placed within upper tension cable slot 127. The opposite end of tension cable 130 is then placed through the top opening of third outer column sleeve 50 so that it protrudes through the bottom of third outer column sleeve 50. Column top cap 112 is then inserted into third outer column sleeve 50 by moving it in installation direction 162 until it engages the top of third outer column sleeve 50.

Optionally, in an alternate embodiment, as shown in FIG. 36B, second column top cap 129 may be used. In this alternate embodiment, two curved backdrop rod hangers 107 are installed into third outer column sleeve 50 by inserting straight shaft 110 of each curved backdrop rod hanger 107 into a top flute 90 located closest to the inside of constructed column 3 (where backdrop assembly 4 will be placed). Next, one end of elastic cable 139 is threaded through column top cable aperture 190 and then through endpiece 131, where the end of elastic cable 139 is tied into a knot so as not to pull through the ¼-inch hole in endpiece 131. The opposite end of tension cable 130 is then placed through the top opening of third outer column sleeve 50 and pulled downward in installation direction 162 until endpiece 131 engages the top of second column top cap 129. The opposite end of tension cable 130 now protrudes through the bottom of third outer column sleeve 50. Second column top cap 129 is then inserted into third outer column sleeve 50 by moving it in installation direction 162 until it engages a plurality of support shelves 64.

Alternately, although not directly shown, third column top cap 156 could be used at this point in the installation procedure (FIGS. 26D and 26E show third column top cap 156 in position to install onto to outer column 50). In this optional embodiment, two curved backdrop rod hangers 107 are installed in the backdrop rod hanger apertures 114 located closest to the inside of constructed column 3 (where backdrop assembly 4 will be placed). Next, one end of tension cable 130 is placed within upper tension cable slot 127. The opposite end of tension cable 130 is then placed through the top opening of third outer column sleeve 50 so that it protrudes through the bottom of third outer column sleeve 50. Third column top cap 156 is then inserted into the third outer column sleeve 50 by moving it in installation direction 162 until it engages the top of third outer column sleeve 50.

Optionally, column top cap 112 and third column top cap 156 can be attached to final outer column 50 using a plurality of fasteners 166 and washers 167. FIGS. 26D and 26E, show this optional attachment using third column top cap 156, although the identical procedure can be used for column top cap 112. Once third column top cap 156 is inserted into final outer column 50, fasteners 166 (coupled with washers 167) are inserted through a plurality of outer column sleeve upper attachment apertures 122 and are threadably engaged with a plurality of threaded column top cap fastener apertures 120 in third column top cap 156.

Figure 37:
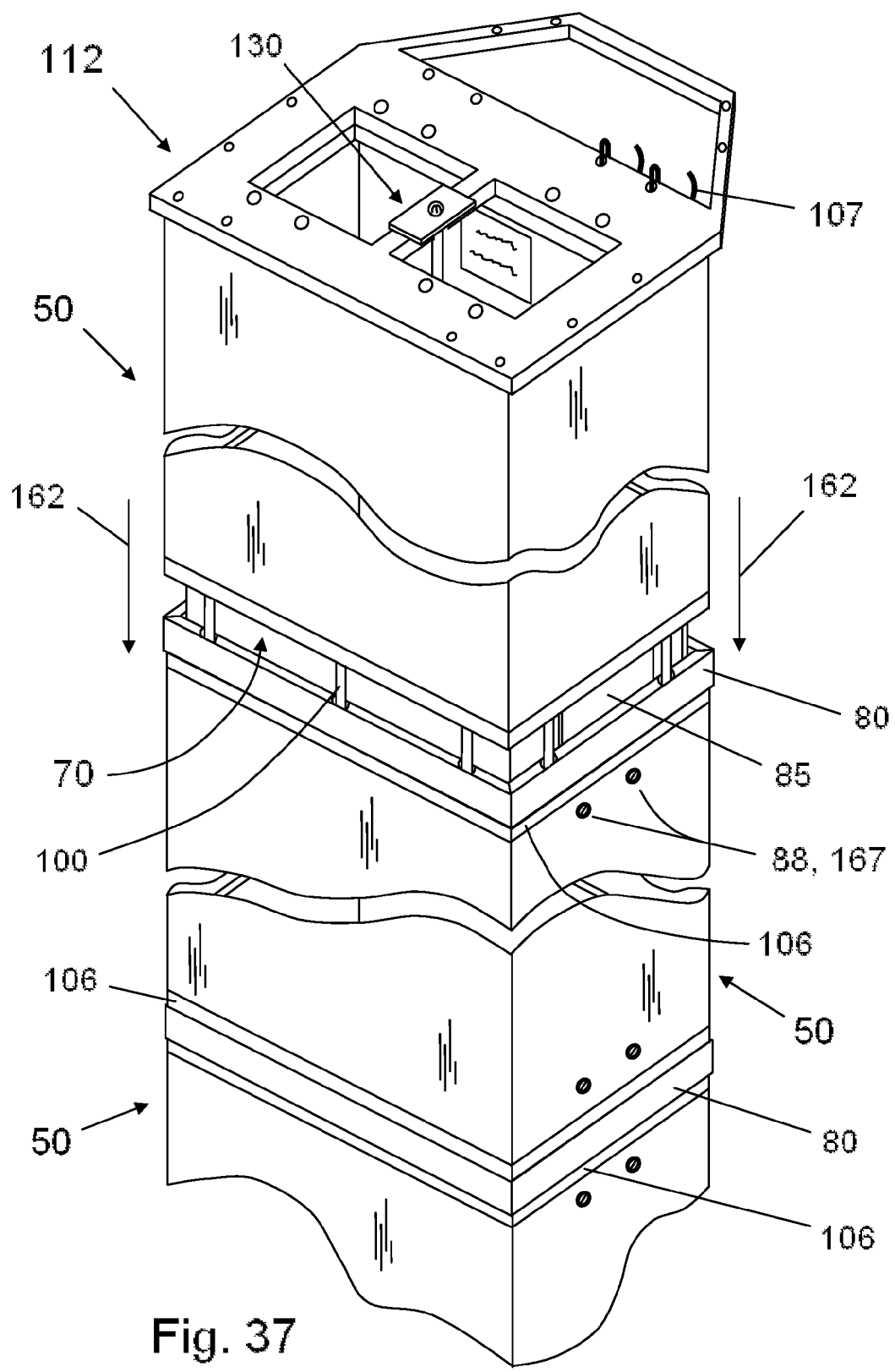
FIG. 37 shows the final step of an assembled column using a combination of a plurality of outer column sleeves; a plurality of optional outer sleeve alignment rods; a plurality of optional outer column support brackets; a plurality of inner sleeve support frames; a plurality of inner column sleeves; and a column top cap, with an optional tension cable and a plurality of backdrop rod hangers, in this embodiment.

FIG. 37 describes the next step in the assembly of column 3. In this step second and final inner column sleeve 70 is first inserted into second outer column sleeve 50 (as described above in FIG. 33). Next, second and final sleeve support frame 80 is installed onto second inner column sleeve 70 (as described above in FIG. 34). If optionally used, optional second outer column support bracket 85, and a plurality of optional outer sleeve alignment rods 100 (104), can be installed at this point. Finally, third and final outer column sleeve 50, assembled with column top cap 112 (or optionally third column top cap 156), as described above in FIG. 36A in this embodiment, with curved backdrop rod hangers 107 and tension cable 130 already installed, is placed over second and final inner column sleeve 70 (as described in FIG. 35). Note that tension cable 130 now protrudes through all column 3 components below third and final outer column sleeve 50. If desired, flute covering 106 can be installed at this point to cover flutes 90 at both the bottom and top of third and final outer column sleeve 50. Optionally, if optional second outer column support bracket 85 was installed in an earlier step, second and third outer column sleeves 50 may be further supported by connecting them to optional second outer column support bracket 85, and thus indirectly to second inner sleeve support frame 80, using a plurality of outer column sleeve fasteners 88 and washers 167. Further, if optionally installed in an earlier step, a plurality of outer sleeve alignment rods 100 (104), extending from second outer column 50 could engage a plurality of flutes 90 located at the bottom of third outer column 50.

Figure 38:
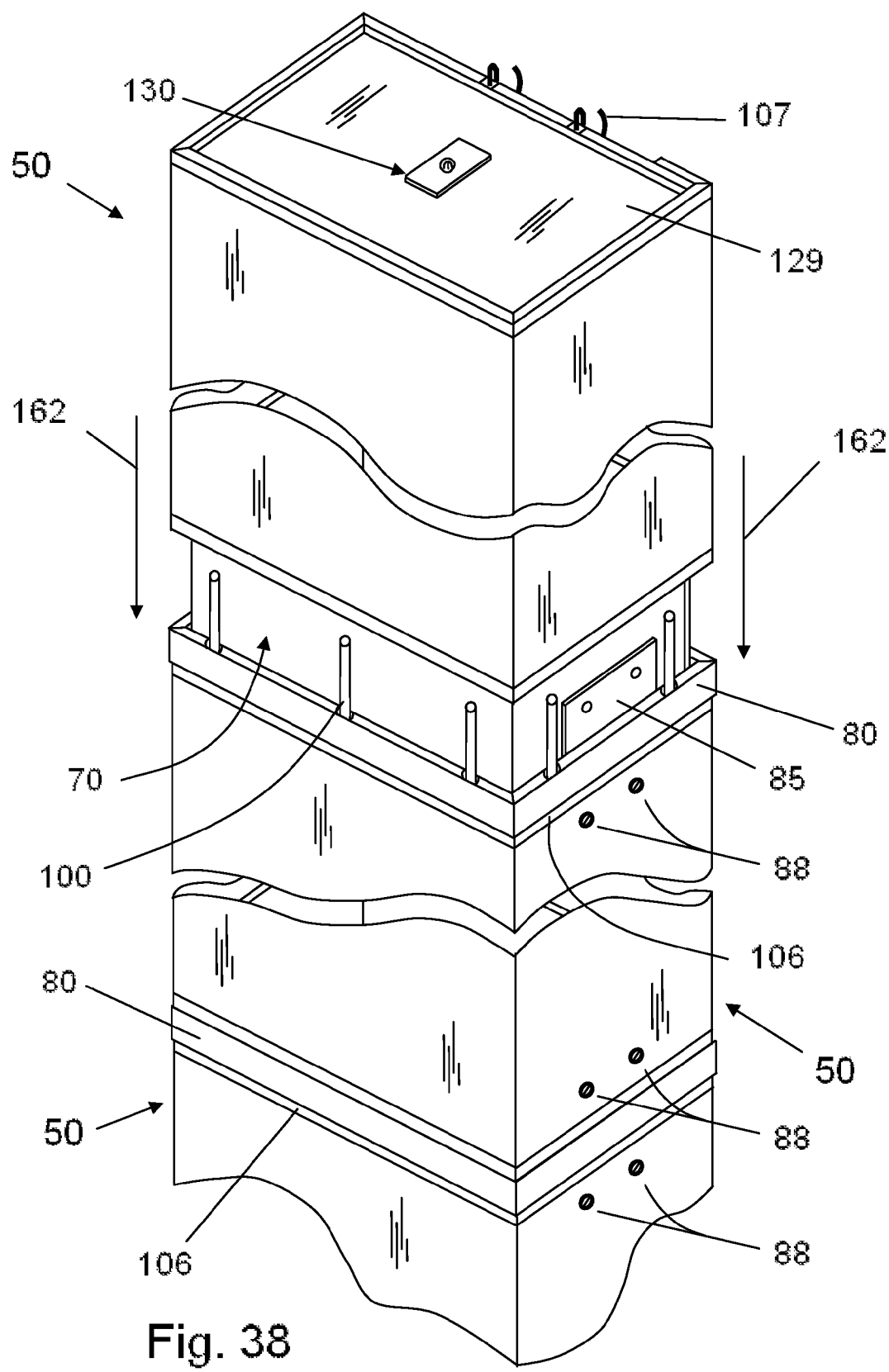
FIG. 38 shows the final step of an assembled column using a combination of a plurality of outer column sleeves; a plurality of optional outer sleeve alignment rods; a plurality of optional outer column support brackets; a plurality of inner sleeve support frames; a plurality of inner column sleeves; an alternate column top cap with an optional tension cable; and a final outer column sleeve with a plurality of installed backdrop rod hangers in this embodiment.

FIG. 38 shows the installation of alternate second column top cap 129, assembled with third and final outer column sleeve 50 (as described in FIG. 36B). This alternate combination is then installed as just described above in the embodiment shown in FIG. 37, along with any optional components, such as flute covering 106, outer column support bracket 85, or outer sleeve alignment rods 100 (104).

Figure 39:
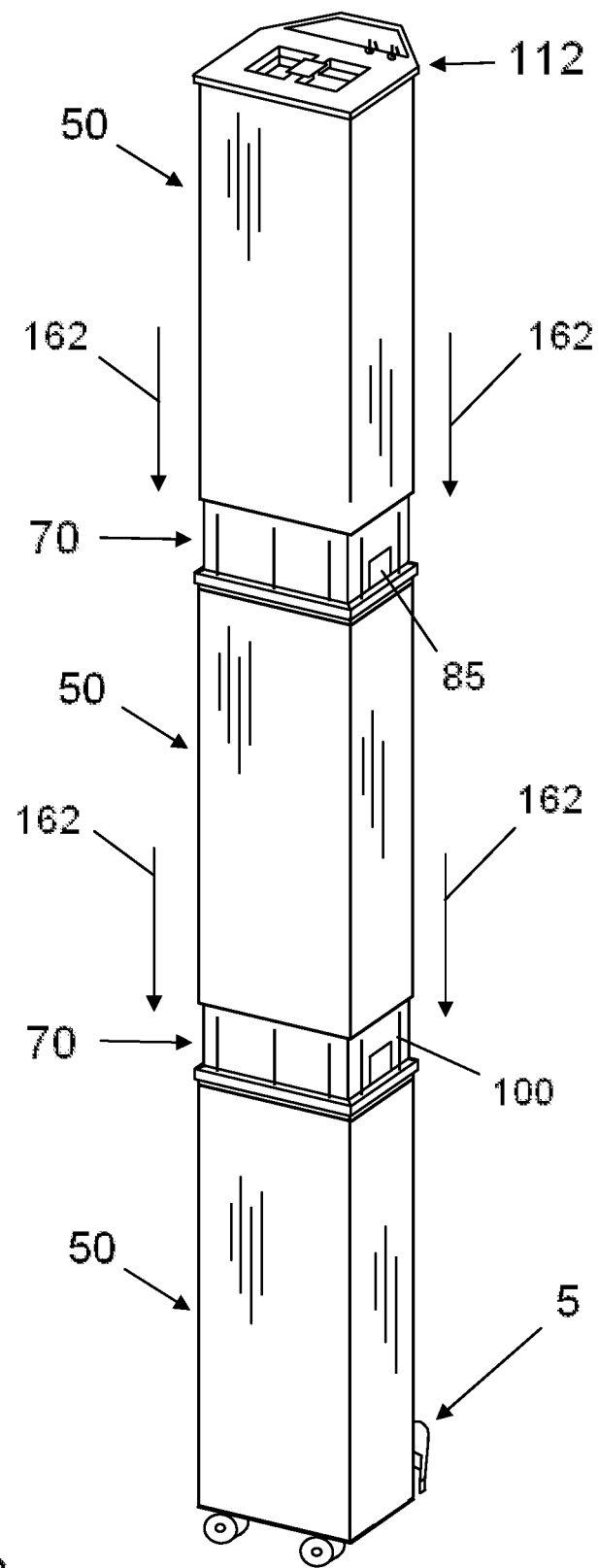
FIG. 39 shows a perspective view of the assembly of all components of one column in this embodiment.

FIG. 39 shows an overall perspective view of the steps just described above in FIGS. 29 to 38, including possible optional embodiments (such as outer column support brackets 85 and outer sleeve alignment rods 100 (104)). Note also that in an alternate installation approach, any of top caps 112, 129, or 156 may be installed onto final outer column sleeve 50 after final outer column sleeve 50 has been installed onto second and final inner column sleeve 70.

Figure 40:
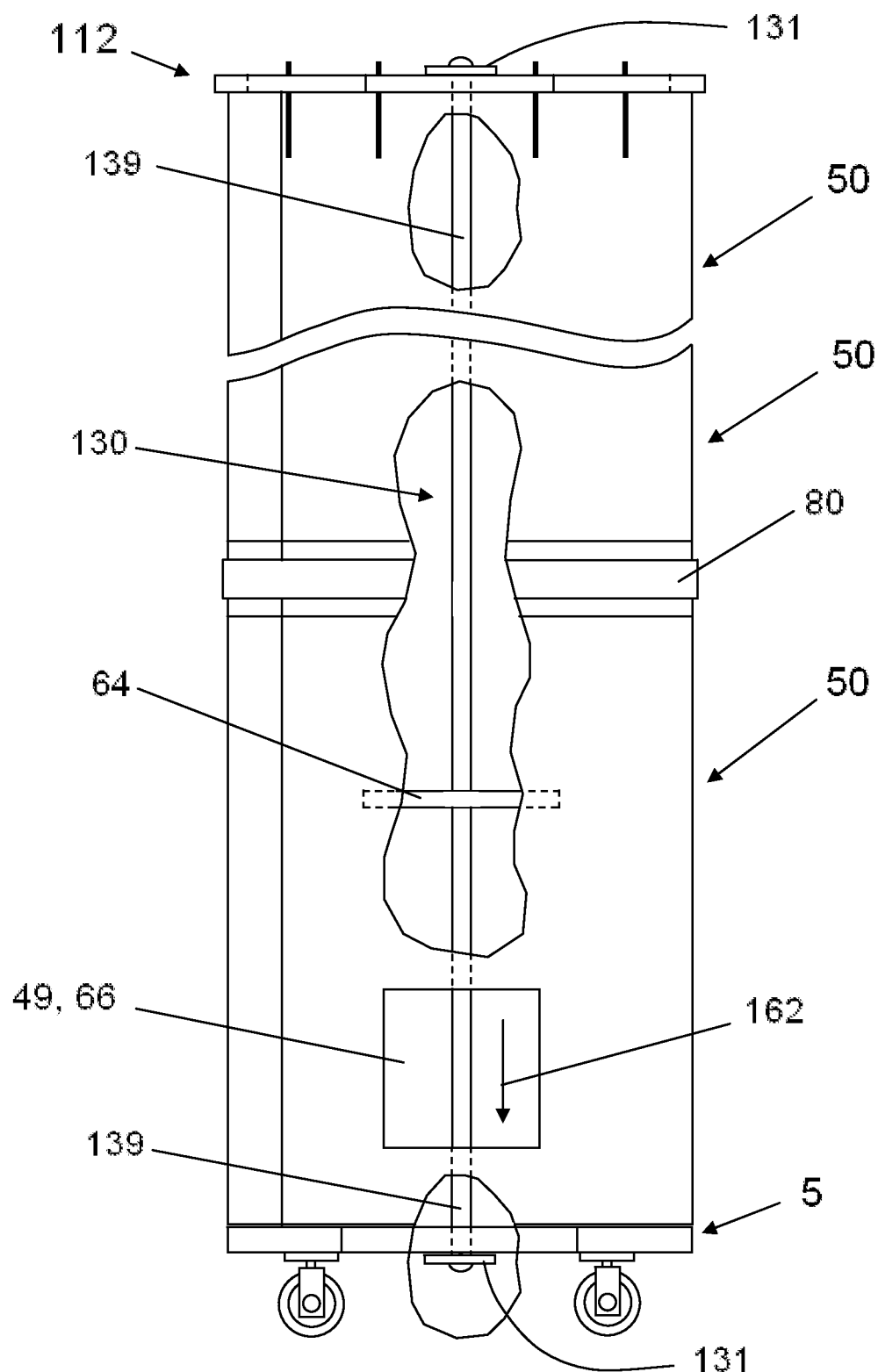
FIG. 40 shows an optional tension cable attached to a column top cap and a support base during the assembly of this embodiment.

Turning now to FIG. 40, the last step in the construction of column 3 involves the final installation of tension cable 130. As seen in FIGS. 36A and 37, tension cable 130 is now protruding through all column 3 components below third and final outer column sleeve 50. To complete column 3 assembly, the user places their hand through outer sleeve access aperture 66 and base inner sleeve access aperture 49 to grasp the other endpiece 131 of tension cable 130. Once endpiece 131 is in hand, it is pulled in a downward installation direction 162 and placed in lower tension cable slot 27, thus placing all components in column 3 in vertical tension.

Figure 41A:
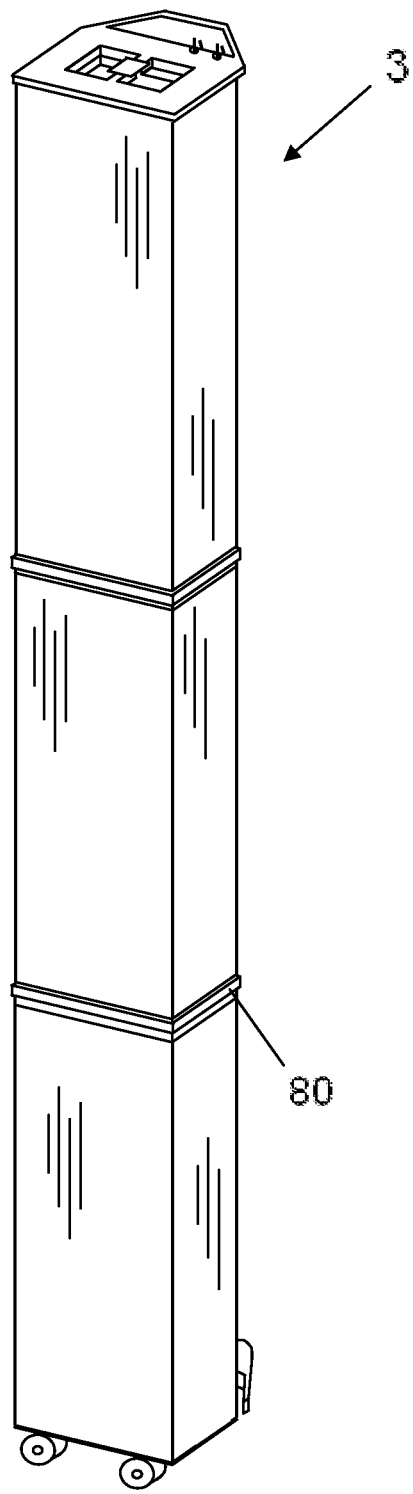
FIG. 41A shows a perspective view of an assembled column in this embodiment.
Figure 41B:
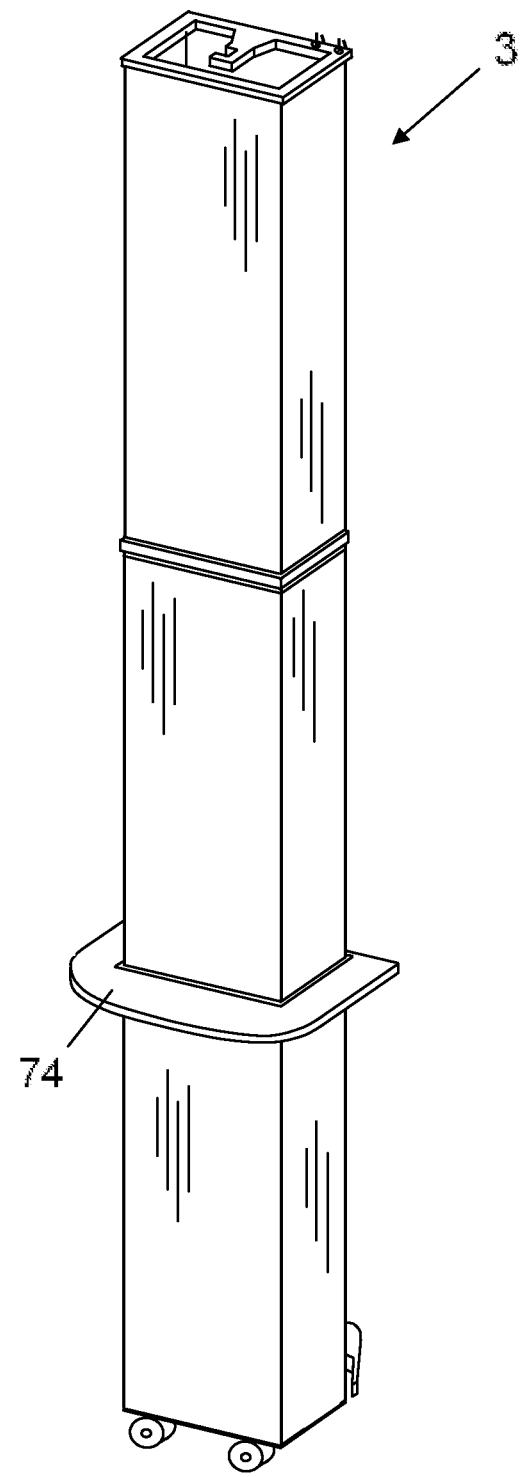
FIG. 41B shows a perspective view of an assembled column with an outer frame shelf, and an additional column top cap, in this embodiment.

FIGS. 41A and 41B show two completed columns 3. FIG. 41A describes the completed column 3 of this embodiment. FIG. 41B shows an alternate embodiment using third column top cap 156 and alternate inner sleeve support frame 74 where support frame shelf 78 may be used as an additional surface area for placing supplementary items used in tradeshows, broadcast television studios, etc., such as brochures, display monitors, and speakers, to name a few.

Figure 42:
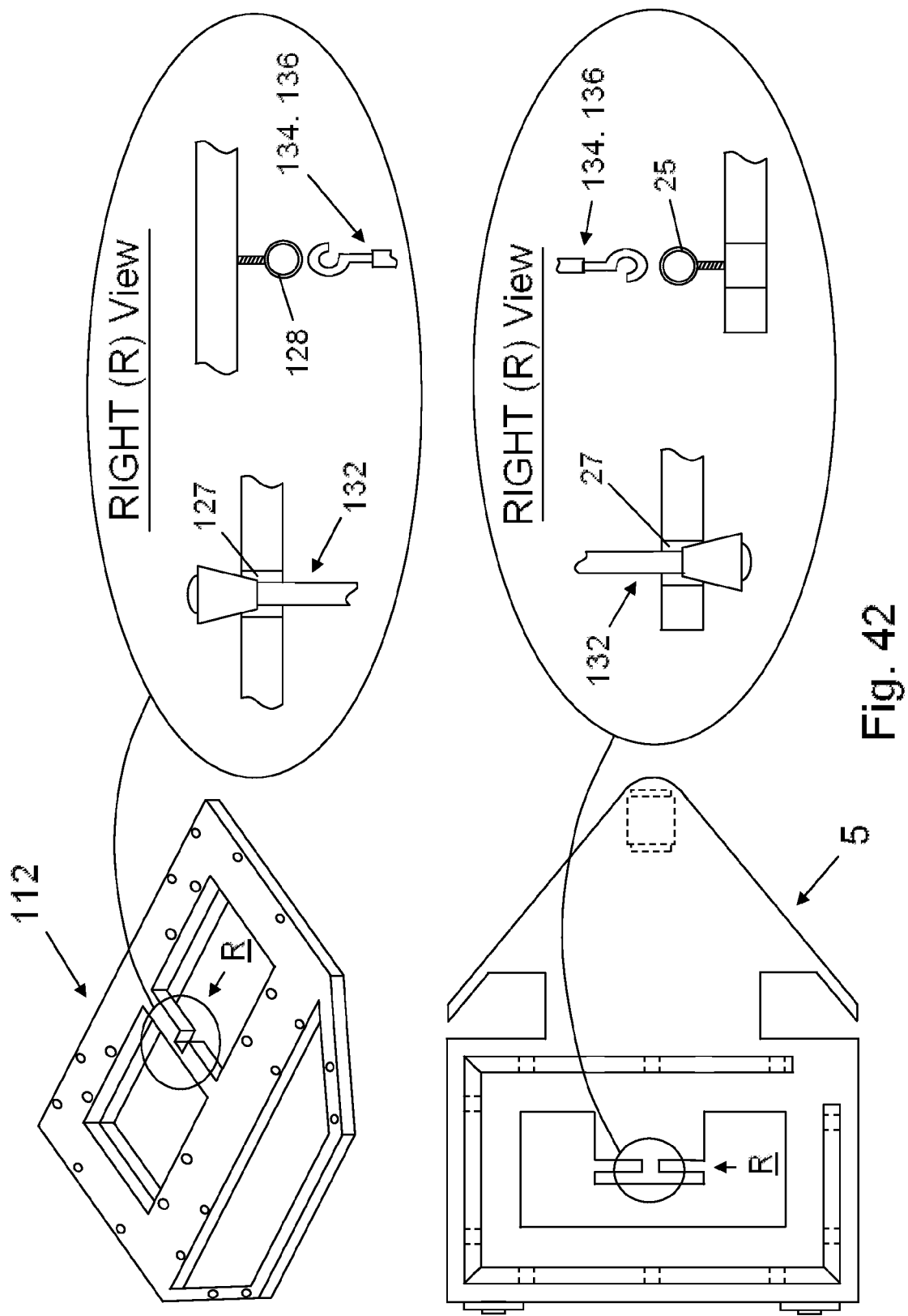
FIG. 42 shows the detailed attachment of a plurality of optional tension cable embodiments to a column top cap, and a support base, in this embodiment.
Figure 43:
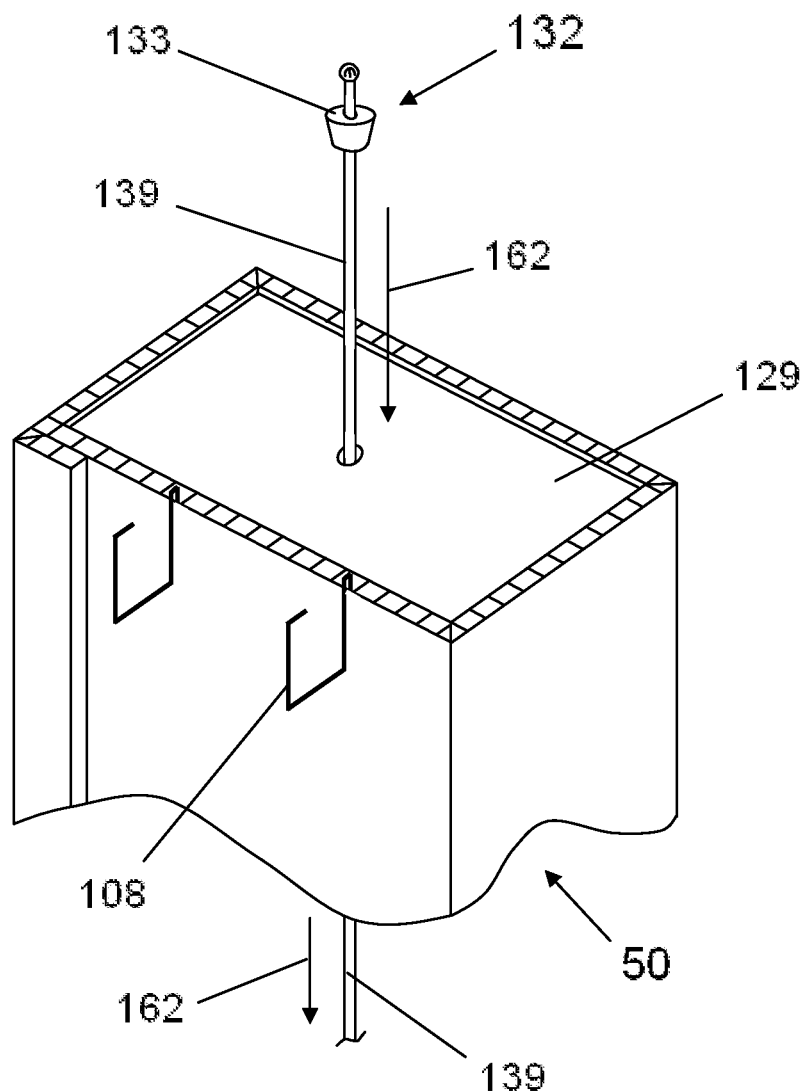
FIG. 43 shows the detailed attachment of an optional tension cable to the alternate column top cap in this embodiment.

FIG. 42 shows the use of additional embodiments of tension cables 132, 134, and 136. Alternate tension cable 132 attaches to column top cap 112 using upper tension cable slot 127 at the top of column 3, and to support base assembly 5 using lower tension cable slot 27 at the bottom of column 3. FIG. 42 also shows the use of additional tension cable 134, and adjustable tension cable 136, whose ends are attached to upper tension hook 128, which is engaged with column top cap 112 at the top of column 3, and attached to lower tension hook 25, which is engaged with support base assembly 5, at the bottom of column 3. FIG. 43 shows the use of second column top cap 129 with alternate tension cable 132, and alternate rectangular backdrop rod hangers 108, in an alternate embodiment of column 3. Note also that although tension cable 130, or additional embodiments of tension cables 132, 134, and 136, is used in this embodiment, column 3 may be assembled without a tension cable, while still functioning as designed.

Note also that due to the lightweight design of this embodiment, at any time during the assembly of column 3, the partially-assembled column may be tilted forward or backward, or to the left or right, in order to attach column 3 components, thereby eliminating the need for additional hardware, such as ladders. Footpad section 16 may also be used in the manipulation of column 3.

Optionally, the assembly of column 3 can be implemented by placing support base assembly 5 on its side, with column wall attachment assembly 7 facing parallel to solid surface 164. Assembly of column 3 would continue as just described above but with all components installed in a horizontal direction. Once assembled, column 3 would be positioned vertically to complete the assembly.

Once columns 3 have been assembled, backdrop assembly 4 may be attached. Turning now to FIG. 44, backdrop assembly 4 is comprised of two support rods 140, one for upper support and one for lower support, and a backdrop 150, which possesses a display surface 151. In the current embodiment, backdrop 150 is a canvas fabric material, available from Genesis Art Supplies, of Chicago, Ill., although other fabric materials such as nylon, cotton, polyester/cotton blend, etc., can be used. In its final form, backdrop 150 measures 48-inches wide by 95-inches high. Backdrop 150 may be of a single color or multiple colors; display images (such as company logos) or text; or be used as a video projection screen; that is, backdrop 150 is capable of providing many variations of backgrounds suited for a variety of settings and uses. Backdrop assembly 4 is formed by inserting a first support rod 140 into a backdrop upper rod sleeve opening 152 until both ends of first support rod 140 are seen protruding from the ends of backdrop upper rod sleeve opening 152, and inserting a second support rod 140 into a backdrop lower rod sleeve opening 154 until both ends of second support rod 140 are seen protruding from the ends of backdrop lower rod sleeve opening 154.

Figure 45:
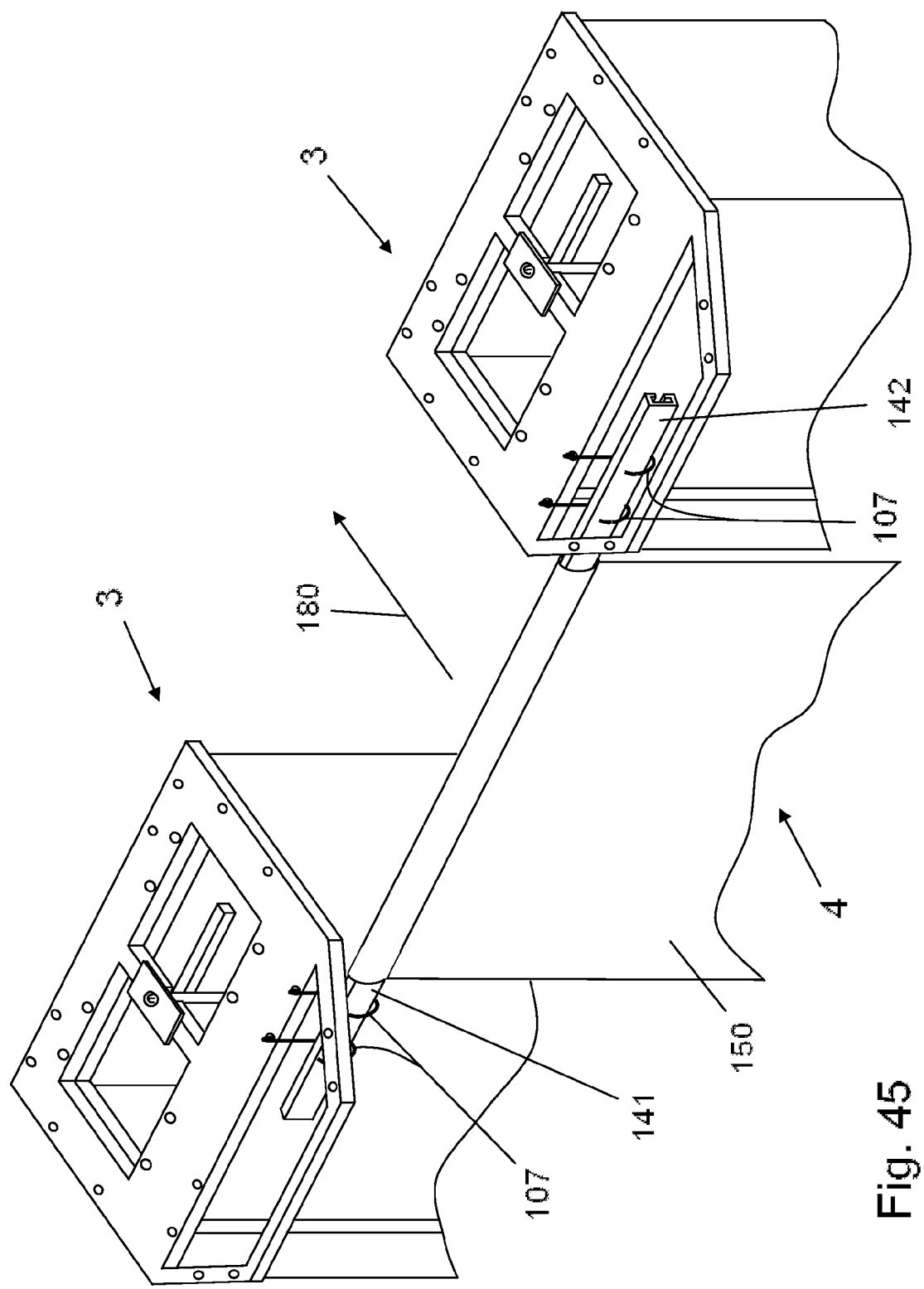
FIG. 45 shows a perspective view of the backdrop assembly installed between two assembled columns using a plurality of column top caps, fitted with a plurality of backdrop rod hangers, in this embodiment.

Turning now to FIG. 45, backdrop assembly 4 is attached to a set of completed columns 3 by inserting support rod inner section 141 into a pair of curved backdrop rod hangers 107 installed on a first column 3, and subsequently inserting support rod outer section 142 into a pair of curved backdrop rod hangers 107 installed on a second column 3, such that display surface 151 of backdrop 150 is facing in a forward direction 180. Backdrop 150 is then allowed to hang between the set of columns 3, while held in place by the weight of second support rod 140, located at the bottom of backdrop 150, whose ends fit within cutout slots 17 of support base assembly 5 (see FIG. 2F).

Figure 46:
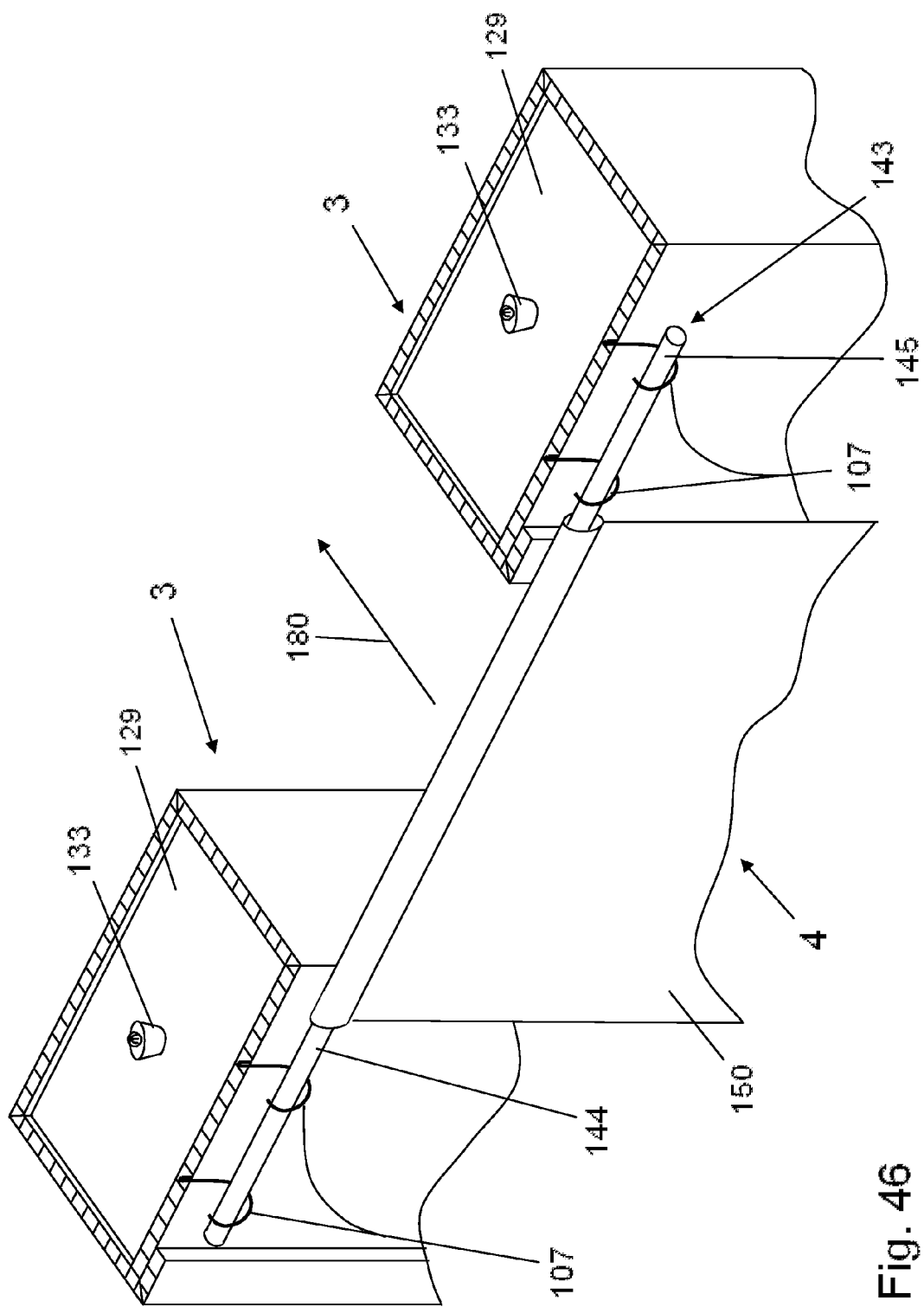
FIG. 46 shows a perspective view of the backdrop assembly installed between two assembled columns using a plurality of alternate column top caps, and a plurality of outer column sleeves fitted with a plurality of backdrop rod hangers, in this embodiment.

FIG. 46 shows an alternate embodiment using alternate support rod 143 and second column top cap 129. In this embodiment circular rod inner section 144 is inserted into a pair of curved backdrop rod hangers 107 installed on a first column 3, and circular rod outer section 145 is inserted into a into a pair of curved backdrop rod hangers 107 installed on a second column 3, such that display surface 151 of backdrop 150 is facing in a forward direction 180. Backdrop 150 is then allowed to hang between the set of columns 3, while held in place by the weight of alternate support rod 143, or alternately, support rods 147 or 148, whose ends fit within cutout slots 17 of support base assembly 5.

The final, completed assembly of this embodiment of modular background set 1 is shown in FIG. 1. Modular background set 1 can be readily and easily disassembled in the reverse order to that described above to a very compact and lightweight configuration that may be easily transported in small boxes, suitcases, or other enclosures, as described above.

DETAILED DESCRIPTION AND METHOD OF ASSEMBLY

Alternate Embodiment—FIG. 41A or 41B

In another embodiment, using FIG. 41A or 41B, a modular background set 1, featuring a single column, can be produced by placing backdrop rod hangers (107, 108) at the front of completed column 3 in either flutes 90, or backdrop rod hangar apertures 114, if column top cap one 112 or third column top cap 156 are used. Support rod 140 and display surface 151 maintain similar structure as described above, but may be adjusted in size to form the single column display configuration. In this configuration, backdrop 150 will be positioned in front of column 3. Modular background set 1, configured in a single column, can be readily and easily disassembled in the reverse order to that described above to a very compact and lightweight configuration that may be easily transported in small boxes, suitcases, or other enclosures, as described above.

DETAILED DESCRIPTION AND METHOD OF ASSEMBLY

Additional Embodiment—FIG. 32

In another embodiment, described in FIG. 32, a shortened modular background set 1 can be created by combining support base assembly 5, base inner sleeve 30, and outer column sleeve 50. At this step, as described above, any of top caps 112, 129, or 156 may be installed onto final outer column sleeve 50, with backdrop rod hangers (107, 108) placed in either flutes 90, or backdrop rod hangar apertures 114, if column top cap one 112 or third column top cap 156 are used, thus completing column 3. Support rod 140 and display surface 151 maintain similar structure as described above, but may be adjusted in size to the required height and width to fit between two shortened columns 3. Shortened modular background set 1 can be readily and easily disassembled in the reverse order to that described above to a very compact and lightweight configuration that may be easily transported in small boxes, suitcases, or other enclosures, as described above.

DETAILED DESCRIPTION AND METHOD OF ASSEMBLY

Further Alternate Embodiments—FIGS. 47-50

Figure 47:
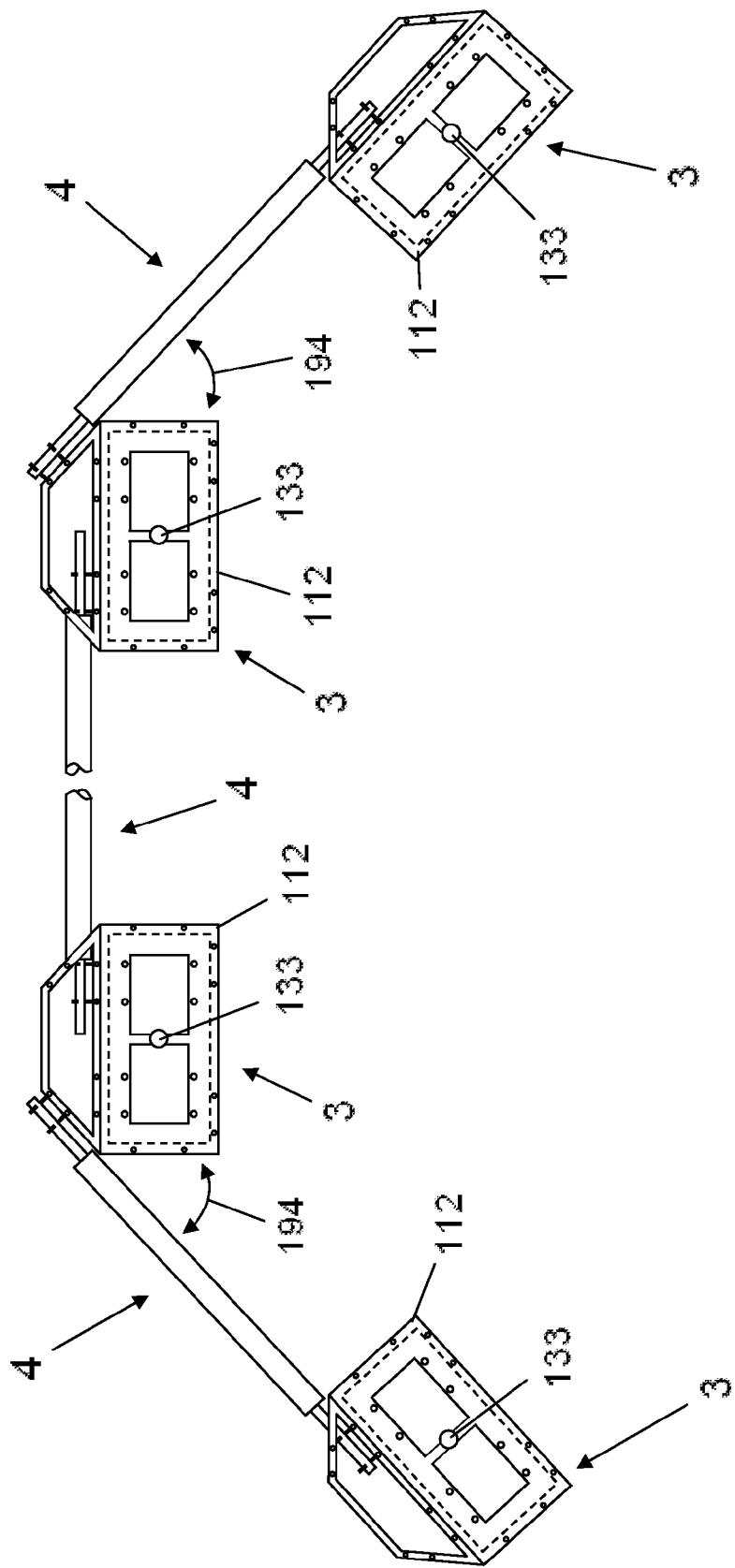
FIG. 47 shows a top view of an alternate modular background set configuration with wing-backdrops configured at 45-degree angles in an alternate embodiment.

In another embodiment, shown in FIG. 47, four completed columns 3 are combined with three backdrop assemblies 4 to create a background with non-orthogonal wings, which are commonly used in tradeshows, broadcast television, or theatre. In this embodiment, all four columns 3 are assembled as described above in FIGS. 29 to 46. To accomplish the wing-assembly configuration, the two center columns 3 use two column top caps 112, each with two curved backdrop rod hangers 107 installed within backdrop rod hanger apertures 114 positioned along top cap angle 119 (see FIGS. 24A and 25C). The outer columns 3 use two column top caps 112, each with two curved backdrop rod hangers 107 installed within backdrop rod hanger apertures 114 positioned along the backside of column top cap 112 (as seen in FIG. 25A). In the current embodiment, when the two side backdrop assemblies 4 are installed in this manner, a 45-degree orientation direction 194 is formed, thus creating the non-orthogonal wing configuration.

Figure 48:
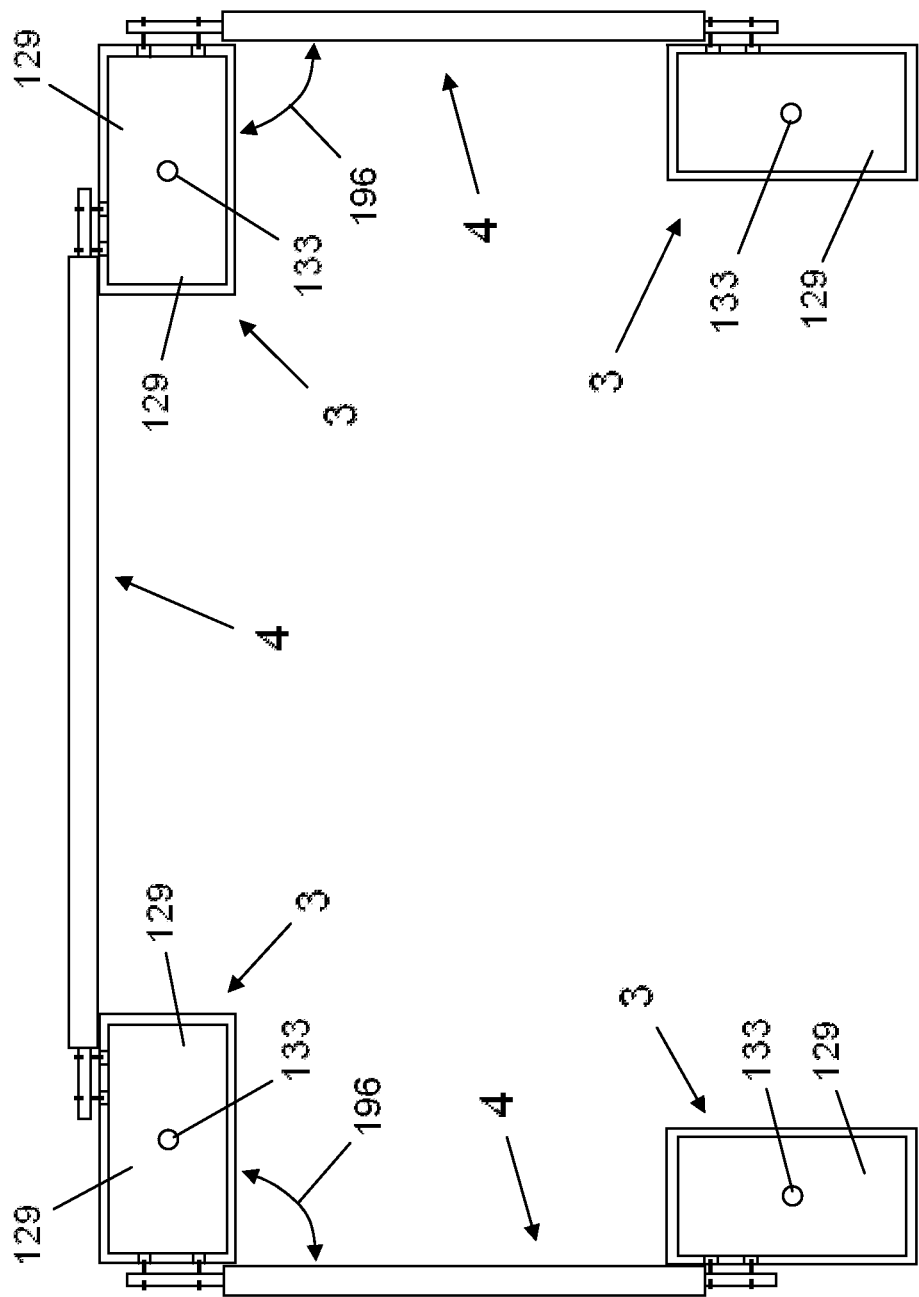
FIG. 48 shows a top view of another modular background set configuration with wing-backdrops configured at 90-degree angles in an additional embodiment.

In yet another embodiment, shown in FIG. 48, four columns 3 are combined with three backdrop assemblies 4 to create a background with orthogonal wings, commonly used in tradeshows, broadcast television, or theatre. In this embodiment, all four columns 3 are assembled as described above in FIGS. 29 to 46, but with second column top cap 129 used in order to demonstrate the flexibility of this embodiment. To accomplish the orthogonal wing-assembly configuration, the two center columns 3 use second column top caps 129, each with two additional curved backdrop rod hangers 107 inserted directly into corrugated plastic sheet flutes 90 positioned along the outside edge of outer column sleeves 50. The two outer columns 3 use second column top caps 129, each with two curved backdrop rod hangers 107 inserted directly into corrugated plastic sheet flutes 90 positioned along the backside edge of outer column sleeves 50 (as seen in FIG. 26B). In the current embodiment, when the two side backdrop assemblies 4 are installed in this manner, a 90-degree orientation direction 196 is formed, thus creating the orthogonal wing configuration.

As discussed in the description of the construction of column top cap 112 in FIGS. 22 to 25, top cap angle 119 could be machined to other angles to form different background wing-assembly configurations.

DETAILED DESCRIPTION

Figure 49:
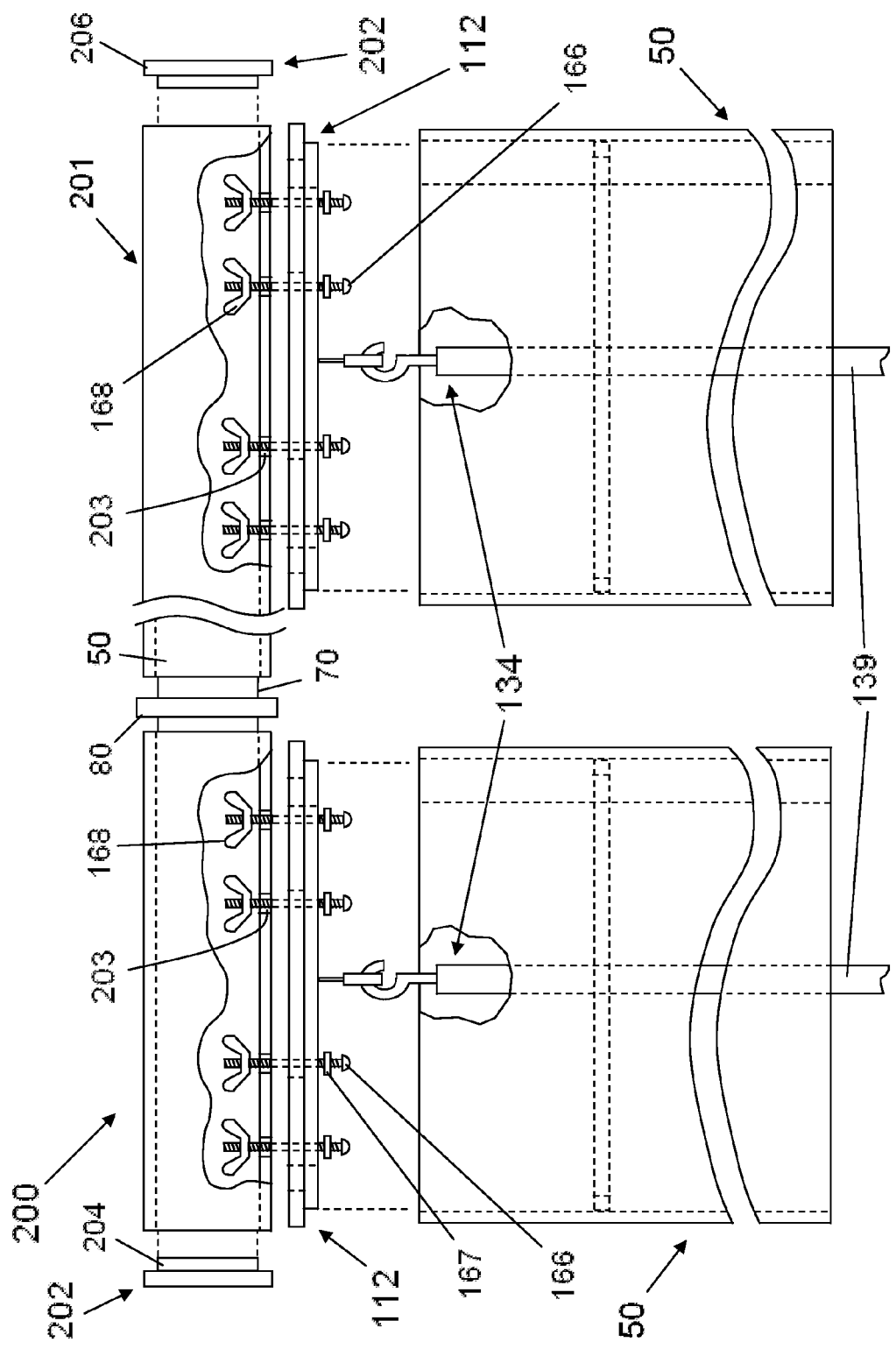
FIG. 49 shows the assembly of a lentil, and method of attachment of the lentil to two columns in yet another embodiment.

Further Additional Embodiment—FIG. 49

In an additional embodiment, shown in FIG. 49, lintel 200 is constructed from a lintel column 201 and a plurality of lintel end caps 202. Lintel column 201 is further formed from a plurality of inner column sleeves 70; inner sleeve support frames 80; and outer column sleeves 50, each with the same shape, but with different dimensions than those used in the assembly of column 3, and formed in a manner similar to the components of column 3, as described above in FIGS. 4A to 4E and FIGS. 8A to 8E. In the current embodiment, inner column sleeve 70 for lintel column 201 measures 6.3-inches wide by 6.5 inches deep by 13-inches long (outside dimensions); inner sleeve support frame 80 for lintel column 201 measures 7.0-inches wide by 7.2 inches deep by ½-inches long (outside dimensions), with an internal cutout 81 measuring 6.4-inches wide by 6.6 inches deep, allowing it to fit around inner column sleeve 70; and outer column sleeve 50 for lintel column 201 measures 6.8-inches wide by 7.0 inches deep by 26.5-inches long (outside dimensions). Lintel end cap 202 is preferably made from a closed cell polymerized vinyl chloride (PVC) material, such as Sintra®, which is lightweight with a high-stiffness; is available in a variety of thicknesses and colors; and can be cut, milled, routed or drilled to form many shapes. Note that other stiff, lightweight materials could be used, such as cellular utility polymer sheet material (e.g., King StarLite® XL); acetal plastics (e.g., Delrin®); and Polyamide (Nylon); to name a few. For this embodiment lintel end cap 202 is constructed from ½-inch (13-mm) thick Sintra® in a black color, although other thicknesses and colors may be used. In the present embodiment, embodiment lintel end cap 202 has a cap inner section 204 measuring 6.2-inches wide by 6.4 inches deep by ¼-inches long (outside dimensions), and an end cap outer section 206 measuring 6.8-inches wide by 7.0 inches long by ¼-inch deep.

METHOD OF ASSEMBLY

Figure 50:
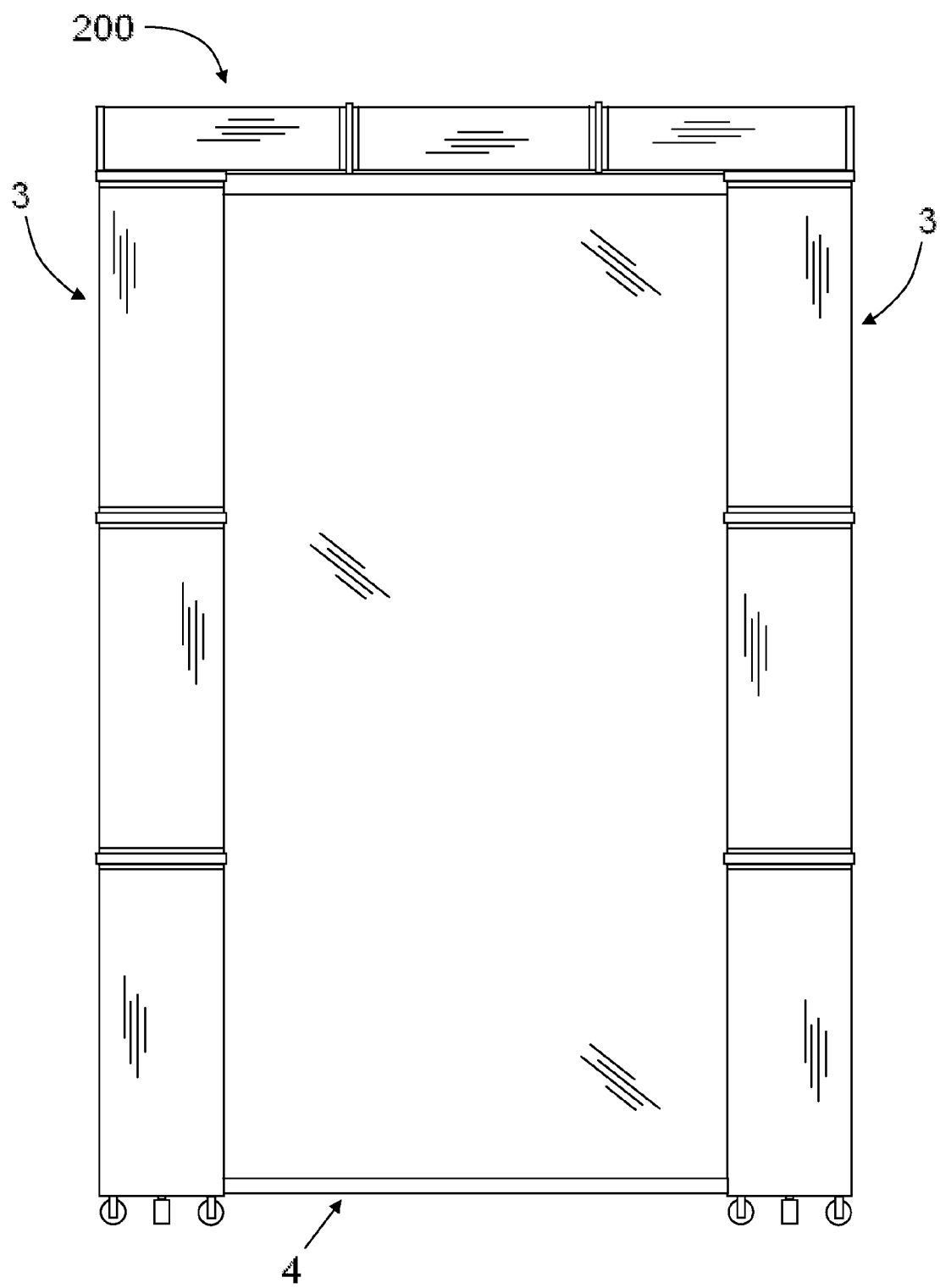
FIG. 50 shows the final assembly of the lentil embodiment.

Further Additional Embodiment—FIGS. 49-50

Since lintel 200 is constructed with similar components as used for column 3, the assembly of lintel 200 is similar to the assembly of column 3. That is, lintel 200 components inner column sleeves 70, inner sleeve support frames 80, and outer column sleeves 50, are assembled as described above in FIGS. 33 to 35. Once these components are assembled, lintel end caps 202 are installed on both ends of lintel 200. As shown in FIG. 49, cap inner section 204 frictionally fits within outer column sleeve 50 on each end of lintel column 201. Once the assembly of lintel 200 is completed, it is attached to a set of columns 3. To accomplish this each end of lintel 200 is placed upon a separate column top cap 112 before column top cap 112 is engaged with the top outer column sleeve 50 of a column 3. A plurality of lintel column attachment apertures 203 are aligned with outer member lintel attachment apertures 116 and inner member lintel attachment apertures 117 on column top cap 112. Once aligned, a plurality of fasteners 166, washers 167, and nut fasteners 168 are used to attach lintel 200 to each column top cap 112 (fasteners 166, washer 167, and nut fastener 168 are used in a similar method as shown before in FIG. 30). Additionally, lintel 200 can be attached to each column top cap 112 using quick release fasteners, such as the quick release ball lock pin from Fixtureworks in Michigan. That is, there are a number of fastener types that can be used to attach lintel 200 to each column top cap 112. Once lintel 200 is attached to column top caps 112, the entire assembly is engaged with the top outer column sleeves 50 of each column 3. If used, installation of tension cables 130 for each column 3 are then implemented as described before in FIG. 40. The final assembly of this additional embodiment is shown in FIG. 50.

From the foregoing, it is apparent that the portable, easily-assembled, modular background set described above not only provides for the reliable accomplishment of the purpose of this embodiment, but does so in a particularly simple, quick and reliable manner. It is recognized, of course, that those skilled in the art may make various modifications or additions to the embodiments chosen to illustrate the invention without departing from the spirit and scope of the present contribution to the art. Accordingly, it is to be understood that the protection sought and to be afforded hereby should be deemed to extend to the subject matter claimed and all equivalents thereof within the scope of the invention.

What is claimed is:

1. A modular configurable background set system comprising:
    a plurality of columns, each said column comprising:
        a plurality of inner sleeves, said inner sleeves are rectangular in shape comprising a plurality of corners, each said corner having a bend facilitated by a score line applied to the surface of said inner sleeve, said bends allowing said inner rectangular sleeves to be reversibly configured between an initial almost flat collapsed state to a rectangular shape state;
        a base with structure for removably attaching to one of said inner rectangular sleeves;
        a plurality of outer sleeves, said outer sleeves are rectangular in shape comprising a plurality of corners, each said corner having a bend facilitated by a score line applied to the surface of said outer sleeve, said bends allowing said outer sleeves to be reversibly configured between an initial almost flat collapsed state to a rectangular shape state;
        at least one hanger member with structure for removably attaching to one of said outer rectangular sleeves; and
    at least one backdrop system, said backdrop system comprising:
        a display surface with a plurality of first openings formed therein; and
        at least one backdrop support rod having a pair of opposing ends, said backdrop support rod removably inserted through one of said plurality of first openings,
    said one of each opposing ends of said backdrop support rod attaches to said at least one hanger member attached to said outer rectangular sleeve on a respective one of said columns thereby connecting said backdrop system between at least two said columns to form said background set system.

2. The system of claim 1, wherein said plurality of inner rectangular sleeves are constructed from corrugated plastic sheets.

3. The system of claim 1, wherein said plurality of inner rectangular sleeves have outside circumferential dimensions sized to frictionally fit within said plurality of outer rectangular sleeves.

4. The system of claim 1, wherein said base includes a plurality of walls, said walls receiving a respective one of said inner rectangular sleeves, such that said respective one of said inner rectangular sleeves is held in a substantially orthogonal orientation relative to said base.

5. The system of claim 4, wherein said walls include a plurality of threaded apertures to receive a plurality of removable fasteners such that said respective one of said inner rectangular sleeves is secured to said walls.

6. The system of claim 1, wherein said plurality of outer rectangular sleeves are constructed from corrugated plastic sheets.

7. The system of claim 1, wherein said plurality of outer rectangular sleeves have inside circumferential dimensions sized to frictionally fit around the outside of said plurality of inner rectangular sleeves.

8. The system of claim 1, wherein said plurality of outer rectangular sleeves are configured to accept a top cap element.

9. The system of claim 8, wherein said top cap element includes a plurality of apertures, said apertures configured to accept said at least one hanger member.

10. The system of claim 8, wherein said top cap element includes structure for accepting a tension cable, said tension cable used to keep said assembled column substantially aligned.

11. The system of claim 1, further comprising a plurality of support frames, each said support frame configured with a second opening sized to frictionally and removably engage with one of said plurality of inner rectangular sleeves such that said inner and outer rectangular sleeves are kept substantially square.

12. The system of claim 11, wherein said plurality of support frames are constructed from a closed cell polymerized vinyl chloride material.

13. The system of claim 11, wherein said plurality of support frames include a shelf.

14. The system of claim 1, further comprising a plurality of support rods, each support rod configured to attach to said inner rectangular sleeves such that said inner and outer rectangular sleeves are kept substantially square.

15. The system of claim 1, wherein said at least one hanger member is constructed from a rigid material, said rigid material is machinable, and said at least one hanger member is configured to accept said at least one backdrop support rod.

16. The system of claim 1, wherein said display surface is constructed from a fabric material.

17. The system of claim 1, wherein said plurality of first openings are located at opposite ends of said display surface.

18. The system of claim 1, wherein said at least one backdrop support rod is made from a rigid material, said rigid material is machinable, and said at least one backdrop support rod is configured to be adjustable in length.

19. The system of claim 1, wherein said at least one backdrop support rod is rectangular in shape.

20. The system of claim 1, wherein said at least one backdrop support rod is circular in shape.

21. A modular configurable background set system comprising:
a plurality of columns, each said column comprising:
a plurality of rectangular inner sleeves, each said rectangular inner sleeve comprising a plurality of corners, each said corner having a bend facilitated by a score line applied to the surface of said inner rectangular sleeve, said bends allowing said inner rectangular sleeves to be reversibly configured between an initial almost flat collapsed state to a rectangular shape state, each said rectangular inner sleeve having a pair of opposing ends, each said end configured with a first opening;
a base with structure for removably attaching to said first opening of one said end of one said rectangular inner sleeve;
a plurality of rectangular outer sleeves, each said rectangular outer sleeve comprising a plurality of corners, each said corner having a bend facilitated by a score line applied to the surface of said outer rectangular sleeve, said bends allowing said outer rectangular sleeves to be reversibly configured between an initial almost flat collapsed state to a rectangular shape state, each said rectangular outer sleeve having a pair of opposing ends, each said end configured with a second opening to frictionally and removably attach to one said end of one said rectangular inner sleeve;
a plurality of support frames, each said support frame configured with a third opening to frictionally and removably engage with one of said rectangular inner sleeves;
a top cap, said top cap includes structure for removably attaching to said second opening of one said end of one said rectangular outer sleeve, said top cap includes a plurality of apertures;
at least one hanger member, said hanger member configured to frictionally and removably attach to said plurality of apertures in said top cap; and
at least one backdrop system, comprising:
a backdrop, further comprising a display surface with a plurality of fourth openings formed therein, said fourth openings located at opposite ends of said display surface; and
at least one backdrop support rod having a pair of opposing ends, said backdrop support rod is adjustable in length and is removably inserted through one of said fourth openings,
said one of each opposing ends of said backdrop support rod attaches to at least one of said hanger members on a respective one of said plurality of columns thereby connecting said backdrop system between at least two of said plurality of columns to form said background set system.

22. A modular configurable background set system comprising:
at least one column, said column comprising:
at least one inner sleeve, said inner sleeve is rectangular in shape comprising a plurality of corners, each said corner having a bend facilitated by a score line applied to the surface of said inner sleeve, said bends allowing said inner rectangular sleeve to be reversibly configured between an initial almost flat collapsed state to a rectangular shape state, said inner sleeve having a pair of opposing ends, each said end configured with a first opening;
at least one base with structure for removably attaching to said first opening of one said end of said inner rectangular sleeve;
at least one outer sleeve, said outer sleeve is rectangular in shape comprising a plurality of corners, each said corner having a bend facilitated by a score line applied to the surface of said outer rectangular sleeve, said bends allowing said outer sleeve to be reversibly configured between an initial almost flat collapsed state to a rectangular shape state, said outer sleeve having a pair of opposing ends, each said end configured with a second opening to frictionally and removably attach to one said end of said inner sleeve;
a top cap, said top cap includes structure for removably attaching to said second opening of one said end of one said outer sleeve, said top cap includes a plurality of apertures;
a plurality of hanger members, each said hanger member configured to frictionally and removably attach to said plurality of apertures in said top cap; and
at least one backdrop system, comprising:
a backdrop, further comprising a display surface with a plurality of third openings formed therein, said third openings located at opposite ends of said display surface;
at least one backdrop support rod, said backdrop support rod removably inserted through one of said third openings,
said backdrop support rod attaches to said plurality of hanger members on said top cap of said at least one column thereby connecting said backdrop system to said at least one column to form said background set system.

23. A method for erecting a modular configurable background set in an area, said method comprising:
(a) providing at least two columns, each of said columns comprising at least one inner rectangular sleeve and at least one outer rectangular sleeve, each said inner rectangular sleeve and said outer rectangular sleeve comprising a plurality of corners, respectively, each said corner of each said respective sleeve having a bend facilitated by a score line applied to the surface of each said respective sleeve, said bends allowing said respective inner and outer rectangular sleeves to be reversibly configured between an initial almost flat collapsed state to a rectangular shape state, each said sleeve expanded from a said almost flat collapsed state to said rectangular shape state, said inner and outer rectangular sleeves frictionally engaged together, said at least one frictionally engaged inner and outer rectangular sleeve structure removably attached to at least one base, and a plurality of hanger members removably attached to said at least one outer rectangular sleeve;
(b) providing at least one backdrop system, said backdrop system comprising at least one display surface and at least one backdrop support rod removably attached to said display surface, said backdrop support rod having a pair of opposing ends;
(c) connecting each respective said opposing end of said at least one backdrop support rod to a respective one of said plurality of hanger members attached to a respective one of said columns thereby connecting said backdrop system between at least two said columns, thereby forming said background set.

24. A method for erecting a modular configurable background set in an area, said method comprising:
(a) providing at least two bases;
(b) providing a plurality of inner sleeves, said inner sleeves are rectangular in shape comprising a plurality of corners, each said corner having a bend facilitated by a score line applied to the surface of said inner rectangular sleeve, said bends allowing said inner rectangular sleeves to be reversibly configured between an almost flat collapsed state to an expanded rectangular shape state, expanding a first said inner rectangular sleeve from said almost flat collapsed state to said expanded rectangular shape state, and removably attaching said expanded first inner rectangular sleeve to a respective one of said bases;
(c) providing a plurality of outer sleeves, said outer sleeves are rectangular in shape comprising a plurality of corners, each said corner having a bend facilitated by a score line applied to the surface of said outer rectangular sleeve, said bends allowing said outer rectangular sleeves to be reversibly configured between an almost flat collapsed state to an expanded rectangular shape state, expanding a first said outer rectangular sleeve from said almost flat collapsed state to said expanded rectangular shape state, and removably installing said expanded first outer rectangular sleeve onto a respective one of said expanded first inner rectangular sleeves until said expanded first outer rectangular sleeve engages a respective one of said bases;
(d) expanding a second said inner rectangular sleeve from an almost flat collapsed state to an expanded rectangular shape state, and removably inserting said expanded second inner rectangular sleeve into a respective one of said expanded first outer rectangular sleeves;
(e) providing a plurality of support structures and removably installing a first said support structure onto a respective one of said expanded second inner rectangular sleeves until said first support structure engages a respective one of said expanded first outer rectangular sleeves;
(f) expanding a second said outer rectangular sleeve from an almost flat collapsed state to an expanded rectangular shape state, and removably installing said expanded second outer rectangular sleeve onto a respective one of said expanded second inner rectangular sleeves until said expanded second outer rectangular sleeve engages a respective one of said first support structures;
(g) repeating steps (a) through (f) for each respective one of said plurality of columns until the required height of a respective one of a said plurality of columns is achieved;
(h) providing a plurality of hanger members and attaching at least one of said hanger members to a respective one of said expanded final outer rectangular sleeves of a respective one of said plurality of columns;
(i) providing at least one backdrop system, said backdrop system comprising at least one display surface, said display surface comprising a plurality of first openings formed therein;
(j) providing at least one backdrop support rod, said backdrop support rod having a pair of opposing ends, and inserting said backdrop support rod through at least one of said plurality of first openings of said display surface; and
(k) connecting each respective said opposing end of said backdrop support rod to at least one of a respective said hanger member attached to a respective one of said expanded final outer rectangular sleeves thereby connecting said backdrop system between at least two said columns, thereby forming said background set.

25. The system of claim 4, wherein said base includes structure for accepting a tension cable, said tension cable used to keep said assembled column substantially aligned.

* * * * *